(12) United States Patent
Uchida

(10) Patent No.: US 9,229,284 B2
(45) Date of Patent: Jan. 5, 2016

(54) LIQUID CRYSTAL DISPLAY DEVICE

(75) Inventor: Seiichi Uchida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 138 days.

(21) Appl. No.: 14/009,754

(22) PCT Filed: Apr. 13, 2012

(86) PCT No.: PCT/JP2012/002566
§ 371 (c)(1),
(2), (4) Date: Oct. 3, 2013

(87) PCT Pub. No.: WO2012/144174
PCT Pub. Date: Oct. 26, 2012

(65) Prior Publication Data
US 2014/0028937 A1 Jan. 30, 2014

(30) Foreign Application Priority Data
Apr. 20, 2011 (JP) .................. 2011-094356

(51) Int. Cl.
*G09G 3/36* (2006.01)
*G02F 1/1343* (2006.01)
*G02F 1/1362* (2006.01)

(52) U.S. Cl.
CPC .... *G02F 1/134363* (2013.01); *G02F 1/136213* (2013.01); *G09G 3/3655* (2013.01); *G02F 2001/134318* (2013.01); *G02F 2001/134345* (2013.01); *G09G 2300/0426* (2013.01); *G09G 2300/0447* (2013.01); *G09G 2300/0452* (2013.01); *G09G 2300/0465* (2013.01); *G09G 2300/0876* (2013.01); *G09G 2320/028* (2013.01)

(58) Field of Classification Search
CPC ............. G09G 2300/0439; G09G 2300/0814; G09G 2310/0262; G09G 2310/06; G09G 2340/0407; G09G 3/20; G09G 3/3659; G09G 2320/0247; G09G 3/3677
USPC .................................................... 345/87–102
See application file for complete search history.

(56) References Cited

U.S. PATENT DOCUMENTS 6,489,952 B1 * 12/2002 Tanaka et al. ................ 345/205
8,441,425 B2 * 5/2013 Ishitani et al. ................ 345/92

FOREIGN PATENT DOCUMENTS

| JP | 5-53136 A | 3/1993 |
|---|---|---|
| JP | 8-15723 A | 1/1996 |
| JP | 2002-72985 A | 3/2002 |
| JP | 2007-101570 A | 4/2007 |

* cited by examiner

*Primary Examiner* — Duc Dinh
(74) *Attorney, Agent, or Firm* — Chen Yoshimura LLP

(57) ABSTRACT

A liquid crystal display device of the present invention is provided with: an array substrate (10) in which a pixel electrode (41), a TFT (20), and a storage capacitor element (30) are provided for each pixel (P); an opposite substrate (50) in which a plurality of common electrodes (59A, 59B) are provided for each pixel (P); a liquid crystal layer (81); and a driver circuit (4) that dividedly drives the liquid crystal layer (81) of each pixel (P) through each of the common electrodes (59A, 59B) by supplying a predetermined potential to each pixel electrode (41) and supplying different potentials to the respective common electrodes (59A, 59B) in each pixel (P). The liquid crystal display device according to the present invention has improved viewing angle dependency of the gamma characteristics, while increasing the aperture ratio of each pixel.

16 Claims, 30 Drawing Sheets

LIQUID CRYSTAL DISPLAY DEVICE

TECHNICAL FIELD

The present invention relates to a liquid crystal display device, and in particular, to a countermeasure for improving both the viewing angle dependency of gamma characteristics and the pixel aperture ratio.

BACKGROUND ART

It has been known that, in a liquid crystal display device, gamma characteristics have a viewing angle dependency, and as a technology to address this problem, a pixel division structure (also referred to as a multi-pixel structure) is proposed. The gamma characteristics mean a gradation dependency of the display brightness. If the gamma characteristics differ between the front direction and the diagonal direction, the gradation display state also differs depending on the viewing direction, resulting in a problem in displaying images.

In a liquid crystal display device having the pixel division structure, each pixel is constituted of two subpixels, and each pixel electrode is divided into two subpixel electrodes corresponding to the subpixels. The two subpixel electrodes are respectively connected to different thin film transistors (referred to as TFTs below) and to different storage capacitance elements, for example, thereby being driven independently of each other (see Patent Document 1, for example).

In such a liquid crystal display device, different data potentials are supplied to respective two subpixel electrodes constituting each pixel, causing one pixel to have two different levels of brightness with one subpixel being brighter than the other subpixel, such that the brightness to be viewed in each pixel is averaged. This way, the viewing angle dependency of the gamma characteristics is improved.

RELATED ART DOCUMENT

Patent Document

Patent Document 1: Japanese Patent Application Laid-Open Publication No. 2002-72985

SUMMARY OF THE INVENTION

Problems to be Solved by the Invention

However, in a liquid crystal display device having the above-mentioned pixel division structure, it is necessary to provide a TFT and a storage capacitance element to each subpixel electrode, and therefore, one pixel needs to have at least two TFTs and two storage capacitance elements, which is at least twice as many as before. In addition, the number of wiring lines for driving these TFTs and storage capacitance elements also increases. For this reason, the aperture ratio of each pixel is significantly lowered as compared to a liquid crystal display device with a normal structure in which a pixel electrode is not divided. As a result, the brightness of the displayed image is reduced, or as a result of increasing the brightness of the backlight in order to make up for the reduction in brightness, power consumption increases.

The present invention was made in view of the above-mentioned problems, and an object thereof is to increase the aperture ratio of each pixel while improving the viewing angle dependency of the gamma characteristics.

Means for Solving the Problems

In order to achieve the above-mentioned object, in the present invention, a configuration of a common electrode and a driving method therefor have been modified such that each pixel is able to have different levels of brightness without employing a configuration in which each pixel electrode is divided.

Specifically, the first invention is a liquid crystal display device having a display region provided with a plurality of pixels arranged in a prescribed pattern, each of the plurality of pixels being a smallest unit of a displayed image, the liquid crystal display device including: an array substrate in which a pixel electrode, a switching element, and a storage capacitance element is provided for each of the pixels; an opposite substrate disposed to face the array substrate, the opposite substrate having a plurality of common electrodes provided for each of the pixels; a liquid crystal layer disposed between the array substrate and the opposite substrate so as to be interposed between each pixel electrode and a plurality of common electrodes facing the pixel electrode, thereby constituting each of the pixels; and a driver circuit that supplies a prescribed potential to each pixel electrode, the driver circuit supplying different potentials to the respective common electrodes in each of the pixels so that the liquid crystal layer in each of the pixels separated in accordance with the respective common electrodes is separately driven.

In the first invention, a plurality of common electrodes are provided for each pixel, and the respective common electrodes in each pixel are supplied with different potentials, thereby driving the liquid crystal layer separately for each of the common electrodes in each pixel. This way, light transmittance differs between respective portions where the respective common electrodes are disposed in each pixel, and because each pixel has a plurality of different levels of brightness, the gamma characteristics respectively corresponding to the respective levels of brightness are observed in a mixed state, thereby improving the viewing angle dependency of the gamma characteristics. Because the viewing angle dependency of the gamma characteristics can be improved without dividing each pixel electrode as described above, it is possible to eliminate a need to provide each pixel with at least twice as many switching elements and storage capacitance elements as the normal structure. Thus, the aperture ratio of each pixel can be increased as compared with the conventional pixel division structure. As a result, it is possible to increase the aperture ratio of each pixel while improving the viewing angle dependency of the gamma characteristics.

The second invention is the liquid crystal display device of the first invention wherein the plurality of pixels are arranged in a matrix, and wherein, in each of the pixels, the plurality of common electrodes are aligned along a first direction that is one of a row direction or a column direction along which the pixels are arrayed, and each of the plurality of common electrodes is made of the same electrode in a group of pixels that are arrayed along a second direction that is perpendicular to the first direction.

In the second invention, a plurality of common electrodes in each pixel are arranged along the first direction, and each of the plurality of common electrodes in every pixel group made of a plurality of pixels arranged along the second direction perpendicular to the first direction is made of the same electrode. Such common electrodes can be specifically provided by a simple division structure in which a conductive film formed in a portion corresponding to the display region is divided into a plurality of sections vertically or horizontally. Therefore, a photomask used in patterning to form the common electrodes does not have to have a complex light-shielding pattern, and the common electrodes can be formed with ease. As a result, it is possible to prevent a reduction in manufacturing yield of the opposite substrate due to patterning defects in the respective common electrodes.

The third invention is the liquid crystal display device of the second invention, wherein the plurality of common electrodes in the respective pixels are separated from each other in each pixel group including a plurality of the pixels arrayed along the second direction, and wherein the driver circuit conducts line inversion driving in which, in one display frame, respective adjacent common electrodes in pixels that are adjacent to each other along the first direction are supplied with different potentials, and a polarity of the potentials supplied to respective pixel electrodes is inverted for every pixel group made of a plurality of the pixels arrayed along the first direction.

In the third invention, the plurality of common electrodes in the respective pixels are separated from each other in each pixel group including a plurality of pixels arrayed along the second direction, and in addition to the respective common electrodes in each pixel, respective adjacent common electrodes in pixels that are adjacent to each other along the first direction are supplied with different potentials. The respective pixel electrodes are supplied with potentials such that polarities thereof are reversed for every pixel group made of a plurality of pixels arrayed along the first direction through the line inversion driving. When the liquid crystal layer in each pixel is applied with different potentials for the respective common electrodes as described above, in the display region, regions having different light transmittance, or in other words, different levels of brightness, due to the difference in applied voltages, are arranged in a prescribed pattern along the arrangement of the pixels (rows and columns). When there are two common electrodes in each pixel, for example, bright regions having a relatively high brightness and dark regions having a relatively low brightness of the respective pixels are arranged in a checker board pattern in the display region. As a result, as opposed to the case in which adjacent regions in adjacent pixels are both bright regions or dark regions, which causes display unevenness, bright regions and dark regions having different levels of brightness are alternately arranged along the row direction and the column direction in the pixel array, and therefore, the display unevenness can be suppressed in a desired manner.

Also, because the line inversion driving is performed, it is possible to reduce the power consumption as compared with the case in which dot inversion driving is conducted in which polarities of potentials supplied to the respective pixel electrodes are reversed for every one of pixels adjacent to each other in one display frame.

The fourth invention is the liquid crystal display device of the second invention, wherein the plurality of common electrodes in the respective pixels are separated from each other in each pixel group including a plurality of the pixels arrayed along the second direction, and wherein the driver circuit conducts line inversion driving and common inversion driving, thereby reversing a relationship of a pixel electrode and respective common electrodes in each pixel between high and low levels of potentials, to drive the liquid crystal layer separately for each of the common electrodes through AC driving, the line inversion driving being a driving method in which, in one display frame, polarities of potentials supplied to the respective pixel electrodes are inverted for every pixel group made of a plurality of pixels arrayed along the second direction, and, in every display frame, polarities of potentials supplied to the respective pixel electrodes are made opposite to the polarities of the respective pixel electrodes in a last display frame, the common inversion driving being a driving method in which a polarity of a potential supplied to at least one of the common electrodes in each of the pixels is inverted so as to be made opposite to a polarity of a potential supplied to a pixel electrode corresponding to the common electrode in synchronization with polarity inversion for a potential of the pixel electrode.

In the fourth invention, by combining the line inversion driving and the common inversion driving, AC driving is conducted in which pixel electrodes and at least one type of common electrodes in the respective pixels of the same pixel group are synchronized, and polarities thereof are made opposite to each other. In such AC driving, in each pixel, the potential change of the common electrode having the reversed polarity is superimposed on the potential of the pixel electrode, and the difference in potential becomes a voltage for driving the liquid crystal layer in a portion where the common electrode having the reversed polarity is disposed, and therefore, for the inversion driving on the common electrode, the amplitude of the potential signal supplied to each pixel electrode can be reduced. This makes it possible to reduce the power consumption.

Also, it is possible to prevent electrical charges of a DC component from being accumulated in the liquid crystal layer, which is caused by the liquid crystal layer being applied with a positive voltage and a negative voltage of different voltage values. This makes it possible to prevent burn-in from occurring.

The fifth invention is the liquid crystal display device of the second invention, wherein respective adjacent common electrodes of pixels that are adjacent to each other along the first direction are made of the same electrode, and wherein the driver circuit conducts dot inversion driving in which, in one display frame, polarities of potentials supplied to the respective pixel electrodes are inverted for every one of pixels adjacent to each other.

In the fifth invention, different potentials are supplied to the respective common electrodes adjacent to each other in each pixel, and the same potential is supplied to respective adjacent common electrodes in pixels that are adjacent to each other along the first direction. The respective pixel electrodes are supplied with potentials through the dot inversion driving, such that the polarities of potentials supplied to respective adjacent pixels are made opposite to each other. When the liquid crystal layer in each pixel is applied with different potentials for the respective common electrodes as described above, in the display region, as in the third invention, bright regions and dark regions having different levels of brightness due to the difference in applied voltages are arranged in a prescribed pattern along the arrangement of the pixels (rows and columns), and therefore, it is possible to suppress display unevenness in a desired manner.

Because the dot inversion driving is conducted, it is possible to have a higher resistance to flickering noise that causes flickering in the displayed image, as compared with the case in which the line inversion driving is conducted in which polarities of potentials supplied to the respective pixel electrodes are inverted for every pixel group made of a plurality of pixels arrayed along the row direction or the column direction in one display frame.

The sixth invention is the liquid crystal display device of the first invention, wherein a plurality of pixel electrodes are arranged in a matrix, wherein a plurality of common electrodes in each of the pixels are arranged along a first direction that is one of a row direction or a column direction along which the pixels are arrayed, wherein respective common electrodes positioned at respective two ends of each of the pixels are each electrically connected to an adjacent common electrode of a pixel that is adjacent to the pixel along the first direction, wherein, in each of the pixels, other common electrodes than a common electrode positioned at one end of the pixel are each electrically connected to a common electrode positioned one electrode closer to the one end in one of pixels that are adjacent to the pixel along a second direction that is perpendicular to the first direction, and wherein, in each of the pixels, other common electrodes than a common electrode positioned at the other end of the pixel are each electrically connected to a common electrode positioned one electrode closer to the other end in the other of the adjacent pixels along the second direction.

In the sixth invention, adjacent common electrodes in pixels adjacent to each other along the first direction are electrically connected to each other, and in a pixel group made of a plurality of pixels arrayed along the second direction, respective common electrodes are electrically connected to each other with the same positional relationship in which each common electrode is connected to a common electrode positioned one electrode below or above in an adjacent pixel in a diagonal direction relative to the array of pixels. Even when the common electrodes are connected to each other in this manner, it is possible to supply different potentials to the respective common electrodes in each pixel, and therefore, the effects of the present invention can be specifically achieved.

The seventh invention is the liquid crystal display device of the sixth invention, wherein the driver circuit conducts line inversion driving in which, in one display frame, polarities of potentials supplied to the respective pixel electrodes are inverted for every pixel group made of a plurality of pixels arrayed along the second direction.

In the seventh invention, the same potential is supplied to adjacent common electrodes in pixels that are adjacent to each other along the first direction, and different potentials are supplied to adjacent common electrodes in a pixel group made of a plurality of pixels arrayed along the second direction. The respective pixel electrodes are supplied with potentials having polarities thereof reversed for every pixel group made of a plurality of pixels arrayed along the second direction through the line inversion driving. When the liquid crystal layer in each pixel is applied with different potentials for the respective common electrodes as described above, in the display region, as in the third invention, bright regions and dark regions having different levels of brightness due to the difference in applied voltages are arranged in a prescribed pattern along the arrangement of the pixels (rows and columns), and therefore, it is possible to suppress the display unevenness in a desired manner.

Also, because the line inversion driving is performed, it is possible to reduce the power consumption as compared with the case in which dot inversion driving is conducted in which polarities of potentials supplied to the respective pixel electrodes are reversed for every one of pixels adjacent to each other in one display frame.

The eighth invention is the liquid crystal display device of the first invention, wherein the plurality of common electrodes include a first common electrode disposed on one side of each of the pixels, and a second common electrode disposed on the other side of the pixel.

In the eighth invention, common electrodes of each pixel are constituted of two electrodes that are the first common electrode and the second common electrode. With such a configuration also, each pixel is divided into two regions respectively corresponding to where the first common electrode is disposed and where the second common electrode is disposed, and the respective regions have different levels of brightness. Therefore, it is possible to specifically achieve the effects of the present invention.

The ninth invention is the liquid crystal display device of the eighth invention, further including storage capacitance wiring lines extending through the respective pixels, wherein the storage capacitance element is made of a lower electrode connected to one of the storage capacitance wiring lines, a dielectric layer disposed on the lower electrode, and an upper electrode positioned over the lower electrode through the dielectric layer, the upper electrode being connected to the pixel electrode, and wherein, where a potential supplied to the storage capacitance wiring line in each of the pixels in a current display frame is Vcs, a potential supplied to the first common electrode in a current display frame is Vcom1, a potential supplied to the second common electrode in a current display frame is Vcom2, a capacitance of the storage capacitance element is Ccs, a capacitance between the first common electrode and the pixel electrode is Clc1, a capacitance between the second common electrode and the pixel electrode is Clc2, a potential supplied to the storage capacitance wiring line in each of the pixels in a subsequent display frame is Vcs', a potential supplied to the second common electrode in a subsequent display frame is Vcom2', and an absolute value of Vcom1−Vcom2 is v, the driver circuit sets Vcs' and Vcom2' to satisfy the following relationships:

$$Vcs' = Vcs + (2Clc1/Ccs+2) \times v \qquad \text{(Formula 1)}$$

$$Vcom2' = Vcom2 - 2v \times Clc1/Ccs \qquad \text{(Formula 2)}.$$

In the ninth invention, the potential Vcs' of the storage capacitance wiring line and the potential Vcom2' of the second common electrode in the subsequent display frame are set so as to satisfy Formula 1 and Formula 2 above. With such a driving method of a liquid crystal display device, Vcom1 can be kept constant, and therefore, it is possible to reduce the power consumption.

The tenth invention is the liquid crystal display device of the eighth invention, further including storage capacitance wiring lines extending through the respective pixels, wherein the storage capacitance element is made of a lower electrode connected to one of the storage capacitance wiring lines, a dielectric layer disposed on the lower electrode, and an upper electrode positioned over the lower electrode through the dielectric layer, the upper electrode being connected to the pixel electrode, and wherein, where a potential supplied to the storage capacitance wiring line in each of the pixels in a current display frame is Vcs, a potential supplied to the first common electrode in a current display frame is Vcom1, a potential supplied to the second common electrode in a current display frame is Vcom2, a capacitance of the storage capacitance element is Ccs, a capacitance between the first common electrode and the pixel electrode is Clc1, a capacitance between the second common electrode and the pixel electrode is Clc2, a potential supplied to the first common electrode in each of the pixels in a subsequent display frame is Vcom1', a potential supplied to the second common electrode in a subsequent display frame is Vcom2', and an absolute value of Vcom1−Vcom2 is v, the driver circuit sets Vcom1' and Vcom2' to satisfy the following relationships:

$$Vcom1' = Vcom1 - (2Clc1/Ccs+2) \times v \qquad \text{(Formula 3)}$$

$$Vcom2' = Vcom2 - 2v \times Clc1/Ccs \qquad \text{(Formula 4)}.$$

In the tenth invention, the potential Vcom1' of the first common electrode and the potential Vcom2' of the second common electrode in the subsequent display frame are set so as to satisfy Formula 3 and Formula 4 above. With such a driving method of a liquid crystal display device, Vcs can be kept constant, and therefore, it is possible to reduce the power consumption.

The eleventh invention is the liquid crystal display device of any one of the eighth to tenth inventions, wherein each first common electrode is electrically connected to a first terminal disposed outside of the display region on one side, and wherein each second common electrode is electrically connected to a second terminal disposed outside of the display region on the other side.

In the eleventh invention, the respective first common electrodes and the respective second common electrodes are electrically connected to the first terminal and the second terminal, respectively, in an outside region of the display region at the opposite sides thereof. Because the respective first common electrodes and the respective second common electrodes can be electrically connected to different terminals, respectively, with being insulated from each other without using an interlayer insulating film, it is possible eliminate an increase in manufacturing process steps and an increase in cost resulting therefrom, as compared with the case in which an interlayer insulating film is used to insulate the respective common electrodes from each other.

Effects of the Invention

According to the present invention, a plurality of common electrodes are provided for each pixel, and different potentials are supplied to the respective common electrodes in each pixel, thereby driving the liquid crystal layer separately for each of the common electrodes in each pixel. This makes it possible to improve the viewing angle dependency of the gamma characteristics without dividing each pixel electrode, and because it is not necessary to provide each pixel with at least twice as many switching elements and storage capacitance elements as the normal structure, the aperture ratio in each pixel can be increased as compared with the conventional pixel division structure. As a result, it is possible to provide a liquid crystal display device that has high display quality and that can display a bright image with low power consumption.

DETAILED DESCRIPTION OF EMBODIMENTS

Embodiments of the present invention will be described in detail below with reference to drawings. The present invention is not limited to the embodiments below.

Embodiment 1

In Embodiment 1, a transmissive liquid crystal display device S of a TFT type will be explained as an example of an active matrix driving liquid crystal display device.

—Configuration of Liquid Crystal Display Device S—

Figure 1:
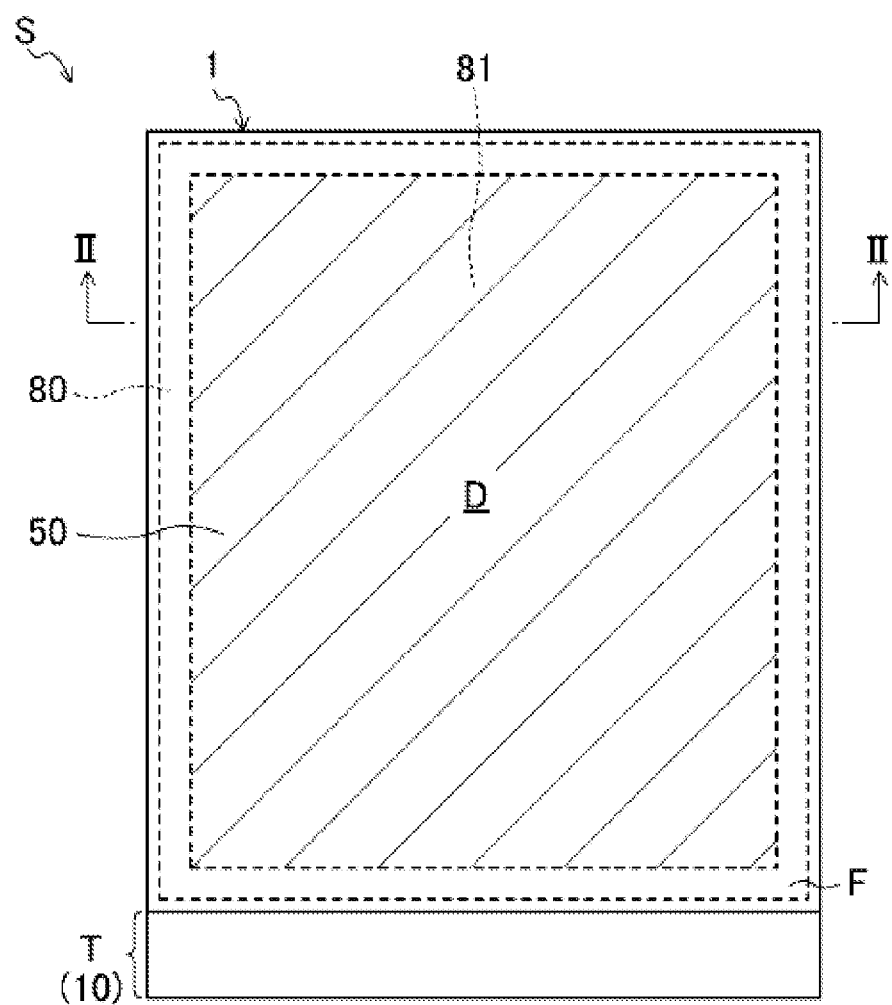
FIG. 1 is a plan view that schematically shows a liquid crystal display device of Embodiment 1.
Figure 2:
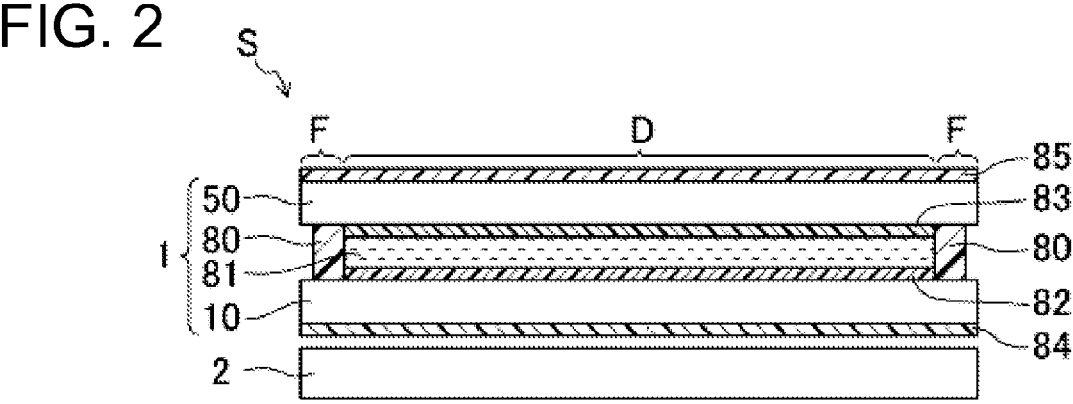
FIG. 2 is a cross-sectional view showing a cross-sectional structure along the line II-II of FIG. 1.

The configuration of the liquid crystal display device S is shown in FIGS. 1 and 2. FIG. 1 is a schematic plan view of the liquid crystal display device S. FIG. 2 is a schematic cross-sectional view showing a cross-sectional structure along the line II-II of FIG. 1. A polarizing plate 85 shown in FIG. 2 is not shown in FIG. 1.

The liquid crystal display device S includes a flat plate-shaped thin liquid crystal display panel 1 and a backlight unit 2 disposed on the rear side of the liquid crystal display panel 1.

<Overall Configuration of Liquid Crystal Display Panel 1>

The liquid crystal display panel 1 includes an array substrate 10 and an opposite substrate 50 disposed to face each other, a frame-shaped sealing member 80 that bonds respective outer edges of the array substrate 10 and the opposite substrate 50 to each other, and a liquid crystal layer 81 surrounded by the sealing member 80, thereby being sealed between the array substrate 10 and the opposite substrate 50.

This liquid crystal display panel 1 has a display region D that is in a rectangular shape, for example, for displaying an image. The display region D is a region inside the sealing member 80 where the array substrate 10 and the opposite substrate 50 face each other, or in other words, a region where the liquid crystal layer 81 is disposed. The liquid crystal display panel 1 also has, around the display region D, a frame region F that is a non-display region in a rectangular frame shape, for example.

At one side of the frame region F (lower side of FIG. 1), a terminal region T is disposed where the array substrate 10 protrudes beyond the opposite substrate 50 and is exposed to the outside. In this terminal region T, wiring substrates (not shown) such as FPCs (flexible printed circuits) are mounted through an anisotropic conductive film (ACF). The liquid crystal display panel 1 receives display signals that include image data corresponding to an image to be displayed from an external circuit (display control circuit 9 described below) through these wiring substrates.

The array substrate 10 and the opposite substrate 50 are formed in a rectangular shape, for example, and alignment films 82 and 83 are respectively disposed on inner surfaces facing each other. On the respective outer surfaces, polarizing plates 84 and 85 are disposed. The polarizing plate 84 on the array substrate 10 and the polarizing plate 85 on the opposite substrate 50 have transmission axes differing 90° from each other. The liquid crystal layer 81 is made of a nematic liquid crystal material that has electrooptic characteristics, for example.

<Circuit Configuration of Liquid Crystal Display Panel 1>

Figure 3:
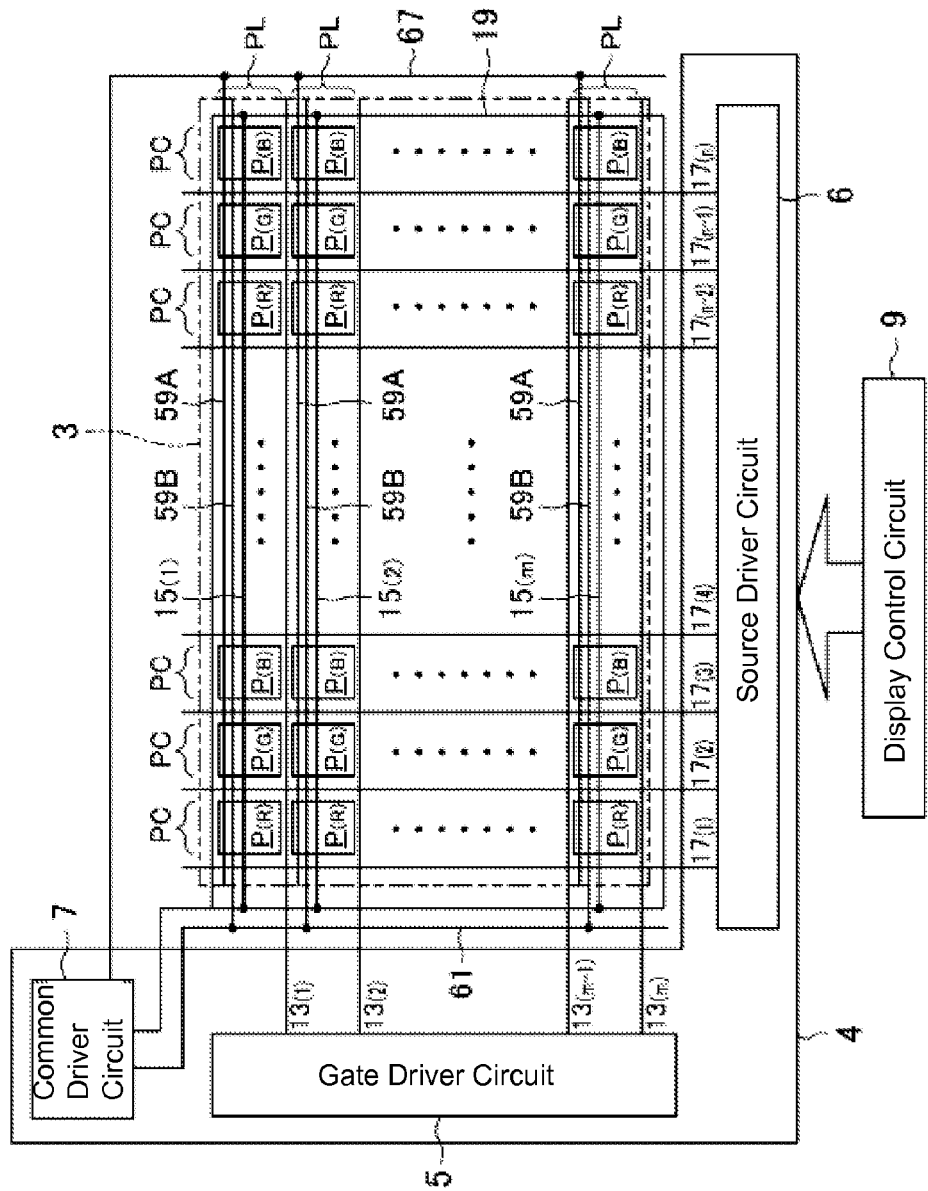
FIG. 3 is a block diagram that schematically shows a circuit configuration of a liquid crystal display panel.

FIG. 3 is a block diagram showing a schematic circuit configuration of the liquid crystal display panel 1.

The liquid crystal display panel 1 includes a pixel array 3, a driver circuit 4, a plurality of gate wiring lines 13(1) to 13(m), a plurality of storage capacitance wiring lines 15(1) to 15(m), a plurality of source wiring lines 17(1) to 17(n), and common wiring lines 19, 61, and 67. Here, "m" and "n" are integers, and when the liquid crystal display panel 1 is a full high vision panel, for example, "m"=1080, and "n"=5760. Below, the gate wiring lines 13(1) to 13(m) are simply referred to as the gate wiring lines 13 collectively, the storage capacitance wiring lines 15(1) to 15(m) are simply referred to as the storage capacitance wiring lines 15 collectively, and the source wiring lines 17(1) to 17(n) are simply referred to as the source wiring lines 17 collectively.

The pixel array 3 has a plurality of pixels P, each of which is the smallest unit of a displayed image, arranged in a matrix, thereby constituting the display region D. In the pixel array 3, the pixels P are arranged such that three colors of red (R), green (G), and blue (B) are repeatedly arranged along the row direction (horizontal direction in FIG. 3), and pixels P of the same color are arranged along the column direction (vertical direction in FIG. 3), forming a striped pattern. Three pixels P(R), P(G), and P(B) constitute one constituent element of a displayed image.

The pixel array 3 has a plurality of pixel rows PL, each of which is a group of a plurality of pixels P aligned along the row direction (horizontal direction in FIG. 3) of the pixel array 3, and a plurality of pixel columns PC, each of which is a group of a plurality of pixels P aligned along the column direction of the pixel array 3. In the present embodiment, the column direction of the pixel array 3 is the first direction of the present invention, and the row direction of the pixel array 3 is the second direction of the present invention.

In the present embodiment, the respective pixels P of the three colors are arranged in a striped pattern, but the main point of the present application is not affected even if the pixels P of the three colors are arranged in other patterns such as a delta pattern or a mosaic pattern (diagonal pattern).

The driver circuit 4 includes a gate driver circuit 5 that drives the respective gate wiring lines 13, a source driver circuit 6 that drives the respective source wiring lines 17, and a common driver circuit 7 that drives the respective storage capacitance wiring lines 15 and common electrodes 59A and 59B described below.

The respective gate wiring lines 13 extend along the row direction of the pixel array 3, and respective one ends thereof are connected to the gate driver circuit 5. The respective source wiring lines 17 extend along the column direction of the pixel array 3, and respective one ends thereof are connected to the source driver circuit 6. The storage capacitance wiring lines 15 are disposed for the respective gate wiring lines 13 and extend along the corresponding gate wiring lines 13, and with both ends thereof being connected to the common wiring line 19 disposed in the periphery of the pixel array 3 (display region D), the respective storage capacitance wiring lines 15 are connected to the common driver circuit 7 through the common wiring line 19.

The gate driver circuit 5 includes a shift register and an output circuit for outputting selection pulses, and applies selection pulses to the respective gate wiring lines 13 sequentially. The source driver circuit 6 includes a sampling circuit for outputting data potentials corresponding to display signals inputted into the liquid crystal display panel 1, a level shifter, and a shift register, and supplies data potentials to the respective source wiring lines 17 at the same time.

The common driver circuit 7 includes an output circuit for outputting a common potential, and supplies the same common potential to all of the storage capacitance wiring lines 15. The driver circuit 4 provided with these gate driver circuit 5, source driver circuit 6, and common driver circuit 7 is connected through the wiring substrates to the display control circuit 9 provided on a separate substrate.

Figure 4:
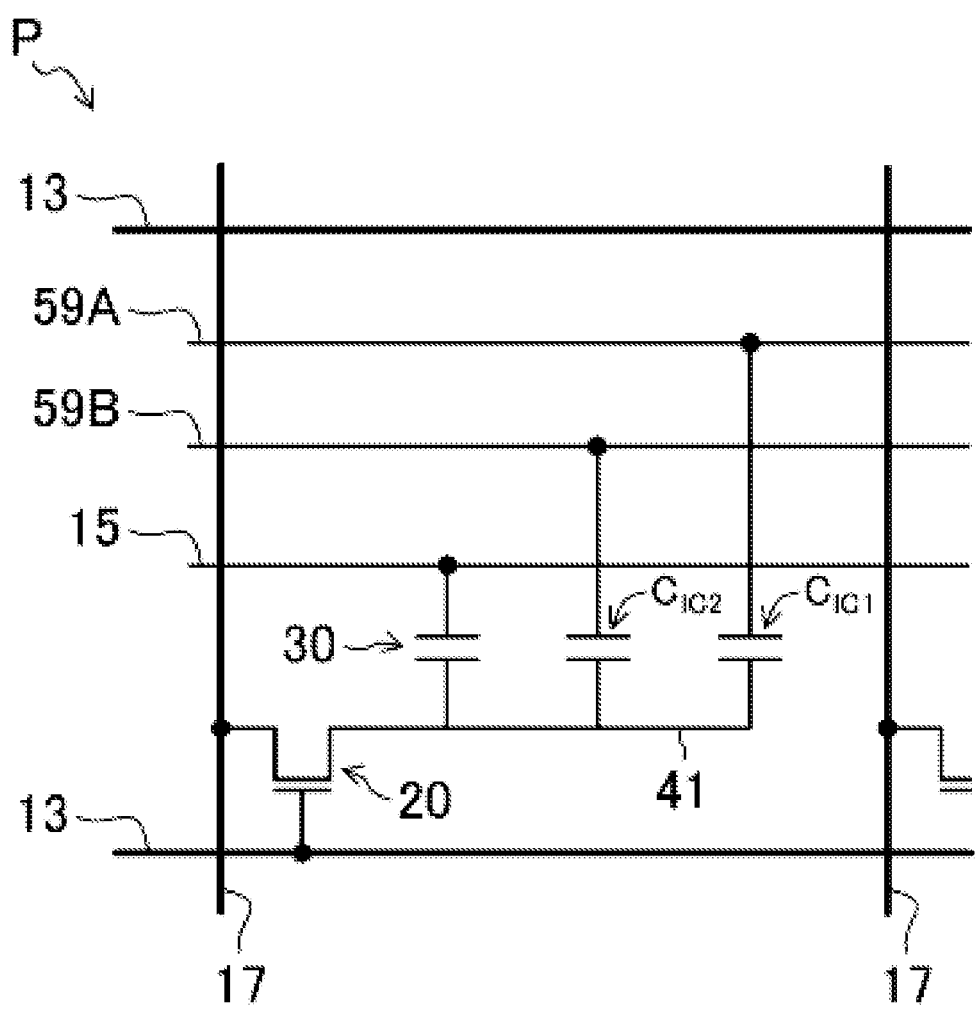
FIG. 4 is an equivalent circuit diagram showing a circuit configuration of one pixel.

FIG. 4 shows an equivalent circuit diagram of one pixel P. A configuration in which the common electrodes 59A and 59B and liquid crystal capacitances Clc1 and Clc2 have been removed from FIG. 4 is an equivalent circuit diagram for one pixel P in the array substrate 10.

Each pixel P includes a TFT 20 that is a switching element, a storage capacitance element 30 that holds a data potential inputted through the TFT 20, a pixel electrode 41 connected to the storage capacitance element 30 and having the data potential inputted through the TFT 20 written therein, and the common electrodes 59A and 59B that respectively form the liquid crystal capacitances Clc1 and Clc2 with the pixel electrode 41.

Each pixel P of the liquid crystal display panel 1 of the present embodiment employs a characteristic pixel division structure for improving the viewing angle dependency of the display characteristics (gamma characteristics).

That is, as opposed to the conventional pixel division structure in which each pixel electrode is divided, in the pixel division structure of the present embodiment, a common electrode is divided, and each pixel P has two common electrodes that are independent of each other, which are the first common electrode 59A and the second common electrode 59B. As shown in FIG. 3, the first common electrode 59A and the second common electrode 59B of the present embodiment extend in parallel with each other along the row direction of the pixel array 3. Respective one ends thereof are connected to different common wiring lines 61 and 67, and the first common electrodes 59A and the second common electrodes 59B are connected to the common driver circuit 7 through the respective common wiring lines 61 and 67.

In the liquid crystal display device S having such a pixel circuit configuration, the gate driver circuit 5 and the source driver circuit 6 are configured to conduct dot inversion driving in which, in one display frame, polarities of data potentials supplied to the respective pixel electrodes 41 are inverted between respective adjacent pixels P, based on the display signals inputted from the display control circuit 9, and the polarities of data potentials supplied to the respective pixel electrodes 41 are inverted from what they were in the previous display frame.

The common driver circuit 7 is configured to conduct common inversion driving in which, based on the display signals inputted from the display control circuit 9, different common potentials are supplied to the respective first common electrodes 59A and the respective second common electrodes 59B, and the polarity of the common potential supplied to at least either the respective first common electrodes 59A or the respective second common electrodes 59B is made opposite to that in the previous display frame in synchronization with the polarity inversion of the potentials of the corresponding pixel electrodes 41.

With the display driving in which the dot inversion driving by the gate driver circuit 5 and the source driver circuit 6 and the common inversion driving by the common driver circuit 7 are combined, in every display frame, the driver circuit 4 reverses a relationship of the potential of the pixel electrodes 41 and those of the first common electrodes 59A and the second common electrodes 59B between high and low levels in each pixel P, to drive the liquid crystal layer separately for each of the common electrodes 59A and 59B through AC driving.

More specifically, for example, the driver circuit 4 is configured to set Vcs' and Vcom2' so as to satisfy the relationships represented by Formula 1 and Formula 2 below, where the potential supplied to the storage capacitance wiring line 15 in each pixel P in the current display frame is Vcs, the potential supplied to the first common electrode 59A in the current display frame is Vcom1, the potential supplied to the second common electrode 59B in the current display frame is Vcom2, the capacitance of the storage capacitance element 30 is Ccs, the capacitance between the first common electrode 59A and the pixel electrode 41 is Clc1, and the capacitance between the second common electrode 59B and the pixel electrode 41 is Clc2, the potential supplied to the storage capacitance wiring line 15 in each pixel P in the subsequent display frame is Vcs', the potential supplied to the second common electrode 59B in the subsequent display frame is Vcom2', and the absolute value of Vcom1−Vcom2 is v:

$$Vcs'=Vcs+(2Clc1/Ccs+2)\times v \qquad \text{(Formula 1)}$$

$$Vcom2'=Vcom2-2v\times Clc1/Ccs \qquad \text{(Formula 2)}.$$

With such a driving method of the liquid crystal display device S, the Vcom1 can be kept constant. This makes it possible to reduce the power consumption of the liquid crystal display device S. Thus, the common driver circuit 7 of the present embodiment is configured to supply a constant potential to each first common electrode 59A in the common inversion driving, while supplying to each second common electrode 59B an AC potential of the binary logic level of high or low based on the potential supplied to each first common electrode 59A.

<Configuration of Array Substrate 10>

Figure 5:
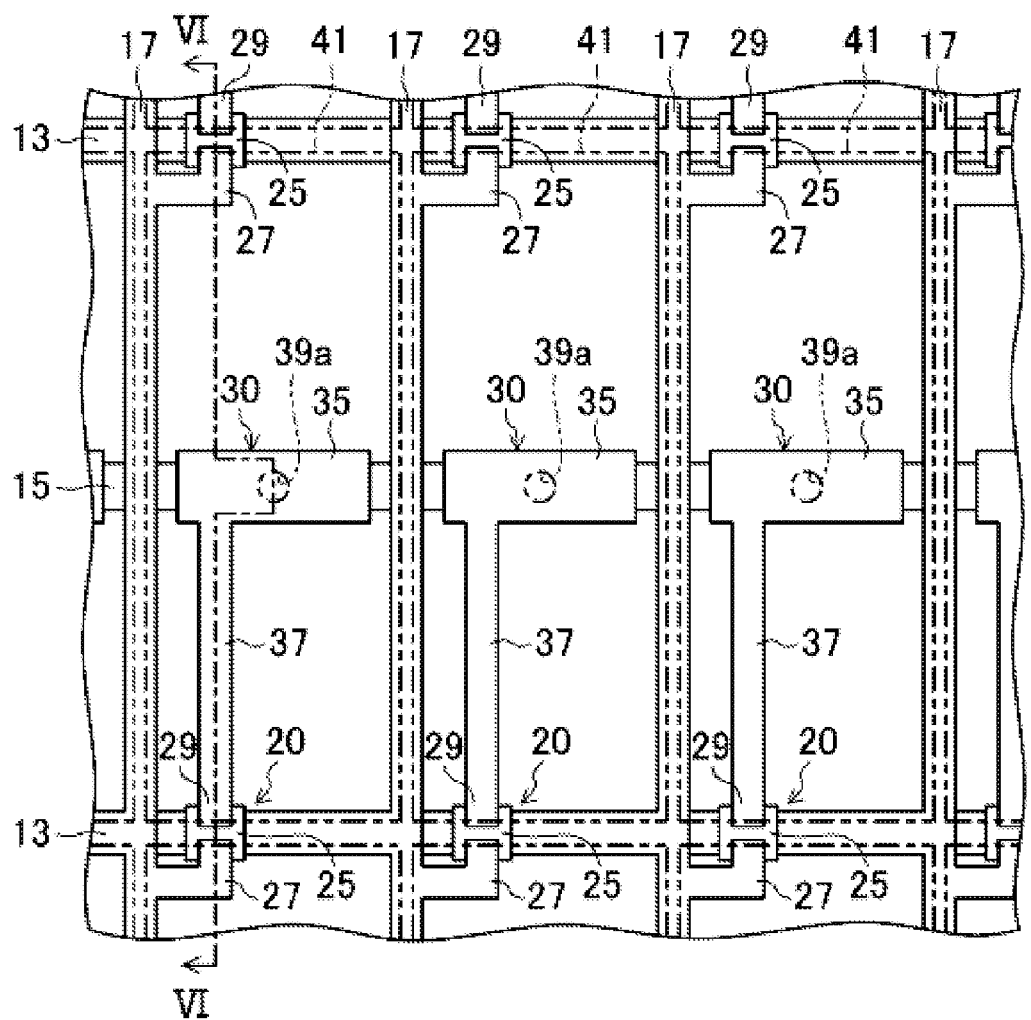
FIG. 5 is a plan view showing a specific configuration of respective pixels in an array substrate.
Figure 6:
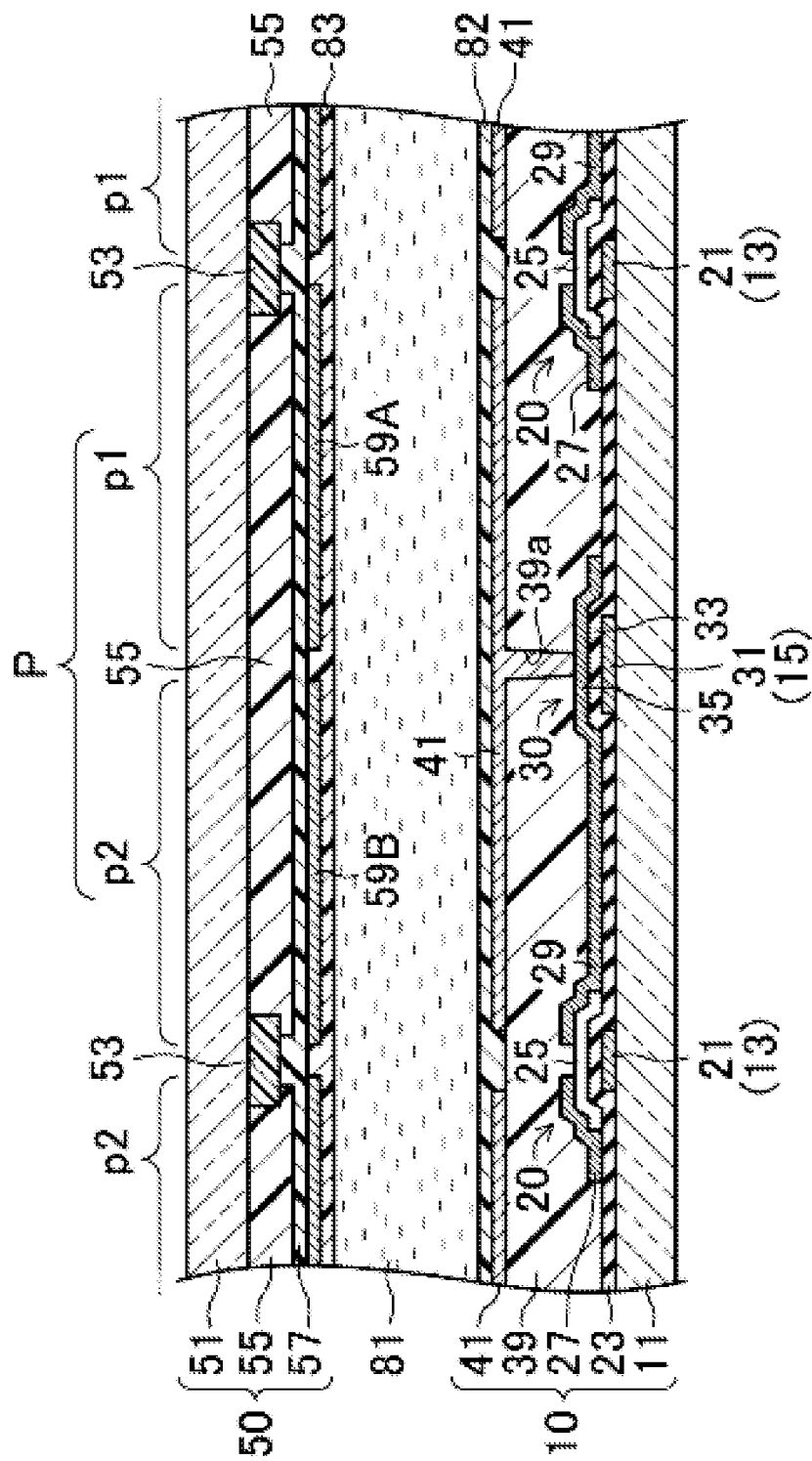
FIG. 6 is a cross-sectional view showing a cross-sectional structure of the liquid crystal display panel along the line VI-VI of FIG. 5.

FIG. 5 is a plan view showing a specific configuration of the respective pixels P in the array substrate 10. FIG. 6 is a cross-sectional view showing a cross-sectional structure of the liquid crystal display panel 1 along the line VI-VI of FIG. 5.

The array substrate 10 includes, as a base substrate, a transparent insulating substrate 11 such as a glass substrate shown in FIG. 6. On the insulating substrate 11, as shown in FIG. 5, the plurality of gate wiring lines 13, the plurality of storage capacitance wiring lines 15, the plurality of source wiring lines 17, the plurality of TFTs 20, the plurality of storage capacitance elements 30, and the plurality of pixel electrodes 41 (shown with the two-dot chain line in the figure) are provided.

The plurality of gate wiring lines 13 are formed so as to extend in parallel with each other along the row direction (horizontal direction in FIG. 5) of the pixel array 3. The gate wiring lines 13 are formed by depositing a titanium (Ti) layer, an aluminum (Al) layer, and a titanium (Ti) layer in this order, for example. The plurality of source wiring lines 17 are formed so as to extend in parallel with each other along the column direction (vertical direction in FIG. 5) of the pixel array 3. The source wiring lines 17 are also formed by depositing a titanium (Ti) layer, an aluminum (Al) layer, and a titanium (Ti) layer in this order, for example. The gate wiring lines 13 and the source wiring lines 17 are insulated from each other through a gate insulating film 23, which will be described below, and are formed in a grid pattern as a whole so as to partition the respective pixels P.

The respective storage capacitance wiring lines 15 are provided in the respective pixel rows PL, and each storage capacitance wiring line extends across the center portions of the respective pixels P constituting the corresponding pixel row PL. The storage capacitance wiring lines 15 have a multilayer structure (Ti/Al/Ti, for example) similar to that of the gate wiring lines 13, for example.

As shown in FIG. 6, each of the TFTs 20 has a bottom gate structure, and includes a gate electrode 21 disposed on the insulating substrate 11, the gate insulating film 23 disposed to cover the gate electrode 21, a semiconductor layer 25 disposed over the gate electrode 21 through the gate insulating film 23, and a source electrode 27 and a drain electrode 29 connected to the semiconductor layer 25 and having a distance from each other.

The gate electrode 21 is formed of a part of a corresponding gate wiring line 13. The gate insulating film 23 is formed by depositing a silicon nitride (SiNx) film and a silicon oxide ($SiO_2$) film in this order, for example. The source electrode 27 is a part of a corresponding source wiring line 17, protruding to the right side of FIG. 5, and is connected to the semiconductor layer 25 at the lower side thereof in FIG. 5. The drain electrode 29 is formed of the same film as the source electrode 27, and is connected to the semiconductor layer 25 at the upper side of FIG. 5 so as to face the source electrode 27.

The semiconductor layer 25 is made of an oxide semiconductor such as indium gallium zinc oxide, for example. Thus, each TFT 20 has excellent characteristics of high mobility, high reliability, and low OFF current.

Although the semiconductor layer 25 of each TFT 20 is made of an oxide semiconductor such as indium gallium zinc oxide in the present embodiment, the semiconductor layer 25 is not limited to such. The semiconductor layer 25 may be made of other oxide semiconductors such as zinc oxide (ZiO), zinc tin oxide (ZTO), strontium titanate ($SrTiO_2$), indium oxide ($In_2O_2$), and copper aluminum oxide ($CuAlO_2$). The semiconductor layer 25 may also be formed of a polysilicon (p-Si), amorphous silicon (a-Si), or the like, instead of an oxide semiconductor.

As shown in FIG. 6, the respective storage capacitance elements 30 each have a lower electrode 31 disposed on the insulating substrate 11 and covered by the gate insulating film 23, a dielectric layer 33 made of a portion of the gate insulating film 23 corresponding in position to the lower electrode 31, and an upper electrode 35 disposed over the lower electrode 31 through the dielectric layer 33, and a storage capacitance in accordance with the permittivity of the dielectric layer 33 is formed between the lower electrode 31 and the upper electrode 35.

The lower electrode 31 is formed of a portion of a storage capacitance wiring line 15 that goes across the corresponding pixel P. As shown in FIG. 5, the upper electrode 35 extends from the drain electrode 29 of the corresponding pixel P to an area above the lower electrode 31 through a wiring portion 37, and is formed integrally with the drain electrode 29 and the wiring portion 37.

In the storage capacitance element 30 having such a configuration, the dielectric layer 33 is constituted of a relatively thin gate insulating film 23, and therefore, it is possible to provide a desired capacity with a smaller area than the case in which the dielectric layer 33 is constituted of a thicker insulating film such as an interlayer insulating film 39 described below, for example, which contributes to an improvement in aperture ratio of the pixel P.

As shown in FIG. 6, the respective TFTs 20 and storage capacitance elements 30 are covered by the interlayer insulating film 39 formed over substantially the entire surface of the substrate, the interlayer insulating film 39 being made of an acrylic organic resin material. On the interlayer insulating film 39, the pixel electrodes 41 are formed. In the interlayer insulating film 39, a contact hole 39a is formed in a position corresponding to each upper electrode 35 so as to reach the electrode 35, and through the contact hole 39a, each pixel electrode 41 is connected to the upper electrode 35.

As shown in FIG. 5, each of the pixel electrodes 41 covers a portion of the TFT 20 and the storage capacitance element 30 through the interlayer insulating film 39, and is formed to have a large area to cover the entire pixel P such that the outer edges thereof overlap through the interlayer insulating film 39 the gate wiring lines 13 and the source wiring lines 17 that surround the corresponding pixel P. The respective pixel electrodes 41 are each made of a transparent conductive oxide such as indium tin oxide (referred to as ITO below) or indium zinc oxide (referred to as IZO below), for example.

<Configuration of Opposite Substrate 50>

Figure 7:
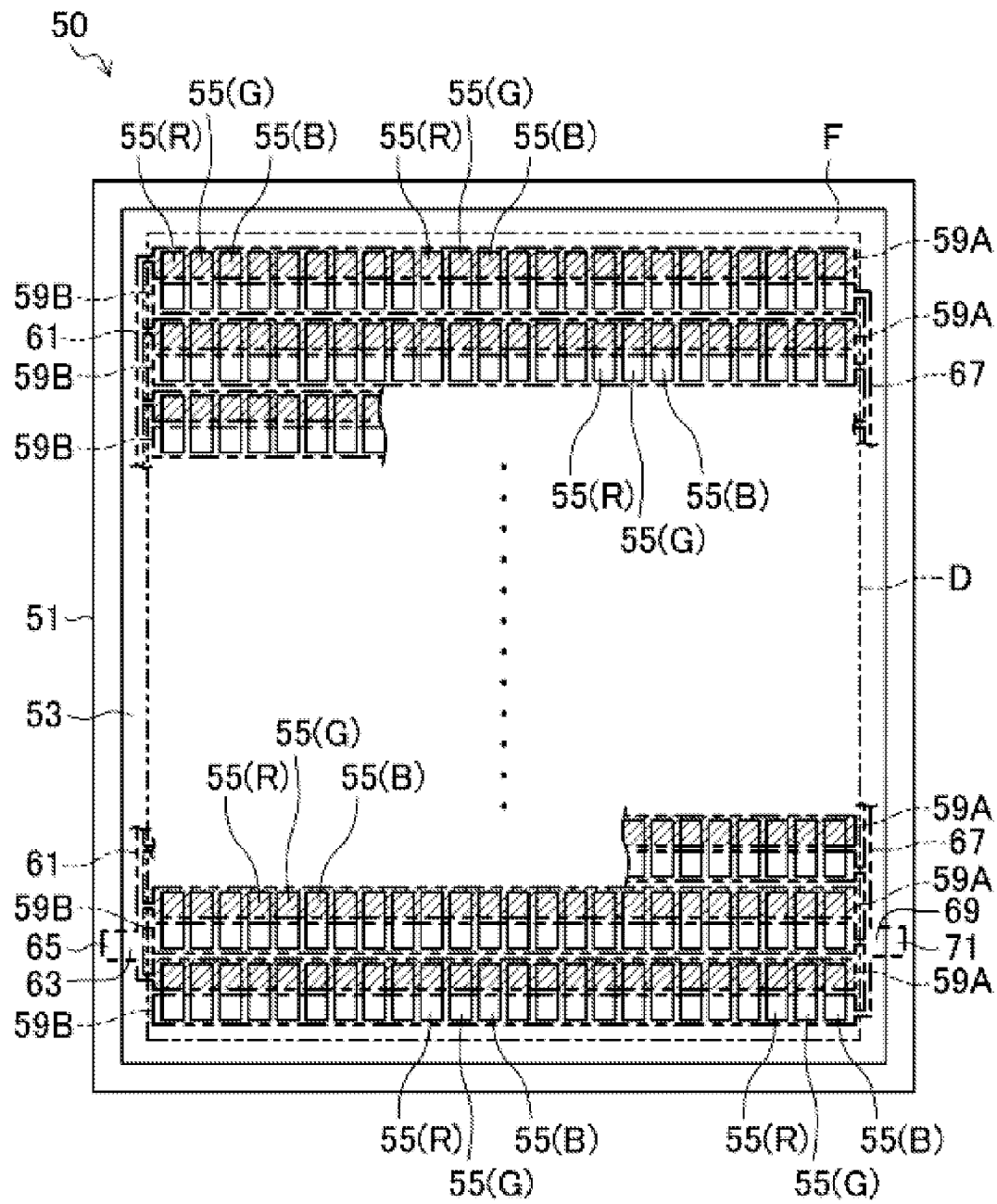
FIG. 7 is a plan view that schematically shows an opposite substrate of Embodiment 1.
Figure 8:
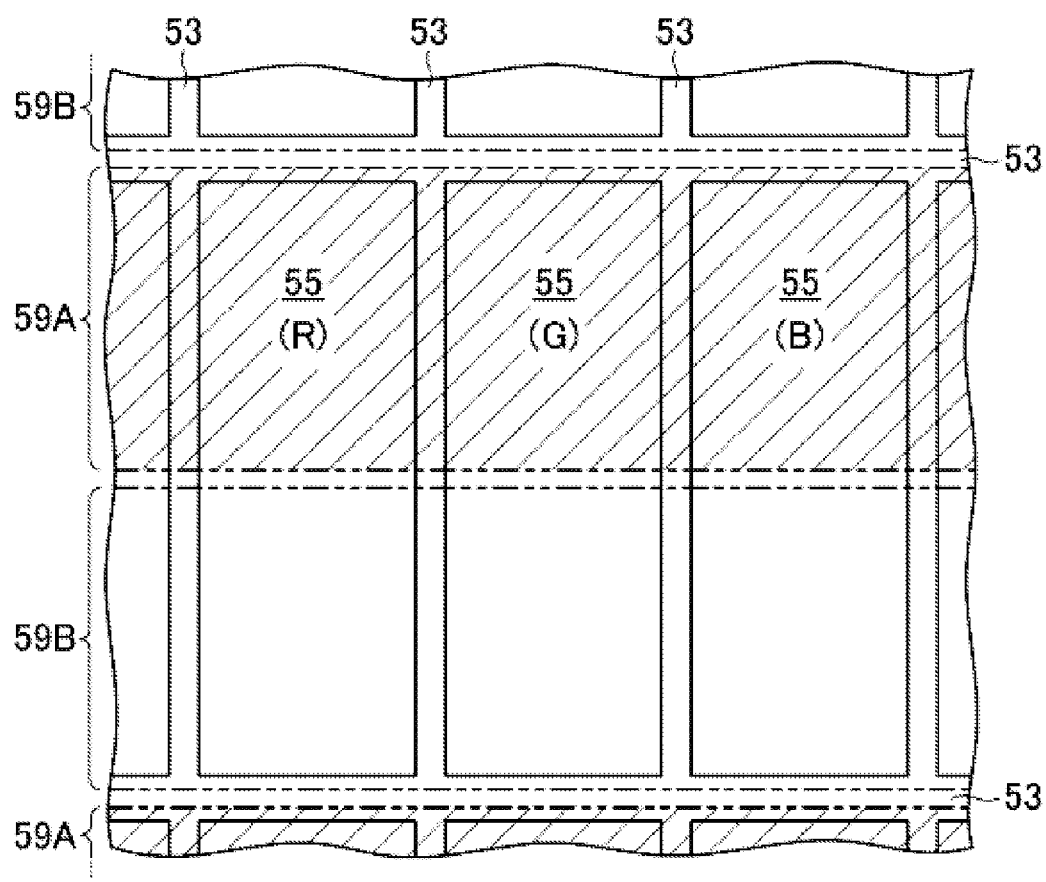
FIG. 8 is a plan view corresponding to FIG. 5, showing a specific configuration of respective pixels of the opposite substrate of Embodiment 1.

FIGS. 7 and 8 show the configuration of the opposite substrate 50. FIG. 7 is a schematic plan view of the opposite substrate 50. FIG. 8 is a plan view corresponding to FIG. 5, showing a specific configuration of the respective pixels P in the opposite substrate 50.

The opposite substrate 50 includes, as a base substrate, a transparent insulating substrate 51 such as a glass substrate shown in FIG. 6. Provided on the insulating substrate 51 are a black matrix 53 formed in a grid pattern corresponding to the respective gate wiring lines 13 and the respective source wiring lines 17, color filters 55 of a plurality of colors formed in the respective grids of the black matrix 53 and including red layers (R), green layers (G), and blue layers (B) arranged in a repeated pattern for the pixels P of the respective colors (R, G, and B), and an overcoat layer 57 disposed to cover these black matrix 53 and color filters 55.

As shown in FIG. 7, on this overcoat layer 57, the above-mentioned first common electrodes 59A (electrodes shown with a two-dot chain line and hatching in the figure; this applies to the figures below) and second common electrodes 59B (electrodes shown with a two-dot chain line without hatching in the figure; this applies to the figures below).

The first common electrodes 59A and the second common electrodes 59B are respectively formed in a narrow rectangular shape (line shape when viewed from further away) that extends along the row direction (horizontal direction of FIG. 7) of the pixel array 3, and a plurality of first common electrodes 59A and second common electrodes 59B are arranged in an alternating manner in the column direction (vertical direction in FIG. 7) of the pixel array 3. A set of a first common electrode 59A and a second common electrode 59B is provided for each pixel row PL so as to be separated from each other, and in each pixel P (a portion corresponding to each color filter 55), the first common electrode 59A and the second common electrode 59B are arranged along the column direction of the pixel array 3. The first common electrode 59A is disposed on the upper side of each pixel P in FIG. 8, and the second common electrode 59B is disposed on the lower side of each pixel P in FIG. 8, for example. The first common electrodes 59A and the second common electrodes 59B in the respective pixels P of each pixel row PL are respectively formed of the same electrodes.

Such first common electrodes 59A and second common electrodes 59B can be specifically realized by a simple division structure in which a conductive film formed in a position corresponding to the display region D is divided vertically or horizontally into a plurality of sections. Therefore, a photomask used in patterning to form these electrodes does not need to have a complex light-shielding pattern, and therefore, these electrodes can be formed with ease. This makes it possible to prevent patterning defects of the first common electrodes 59A and the second common electrodes 59B, and as a result, a reduction in manufacturing yield for the opposite substrate 50 caused by patterning defects can be avoided.

With the first common electrodes 59A and the second common electrodes 59B, each pixel P is divided into two subpixels p1 and p2. That is, as shown in FIG. 6, each pixel P is constituted of a first subpixel p1 where the first common electrode 59A is formed, and a second subpixel p2 where the second common electrode 59B is formed. The first subpixels p1 and the second subpixels p2 are respectively arranged along the row direction in each pixel row PL, and are arranged alternately in each pixel column PC (see FIG. 10 described below). The respective first common electrodes 59A and second common electrodes 59B are made of a transparent conductive oxide such as ITO or IZO, for example.

One end of each first common electrode 59A (left side in FIG. 7) is led out from the common electrode 59A to one side (left side in FIG. 7) of the frame region F, and the respective one ends are bundled by being connected to the same first common wiring line 61 that extends in the column direction of the pixel array 3. In other words, all of the first common electrodes 59A are electrically connected to each other through the first common wiring line 61.

The first common wiring line 61 has an extension part 63 that protrudes to the outside of the frame region F. An end of the extension part 63 forms a first terminal 65. The first terminal 65 is electrically connected to the common driver circuit 7 provided on the array substrate 10 through so-called common transfer using a conductive paste such as a silver paste or a carbon paste as a common transfer member, for example.

On the other hands, the other end (right side in FIG. 7) of each second common electrode 59B is led out from the common electrode 59B to an opposing side (right side in FIG. 7) of the frame region F to the side to which the first common electrodes 59A are led out, and in a manner similar to above, the respective other ends are bundled by being connected to the same second common wiring line 67 that extends in the column direction of the pixel array 3. The second common wiring line 67 also has an extension part 69 that protrudes to the outside of the frame region F. An end of the extension part 69 forms a second terminal 71. This second terminal 71 is also electrically connected to the common driver circuit 7 through common transfer.

As described above, the first common electrodes 59A and second common electrodes 59B are electrically connected to the first terminal 65 and the second terminal 71, respectively, at portions of the frame region F opposing each other across the display region D, thereby being insulated from each other without using an interlayer insulating film. This makes it possible to avoid an increase in manufacturing process steps and a cost increase resulting therefrom, as compared with the case in which an interlayer insulating film is used to make the respective first common electrodes 59A and the respective second common electrode 59B insulated from each other.

<Configuration of Backlight Unit 2>

Although not shown in the figure, the backlight unit 2 has a light source such as an LED (light-emitting diode) or a cold cathode tube, a light guide plate, and a plurality of optical sheets such as a diffusion sheet or a prism sheet, and is configured such that light entering the light guide plate from the light source is outputted as even planar light toward the liquid crystal display panel 1 from an output surface of the light guide plate through the respective optical sheets.

—Display Operation of Liquid Crystal Display Device S—

Next, the display operation of the liquid crystal display device S having the above-mentioned configuration will be explained.

In the liquid crystal display device S, based on the display signals inputted from the display control circuit 9, a gate signal is outputted from the gate driver circuit 5 to the respective gate wiring lines 13 in a line-sequential manner, thereby driving the gate wiring lines 13 sequentially, and when the TFTs 20 connected to the same gate wiring line 13 that is being driven are turned on, source signals are sent to the respective TFTs 20 in the ON state at the same time from the source driver circuit 6 through the respective source wiring lines 17. As a result, prescribed charges are written into the pixel electrodes 41 of the corresponding pixels P through the respective TFTs 20, and the respective storage capacitance elements 30 are charged.

This selective charge writing operation for the pixel electrodes 41 is conducted on all of the pixel rows PL of the pixel array 3 in a line-sequential manner, or in other words, all of the rows of pixels P that constitute the display region D. At the same time, prescribed common potentials different from each other are supplied to each first common electrode 59A and each second common electrode 59B, respectively.

This way, in each pixel P, a difference in potential is caused between the pixel electrode 41 and the first common electrode 59A and between the pixel electrode 41 and the second common electrode 59B, thereby applying a prescribed voltage to the liquid crystal layer 81 in each pixel P. In the liquid crystal display device S, different common potentials are supplied to each first common electrode 59A and each second common electrode 59B, respectively, and therefore, voltages applied to the liquid crystal layer 81 are made to differ between the first subpixel p1 and the second subpixel p2 in each pixel P, thereby driving the liquid crystal layer 81 in the first subpixel p1 and the liquid crystal layer 81 in the second subpixel p2 separately in each pixel P.

When the respective TFTs 20 are in the OFF state, electrical charges (storage capacitance) charged into each storage capacitance element 30 prevent the electrical charges written into the corresponding pixel electrode 41 from being reduced. In the liquid crystal display device S, the orientation state of the liquid crystal molecules is made to differ between the first subpixel p1 and the second subpixel p2 in each pixel P by changing the sizes of the voltages applied to the liquid crystal layer 81, which allows the transmittance of light from the backlight unit 2 at the liquid crystal layer 81 to be adjusted in each of the subpixels p1 and p2 of each pixel P. As a result, an image is displayed.

Figure 9:
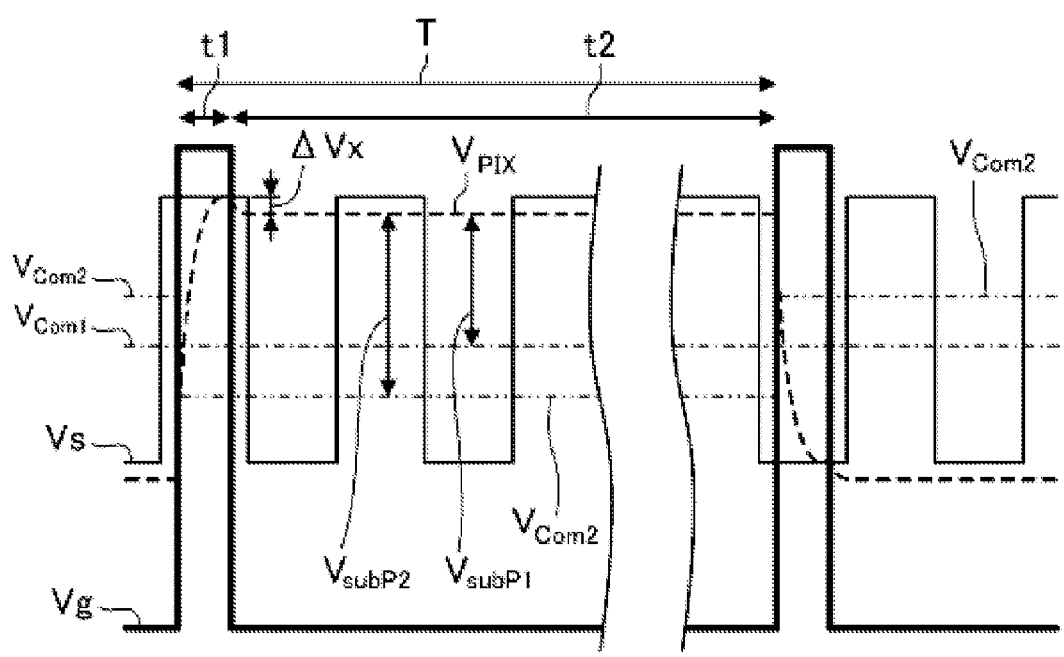
FIG. 9 is a timing chart showing driving potential waveforms of a liquid crystal display device.

FIG. 9 is a timing chart of driving voltage waveforms for one pixel P in one display frame in the liquid crystal display device S.

In FIG. 9, Vg is a potential supplied to the gate wiring line 13, Vs is a potential supplied to the source wiring line 17, Vcom1 is a potential supplied to the first common electrode 59A, Vcom2 is a potential supplied to the second common electrode 59B, VPIX is a potential supplied to the pixel electrode 41, VsubP1 is a voltage applied to the liquid crystal layer 81 in the first subpixel p1, and VsubP2 is a voltage applied to the liquid crystal layer 81 in the second subpixel p2.

FIG. 9 shows a case in which the potential Vcom2 that was supplied to the second common electrode 59B in the last display frame was high, and the potential VPIX that was supplied to the pixel electrode 41 in the last display frame was a negative potential.

In the display operation of the liquid crystal display device S, a writing period t1 and a retention period t2 are provided in each display frame period T.

The writing period t1 is a period in which a data potential is written into each pixel electrode 41 and each storage capacitance element 30. Because the writing operation is conducted on the respective pixels P in a line-sequential manner, the writing period t1 for the respective pixel rows PL in the pixel array 3 is set so as not to overlap each other. Therefore, the writing period t1 starts at a different timing in each pixel row PL.

During the writing period t1, a gate wiring line 13 is selected and driven, and the potential thereof is set to high. This turns the TFTs 20 on, and as a result, electrical charges corresponding to data potentials outputted to the source wiring lines 17 are written into the respective pixel electrodes 41 and are charged into the respective storage capacitance elements 30 through the respective TFTs 20. On the other hand, the first common electrode 59A maintains a constant potential Vcom1, and the potential Vcom2 supplied to the second common electrode 59B is set to low from high.

Next, the retention period t2 is started. During the retention period t2, the potential of the gate wiring line 13 is set to low. Because this turns the TFTs 20 off, the pixel electrodes 41 and the storage capacitance elements 30 are separated from the source wiring lines 17. At this time, the potential VPIX of each pixel electrode 41 is slightly reduced by a voltage $\Delta V_x$ as a result of an effect of a parasitic capacitance formed between the pixel electrode 41 and the gate wiring lines 13, but thereafter, the pixel electrode 41 maintains the potential VPIX as written. On the other hand, during the retention period t2, the first common electrode 59A maintains a constant potential Vcom1, and the potential Vcom2 of the second common electrode 59B is maintained low.

During the retention period t2, by the respective electrodes 41, 59A, and 59B having the above-mentioned potential states, a relatively low voltage VsubP1 corresponding to the difference in potential therebetween is applied to the liquid crystal layer 81 in the first subpixel p1, or in other words, between the first common electrode 59A and the pixel electrode 41, and a relatively high voltage VsubP2 corresponding to the difference in potential is applied to the liquid crystal layer 81 in the second subpixel p2, or in other words, between the second common electrode 59B and the pixel electrode 41.

As described above, in each pixel P, by driving the liquid crystal layer 81 in the first subpixel p1 separately from that in the second subpixel p2, the light transmittance of each pixel P is made to differ between the first subpixel p1 and the second subpixel p2. Therefore, each pixel P has two different levels of brightness therein, and the gamma characteristics corresponding to the respective levels of brightness are observed in a mixed state. This makes it possible to improve the viewing angle dependency of the gamma characteristics.

By continuously conducting the display frame period T having the writing period t1 and the retention period t2 as described above, an image is displayed.

In such a display operation, the dot inversion driving is performed in which, in each display frame, the respective pixel electrodes 41 are supplied with potentials having polarities inverted for every one of adjacent pixels P, and the polarities of date potentials supplied to the respective pixel electrodes 41 are made opposite to what they were in the last display frame. This way, the relationship of the potentials of the pixel electrode 41 and those of the first common electrode 59A and the second common electrode 59B in each pixel P is reversed between high and low levels, thereby causing an AC voltage to be applied to the liquid crystal layer 81 in the first subpixels p1 and in the second subpixels p2.

With this dot inversion driving, the potentials of the respective pixel electrodes 41 in adjacent pixels P are made opposite to each other, and therefore, it is possible to achieve a higher resistance to flickering noise, which can prevent flickering on a displayed image, as compared to when line inversion driving is conducted in which the polarities of potentials to be supplied to the respective pixel electrodes 41 are inverted for every pixel row PL or every pixel column PC.

Through the common inversion driving, the respective second common electrodes 59B are supplied with potentials having a polarity that is opposite to what it was in the last display frame in synchronization with the potential polarity inversion for the corresponding pixel electrodes 41.

Figure 10:
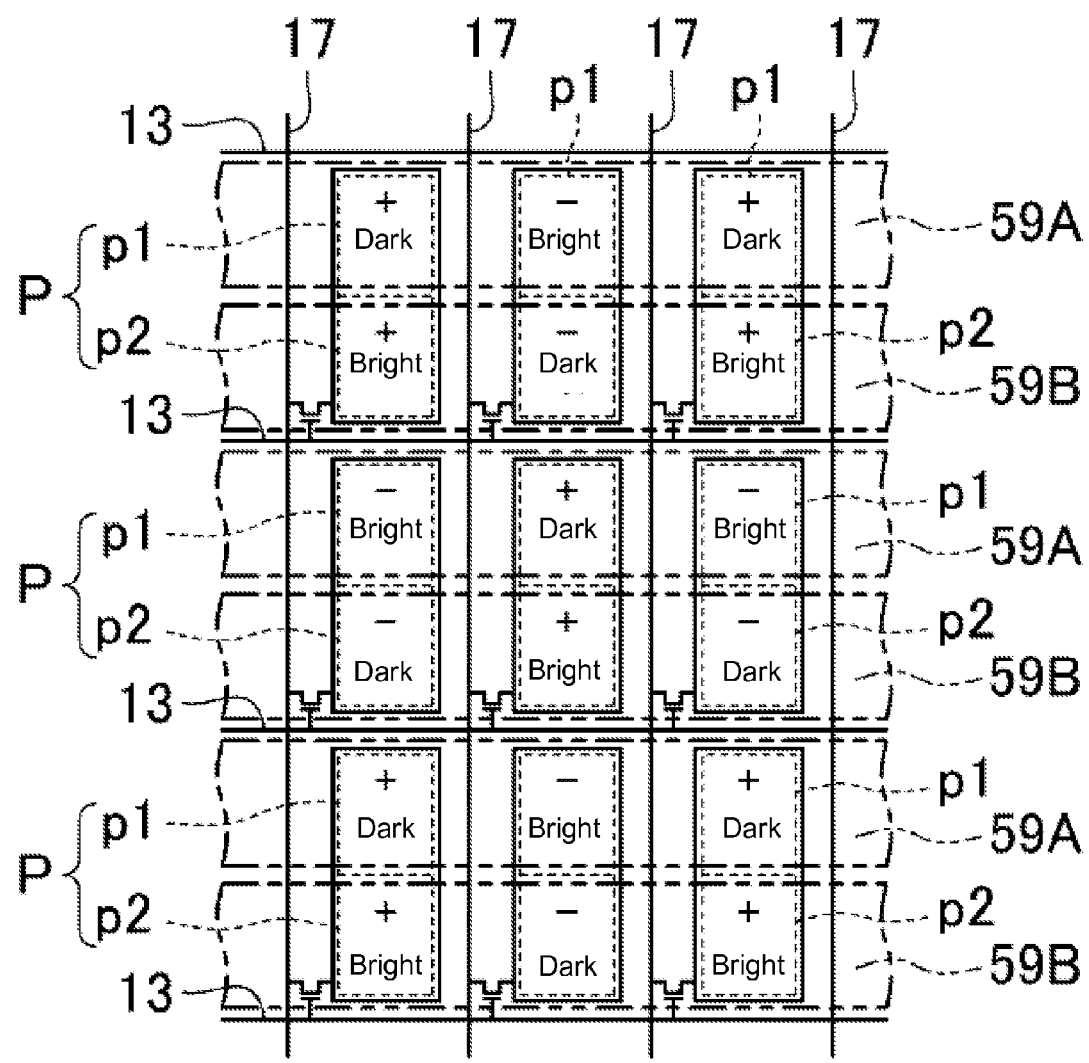
FIG. 10 is a plan view schematically showing an arrangement of bright regions and dark regions in one display frame when conducting a display operation in the liquid crystal display device of Embodiment 1.

FIG. 10 is a schematic plan view showing an arrangement of bright regions and dark regions in the respective pixels P in one display frame during the display operation of the liquid crystal display device S in which the dot inversion driving and the common inversion driving are combined.

In FIG. 10, among the respective pixels P, pixels P labeled with "+" are pixels P in which the pixel electrodes 41 are supplied with a positive potential, and pixels P labeled with "−" are pixels P in which the pixel electrodes 41 are supplied with a negative potential. In the respective pixels P, subpixels p1 and p2 labeled with "bright" are bright subpixels that become bright regions having a relatively high brightness, and subpixels p1 and p2 labeled with "dark" are dark subpixels that become dark regions having a relatively low brightness. This applies to other figures that will be described below.

In the liquid crystal display device S of the present embodiment, in one display frame, different common potentials are respectively supplied to the first common electrode 59A and the second common electrode 59B adjacent to each other in each pixel P and to the first common electrode 59A and the second common electrode 59B adjacent to each other in respective adjacent pixels P along the column direction (vertical direction in FIG. 10) of the pixel array 3. The respective pixel electrodes 41 are supplied with data potentials through the above-mentioned dot inversion driving, such that the polarities of data potentials are reversed for every one of adjacent pixels P in one display frame.

This way, one of the first subpixel p1 and the second subpixel p2 in each pixel P becomes a bright subpixel, and the other becomes a dark subpixel. Furthermore, in this display state, in a pair of adjacent first subpixels p1 and a pair of adjacent second subpixels p2 in each pixel row PL, one becomes a bright subpixel and the other becomes a dark subpixel, and bright subpixels and dark subpixels are arranged alternately along the row direction of the pixel array 3.

In such a display state, as compared with the case in which respective two first subpixels p1 and respective two subpixels p2 adjacent to each other in each pixel row PL are both bright subpixels or dark subpixels, display unevenness can be suppressed, and a smooth image can be displayed.

In the present embodiment, a configuration in which the liquid crystal display device S is driven by a driving method that can maintain the potential Vcom1 at a constant level, the potential Vcom1 being supplied from the driver circuit 4 to the respective first common electrodes 59A, is described as an example, but the present invention is not limited to such.

For example, the driver circuit 4 may be configured to set the potentials Vcom1' and Vcom2' supplied respectively to the first common electrode 59A and the second common electrode 59B of each pixel P in the subsequent display frame so as to satisfy the relationships of Formula 3 and Formula 4 below:

$$Vcom1'=Vcom1-(2Clc1/Ccs+2)\times v \qquad \text{(Formula 3)}$$

$$Vcom2'=Vcom2-2v\times Clc1/Ccs \qquad \text{(Formula 4)}.$$

With this driving method for the liquid crystal display device S, it is possible to keep the potential Vcs supplied to the storage capacitance wiring lines 15 at a constant level, and as a result, the power consumption can be reduced. Various other driving methods can also be adopted.

—Manufacturing Method for Liquid Crystal Display Device S—

Next, an example of the manufacturing method for the liquid crystal display device S will be explained.

In the present embodiment, a single panel manufacturing method will be explained as an example in which a single array substrate 10 and a signal opposite substrate 50 are manufactured separately, and a single liquid crystal display panel 1 is created by bonding these substrates 10 and 50. However, the liquid crystal display panel 1 may also be manufactured by a mother glass manufacturing method in which a mother panel including a plurality of cell units is created, and the mother panel is divided into each cell unit, thereby manufacturing a plurality of liquid crystal display panels 1 at the same time.

The manufacturing method of the liquid crystal display device S includes an array substrate making process, an opposite substrate making process, a bonding process, a backlight unit making process, and a module process.

<Array Substrate Making Process>

First, on an insulating substrate 11 such as a glass substrate that is prepared in advance, a metal multilayer film is formed by depositing a titanium film (approximately 30 nm thick), an aluminum film (approximately 200 nm thick), and a titanium film (approximately 100 nm thick), for example, in this order by sputtering. By patterning this metal multilayer film by photolithography, respective gate wiring lines 13 and respective storage capacitance wiring lines 15 are formed.

Next, on the substrate on which the gate wiring lines 13 and the storage capacitance wiring lines 15 are formed, a silicon nitride film (approximately 325 nm thick) and a silicon oxide film (approximately 50 nm thick), for example, are deposited in this order by chemical vapor deposition (referred to as CVD below), thereby forming a gate insulating film 23 having these film layered.

Next, on the substrate on which the gate insulating film 23 is formed, a semiconductor film (approximately 50 nm thick) made of an oxide semiconductor of indium gallium zinc oxide, for example, is deposited by sputtering. By patterning this semiconductor film by photolithography, each semiconductor layer 25 is formed.

On the substrate on which the semiconductor layers 25 are formed, a metal multilayer film is formed by depositing a titanium film (approximately 30 nm thick), an aluminum film (approximately 200 nm thick), and a titanium film (approximately 100 nm thick), for example, in this order by sputtering. By patterning this metal multilayer film by photolithography, source wiring lines 17, source electrodes 27, drain electrodes 29, and upper electrodes 35 are respectively formed, and at the same time, TFTs 20 and storage capacitance elements 30 are respectively formed.

Next, on the substrate on which the source wiring lines 17, the source electrodes 27, and the drain electrodes 29 are formed, a first insulating film (approximately 300 nm thick) made of a silicon oxide film, for example, is formed by the CVD method. Thereafter, by coating the substrate with an organic insulating material of an acrylic base having a photosensitivity, for example, by a spin-coating method or a slit-coating method, a second insulating film is formed to planarize the surface of the substrate.

By conducting an exposure process using a photomask that has a prescribed light-shielding pattern and a developing process on the second insulating film, a second interlayer insulating film having holes is formed, each of the holes being a part of each contact hole 39a. Furthermore, by patterning the first insulating film by using the second interlayer insulating film as a mask, the first insulating film is provided with holes, each of which is connected to a hole in the second interlayer insulating film and reaches the upper electrode 35 of the storage capacitance element 30.

Next, on the substrate on which the interlayer insulating film 39 is formed, a transparent conductive film (approximately 100 nm thick) made of ITO or IZO, for example, is formed by sputtering. By patterning this transparent conductive film by photolithography, respective pixel electrodes 41 are formed.

Thereafter, the substrate on which the pixel electrodes 41 are formed is coated with a phenol novolak photosensitive resin of a positive type by a spin-coating method or a slit-coating method. The coating film is patterned by conducting an exposure process using a photomask that has a prescribed light-shielding pattern and a developing process, thereby forming photospacers.

The array substrate 10 can be made in the above-mentioned manner.

<Opposite Substrate Making Process>

First, an insulating substrate 51 such as a glass substrate that is prepared in advance is coated with a photosensitive resin colored black, for example, by a spin-coating method or a slit-coating method. The coating film is patterned by conducting an exposure process using a photomask that has a prescribed light-shielding pattern and a developing process, thereby forming a black matrix 53.

Next, the substrate on which the black matrix 53 is formed is coated with a negative type acrylic photosensitive resin colored red, green, or blue, for example. The coating film is patterned by conducting an exposure process using a photomask that has a prescribed light-shielding pattern and a developing process, thereby forming colored layers of a selected color (red layers, for example). By repeating a similar process, colored layers of the other two colors (green layers and blue layers, for example) are formed, thereby forming respective color filters 55.

Next, the substrate on which the color filters 55 are formed is coated with a transparent poly-acrylate insulating resin, for example, by a spin-coating method or a slit-coating method, thereby forming an insulating film (approximately 200 nm thick), and by patterning the insulating film by photolithography as necessary, an overcoat layer 57 is formed. The surface of the overcoat layer 57 is cleaned by ashing in order to improve the adhesion with common electrodes 59A and 59B, which will be formed later.

Thereafter, on the substrate on which the overcoat layer 57 is formed, a transparent conductive film made of ITO, IZO, or the like, for example, is formed by sputtering. By patterning the transparent conductive film by photolithography, respective first common electrodes 59A and respective second common electrodes 59B are formed.

The opposite substrate 50 can be made in the above-mentioned manner.

<Bonding Process>

First, an alignment film is formed on the surface of each of the array substrate 10 and opposite substrate 50 by a printing method or the like, and thereafter, a rubbing process is conducted as necessary. Next, a sealing member 80 made of a UV curable resin is drawn in a frame shape by a dispenser or the like on the surface of the array substrate 10 or the opposite substrate 50, and a prescribed amount of a liquid crystal material is dripped onto a region inside the sealing member 80.

Thereafter, the array substrate 10 and the opposite substrate 50 are attached to each other through the sealing member 80 and the liquid crystal material under a reduced pressure, thereby forming a liquid crystal layer 81. Next, the attached body is placed under an atmospheric pressure, thereby applying a pressure to respective surfaces of the attached body. In this state, the sealing member 80 is cured through UV radiation, thereby bonding the array substrate 10 and the opposite substrate 50 to each other, and a liquid crystal display panel 1 is made. Thereafter, polarizing plates 84 and 85 are respectively bonded onto outer surfaces of the array substrate 10 and the opposite substrate 50.

<Backlight Unit Making Process>

A light guide plate is manufactured by forming an acryl resin plate that is a base of the light guide plate by a known projection forming apparatus or the like, and forming a dot pattern, for example, on the acryl resin plate for diffusing light. Next, optical sheets such as a diffusion sheet and a prism sheet are attached to the light guide plate. Thereafter, by attaching a light source such as an LED or a cold cathode tube to the assembled body of the light guide plate and the optical sheets, a backlight unit 2 is made.

<Module Process>

Wiring substrates such as FPCs are mounted onto a terminal section T of the liquid crystal display panel 1 through an anisotropic conductive film. The backlight unit 2 is installed on the rear surface side of the liquid crystal display panel 1 having the wiring substrates mounted thereon. This way, the liquid crystal display panel 1 and the backlight unit 2 are assembled into a module.

The liquid crystal display device S shown in FIGS. 1 and 2 can be manufactured through the above-mentioned processes.

—Effects of Embodiment 1—

According to Embodiment 1, each pixel P is provided with a first common electrode 59A and a second common electrode 59B, and different common potentials are respectively supplied to the first common electrode 59A and the second common electrode 59B in each pixel P, thereby driving the liquid crystal layer 81 in the first subpixel p1 separately from that in the second subpixel p2 in each pixel P. As a result, the viewing angle dependency of the gamma characteristics can be improved without dividing the pixel electrode 41. This way, a need to provide at least two TFTs 20 and two storage capacitance elements 30 in each pixel P can be eliminated, and for the extra elements that can be omitted, the aperture ratio of each pixel P can be improved as compared with the conventional pixel division structure. As a result, it is possible to achieve a liquid crystal display device S that has high display quality and that can display a bright image with low power consumption.

Modification Example 1 of Embodiment 1

In Embodiment 1, the gate driver circuit 5 and the source driver circuit 6 were configured to conduct the dot inversion driving, but in this modification example, the gate driver circuit 5 and the source driver circuit 6 are configured to conduct V line inversion driving (column inversion driving) in which, in one display frame, polarities of data potentials supplied to the respective pixel electrodes 41 are inverted for every pixel column PC, based on the display signals inputted from the display control circuit 9.

Figure 11:
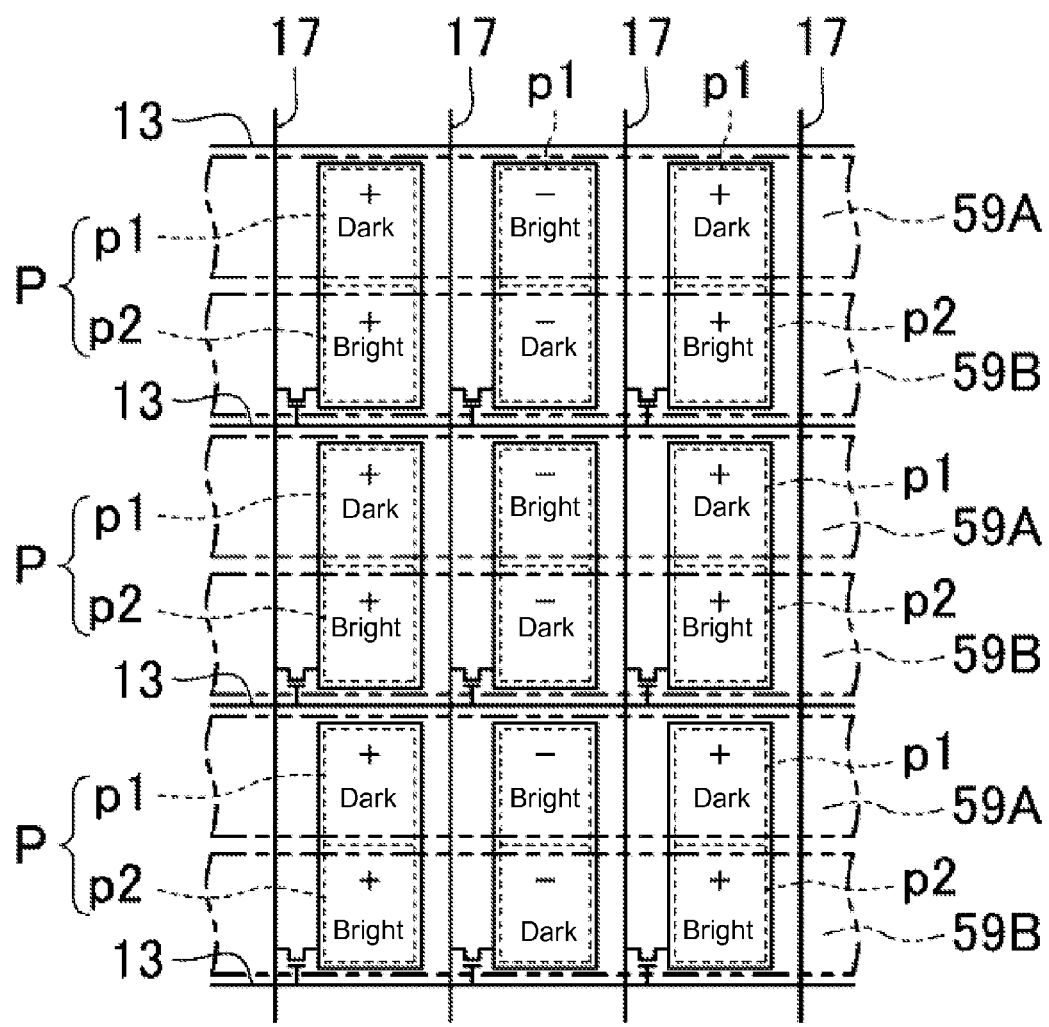
FIG. 11 is a plan view schematically showing an arrangement of bright regions and dark regions in one display frame when conducting a display operation in a liquid crystal display device of Modification Example 1 of Embodiment 1.

FIG. 11 shows a schematic plan view showing an arrangement of bright subpixels (bright regions) and dark subpixels (dark regions) of the respective pixels P in one display frame in a display operation of the liquid crystal display device S in which the V line inversion driving and the common inversion driving are combined.

In the liquid crystal display device S of this modification example, in one display frame, different common potentials are respectively supplied to the first common electrode 59A and the second common electrode 59B adjacent to each other in each pixel P and to the first common electrode 59A and the second common electrode 59B in pixels P adjacent to each other along the column direction (vertical direction in FIG. 11) of the pixel array 3. The respective pixel electrodes 41 are supplied with data potentials through the above-mentioned V line inversion driving, such that the polarities of data potentials are reversed for every pixel column PC in one display frame.

This way, in the first subpixel p1 and the second subpixel p2 in each pixel P, one becomes a bright subpixel and the other becomes a dark subpixel. Furthermore, in a pair of adjacent first subpixels p1 and a pair of adjacent second subpixels p2 along each pixel row PL, and in a pair of a first subpixel p1 and a second subpixel p2 adjacent to each other in each pixel column PC, one becomes a bright subpixel and the other becomes a dark subpixel. Therefore, in this display state, bright subpixels and dark subpixels are arranged in a checkerboard pattern in the display region D.

With such a display state, display unevenness can be minimized, and it is possible to display a smooth and clear image, unlike the case in which respective adjacent two first subpixels p1 and respective adjacent two second subpixels p2, or a first subpixel p1 and a second subpixel p2 adjacent to each other, are both dark subpixels or bright subpixels.

Modification Example 2 of Embodiment 1

In this modification example, the gate driver circuit 5 and the source driver circuit 6 are configured to conduct H line inversion driving (row inversion driving) in which, in one display frame, polarities of data potentials supplied to the respective pixel electrodes 41 are inverted for every pixel row PL, based on the display signals inputted from the display control circuit 9.

Although not shown in the figure, the second common electrodes 59B in alternate pixel rows PL, or in other words, the second common electrodes 59B in odd-numbered pixel rows PL and the second common electrodes 59B in even-numbered pixel rows PL, are connected to different second common wiring lines 67 respectively extend along one side of the frame region F, and are thereby connected to different second terminals 71.

The led-out portions of the second common electrodes 59B in the odd-numbered rows and the second common wiring line 67 to which the respective second common electrodes 59B in the even-numbered rows are connected are insulated from each other, and the led-out portions of the second common electrodes 59B in the even-numbered rows and the second common wiring line 67 to which the respective second common electrodes 59B in the odd-numbered rows are connected are insulated from each other, respectively, through an interlayer insulating film provided at the respective intersections.

The common driver circuit 7 is configured to conduct common inversion driving in which a constant common potential is supplied to the respective first common electrodes 59A while the respective second common electrodes 59B are each supplied with a potential having a polarity opposite to what it was in the last display frame and that is opposite to the polarity of the potential of the corresponding pixel electrode 41, in synchronization with the potential polarity inversion for the pixel electrodes 41, based on the display signals from the display control circuit 9.

Figure 12:
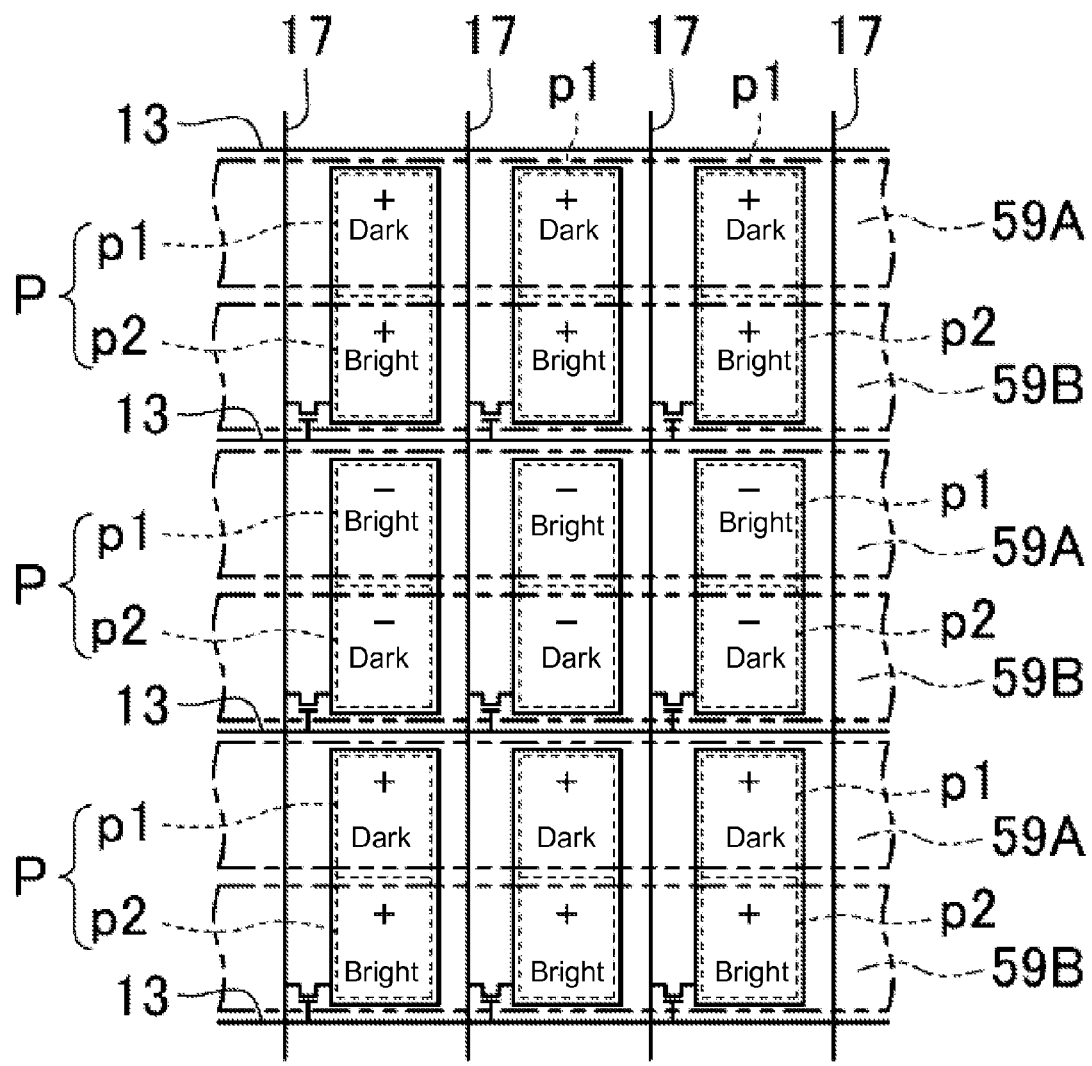
FIG. 12 is a plan view schematically showing an arrangement of bright regions and dark regions in one display frame when conducting a display operation in a liquid crystal display device of Modification Example 2 of Embodiment 1.

FIG. 12 shows a schematic plan view showing an arrangement of bright subpixels (bright regions) and dark subpixels (dark regions) of the respective pixels P in one display frame in a display operation of the liquid crystal display device S in which the H line inversion driving and the common inversion driving are combined.

In the liquid crystal display device S of this modification example, in one display frame, different common potentials are respectively supplied to the first common electrode 59A and the second common electrode 59B adjacent to each other in each pixel P and in respective adjacent pixels P along the column direction (vertical direction in FIG. 12) of the pixel array 3. The respective pixel electrodes 41 are supplied with data potentials through the above-mentioned H line inversion driving, such that the polarities of data potentials are reversed for every pixel row PL in one display frame.

With this driving method, one of the first subpixel p1 and the second subpixel p2 in each pixel P becomes a bright subpixel and the other becomes a dark subpixel, and therefore, each pixel P has two different levels of brightness therein, and the gamma characteristics corresponding to the respective levels of brightness are observed in a mixed state. As a result, the viewing angle dependency of the gamma characteristics is improved.

In Modification Example 2, by combining the H line inversion driving and the common inversion driving, AC driving is conducted in which the pixel electrode 41 and the second common electrode 59B in each pixel P in each pixel row PL are synchronized and driven to have opposite polarities to each other.

In such AC driving, in each pixel P, the potential change of the second common electrode 59B is superimposed on the potential of the pixel electrode 41, and because the difference in potential becomes a voltage to drive the liquid crystal layer 81 in the second subpixel p2, the amplitude of the potential signal supplied to each pixel electrode 41 can be made smaller. As a result, the power consumption of the liquid crystal display device S can be reduced.

Furthermore, it is possible to prevent electrical charges of a DC component from being accumulated in the liquid crystal layer 81 due to the liquid crystal layer 81 being applied with a positive voltage and a negative voltage of different voltage values. This makes it possible to prevent burn-in from occurring.

Modification Example 3 of Embodiment 1

Figure 13:
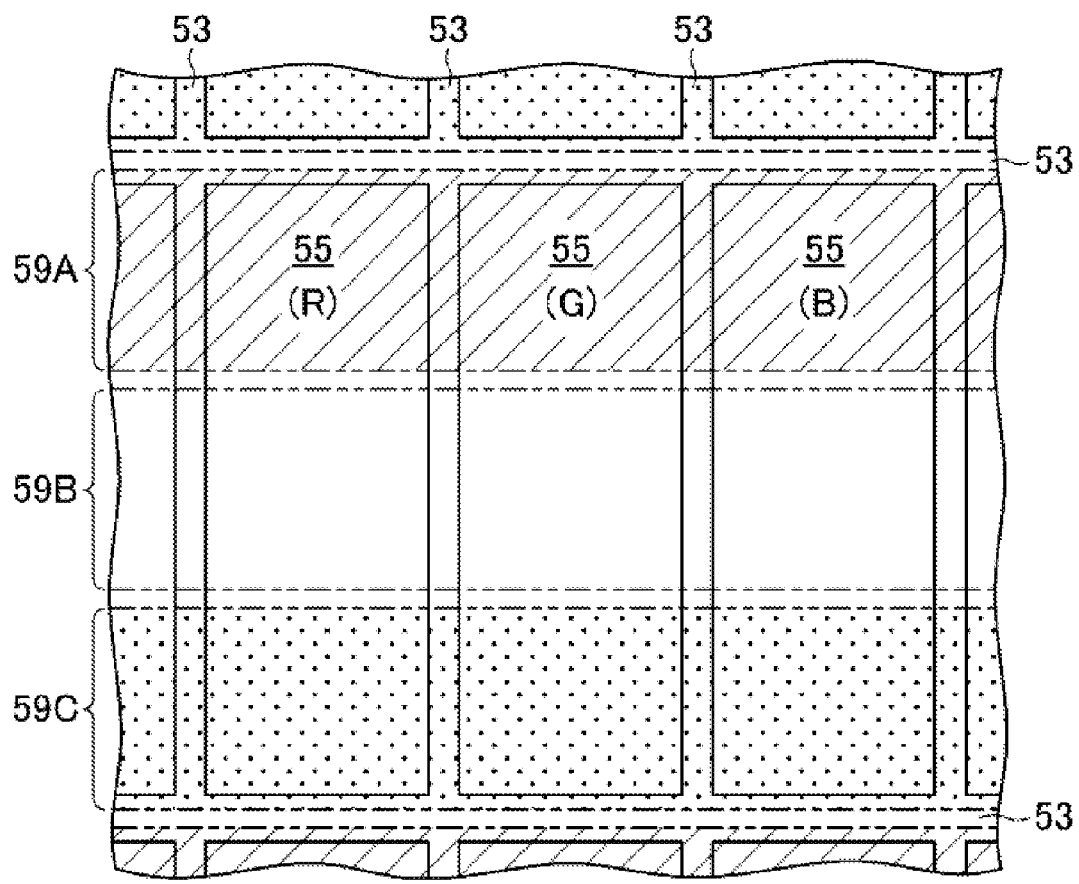
FIG. 13 is a plan view corresponding to FIG. 8, showing a specific configuration of respective pixels of an opposite substrate of Modification Example 3 of Embodiment 1.

FIG. 13 is a plan view corresponding to FIG. 8, showing a specific configuration of the respective pixels P in the opposite substrate 50 of Modification Example 3.

In Embodiment 1 above, the configuration in which each pixel P has two common electrodes, which are a first common electrode 59A and a second common electrode 59B, was described, but in this modification example, each pixel P has three pixel electrodes independent of each other, which are a first common electrode 59A, a second common electrode 59B, and a third common electrode 59C (electrode shown with a two-chain dot line and a dotted pattern in FIG. 13; this also applies to the figures described below).

Specifically, the first common electrode 59A, the second common electrode 59B, and the third common electrode 59C are each in a narrow rectangular shape (line shape when viewed from further away) that extends along the row direction (horizontal direction in FIG. 13) of the pixel array 3, and a plurality of them are arranged along the column direction of the pixel array 3 (vertical direction in FIG. 13) in a prescribed order (59A, 59B, 59C, 59A, 59B, 59C . . . ).

A set of a first common electrode 59A, a second common electrode 59B, and a third common electrode 59C is provided for each pixel row PL, and in each pixel P (a portion corresponding to a color filter 55), these three electrodes are arranged along the column direction of the pixel array 3. For example, the first common electrode 59A is disposed on the upper side of each pixel P in FIG. 13, the second common electrode 59B is disposed in the center portion of each pixel P in FIG. 13, and the third common electrode 59C is disposed on the lower side of each pixel P in FIG. 13. The first common electrodes 59A, the second common electrodes 59B, and the third common electrodes 59C in the respective pixels P are each constituted of the same electrode in each pixel row PL.

The respective first common electrode 59A, second common electrode 59B, and third common electrode 59C divide each pixel P into three subpixels p1, p2, and p3. That is, each pixel P is constituted of a first subpixel p1 where the first common electrode 59A is disposed, a second subpixel p2 where the second common electrode 59B is disposed, and a third subpixel p3 where the third common electrode 59C is disposed.

The first subpixels p1, the second subpixels p2, and the third subpixel p3 are respectively arranged along the row direction in each pixel row PL, and are arranged repeatedly in this order in each pixel column PC (see FIG. 14 described below).

As in Embodiment 1 above, respective one ends of the first common electrodes 59A are connected to the first terminal 65 disposed on one side of the frame region F. As in Embodiment 1 above, respective other ends of the second common electrodes 59B are connected to the second terminal 71 disposed on the other side of the frame region F. Although not shown in the figure, respective one ends of the third common electrodes 59C are led out from the common electrodes 59C to one side of the frame region F, and are bundled by being connected to a third common wiring line that extends along the first common wiring line 61, in a manner similar to the first common electrodes 59A.

The third common wiring line has an extension part that protrudes to the outside of the frame region F. An end of the extension part forms a third terminal. This third terminal is also electrically connected to the common driver circuit 7 through common transfer. The led-out portions of the respective third common electrodes 59C and the first common wiring line 61 are insulated from each other, and the led-out portions of the respective first common electrodes 59A and the third common wiring line are insulated from each other, respectively, through an interlayer insulating film disposed at the respective intersections.

In the liquid crystal display device S having such a pixel circuit configuration, the common driver circuit 7 is configured such that the respective second common electrodes 59B are supplied with a constant common potential, the respective first common electrodes 59A are supplied with an AC potential of a binary logic level of high and low, based on the potential supplied to the second common electrodes 59B, and the third common electrodes 59C are supplied with an AC potential of a binary logic level of high and low that is opposite to the potential supplied to the first common electrodes 59A, based on the potential supplied to the second common electrodes 59B.

The gate driver circuit 5 and the source driver circuit 6 are configured to conduct dot inversion driving as in Embodiment 1 above.

Figure 14:
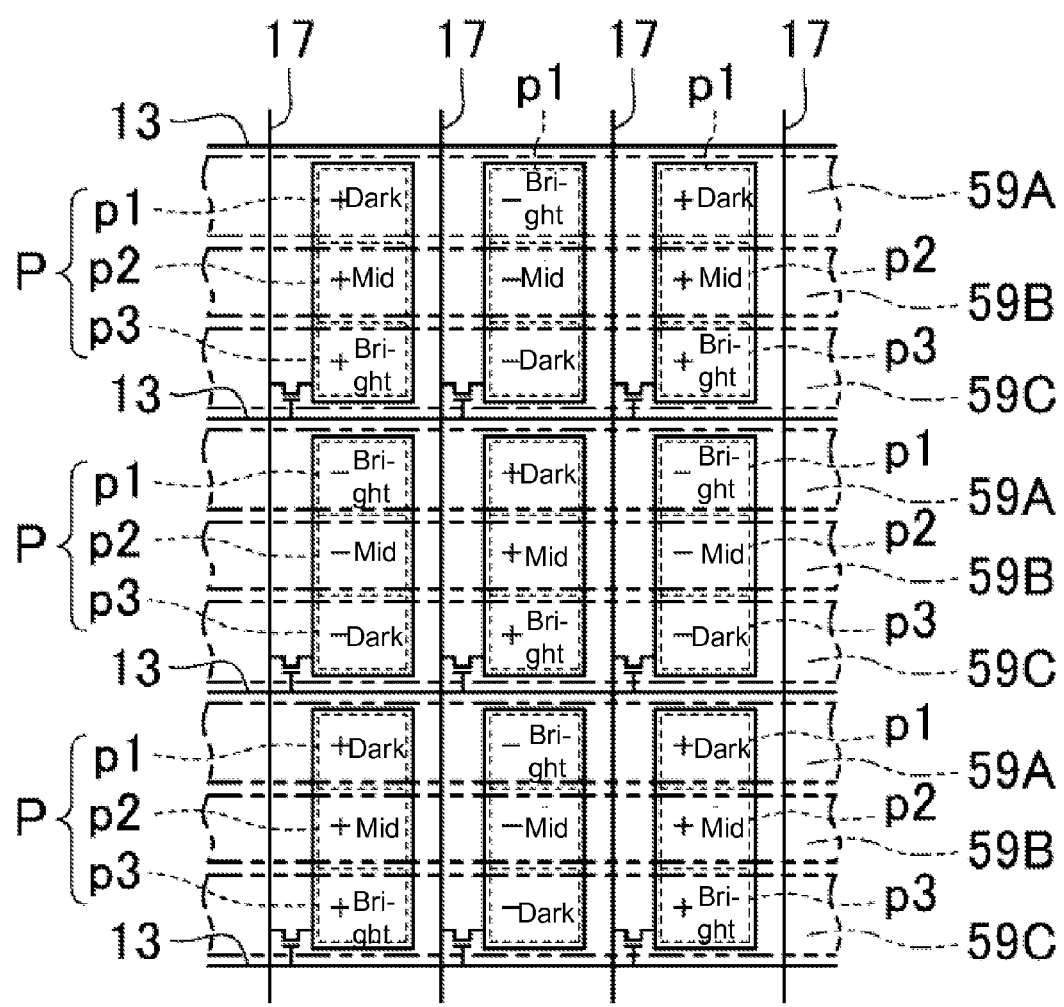
FIG. 14 is a plan view schematically showing an arrangement of bright regions, mid-level brightness regions, and dark regions in one display frame when conducting a display operation in the liquid crystal display device of Modification Example 3 of Embodiment 1.

FIG. 14 shows a schematic plan view of an arrangement of bright subpixels (bright regions), mid-level subpixels (mid-level brightness regions), and dark subpixels (dark regions) in the respective pixels P in one display frame during the display operation of the liquid crystal display device S in which the above-mentioned driving method for the first to third common electrodes 59A to 59C and the dot inversion driving are combined.

In FIG. 14, in each pixel P, a subpixel p2 labeled with "Mid" is a mid-level subpixel that becomes a mid-level brightness region having a brightness level that is intermediate between a bright subpixel and a dark subpixel. This applies to other figures that will be described below.

In the liquid crystal display device S of this modification example, in one display frame, the first to third common electrodes 59A to 59C adjacent to each other in each pixel P are supplied with different common potentials as described above. The respective pixel electrodes 41 are supplied with data potentials through the dot inversion driving, such that the polarities of data potentials are reversed for every one of adjacent pixels P in one display frame.

This way, in each pixel P, one of the first subpixel p1 and the third subpixel p3 becomes a bright subpixel, and the other becomes a dark subpixel. The second subpixel p2 in each pixel P becomes a mid-level subpixel. Thus, in this display state, bright subpixels and dark subpixels are alternately arranged along the row direction of the pixel array 3, and the mid-level subpixels are all aligned along the row direction.

With this display state, each pixel P has three different levels of brightness, and the gamma characteristics corresponding to these three levels of brightness are observed in a mixed state. Therefore, the viewing angle dependency of the gamma characteristics can be improved in a desired manner.

Modification Example 4 of Embodiment 1

In Modification Example 3 of Embodiment 1 above, the gate driver circuit 5 and the source driver circuit 6 were configured to conduct dot inversion driving, but in this modification example, the gate driver circuit 5 and the source driver circuit 6 are configured to conduct V line inversion driving in which, in one display frame, polarities of data potentials supplied to the respective pixel electrodes 41 are inverted for every pixel column PC, based on the display signals inputted from the display control circuit 9.

Figure 15:
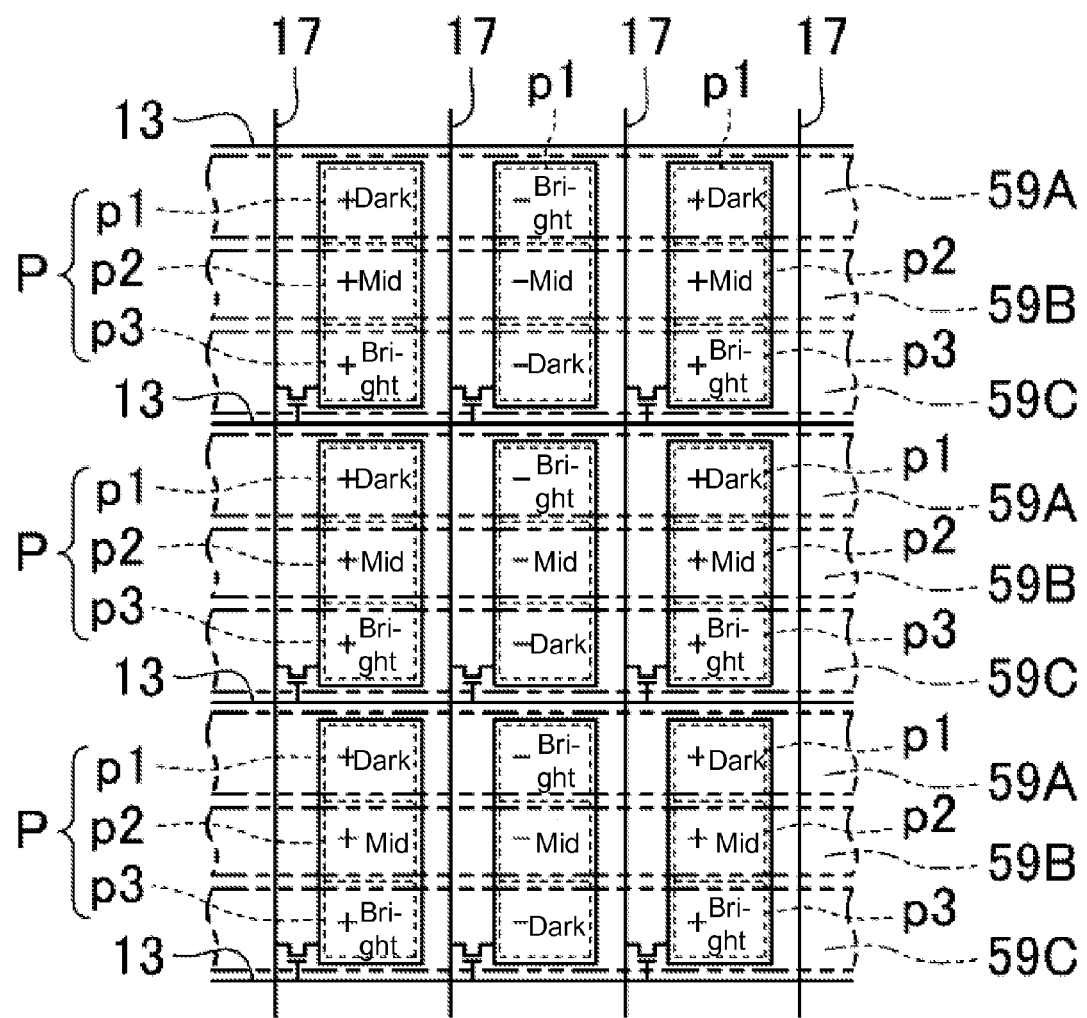
FIG. 15 is a plan view schematically showing an arrangement of bright regions, mid-level brightness regions, and dark regions in one display frame when conducting a display operation in a liquid crystal display device of Modification Example 4 of Embodiment 1.

FIG. 15 shows a schematic plan view of an arrangement of bright subpixels (bright regions), mid-level subpixels (mid-level brightness region), and dark subpixels (dark regions) in the respective pixels P in one display frame during the display operation of the liquid crystal display device S conducting the V line inversion driving.

In the liquid crystal display device S of this modification example, in one display frame, the first to third common electrodes 59A to 59C in each pixel P are supplied with different common potentials as in Modification Example 3 of Embodiment 1 above. The respective pixel electrodes 41 are supplied with data potentials through the above-mentioned V line inversion driving, such that the polarities of data potentials are reversed for every pixel column PC in one display frame.

This way, in each pixel P, one of the first subpixel p1 and the third subpixel p3 becomes a bright subpixel, and the other becomes a dark subpixel. The second subpixel p2 in each pixel P becomes a mid-level subpixel. Furthermore, in a pair of adjacent first subpixels p1 and a pair of adjacent third subpixels p3 along each pixel row PL, and in a pair of first subpixel p1 and third subpixel p3 adjacent along each pixel column PC, one becomes a bright subpixel and the other becomes a dark subpixel. Therefore, in this display state, except for the mid-level subpixels, the bright subpixels and dark subpixels are arranged in a checker board pattern in the display region D.

With such a display state, as in Modification Example 1 above, display unevenness can be minimized, and it is possible to display a smooth and clear image.

Embodiment 2

Figure 16:
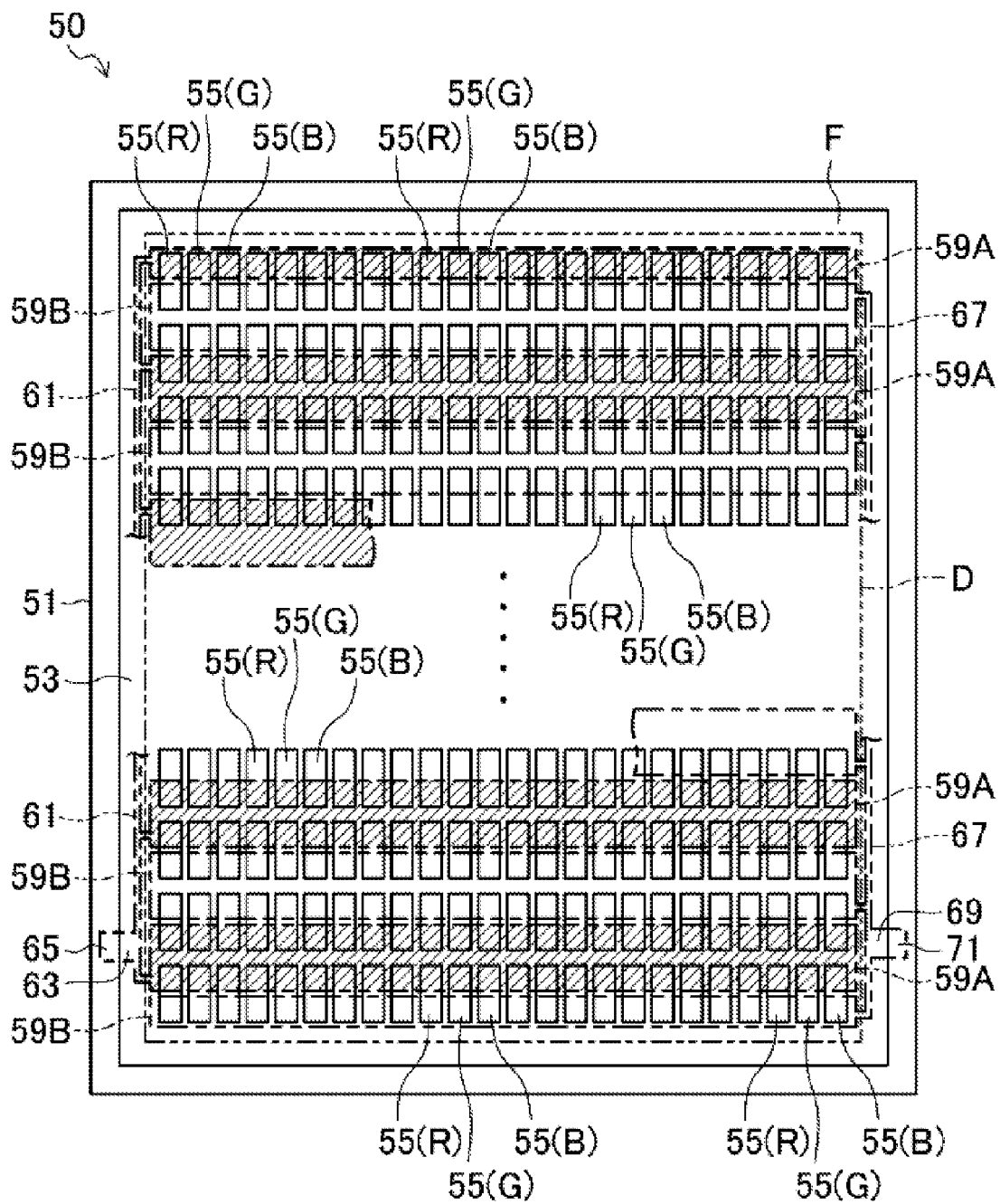
FIG. 16 is a plan view that schematically shows an opposite substrate of Embodiment 2.
Figure 17:
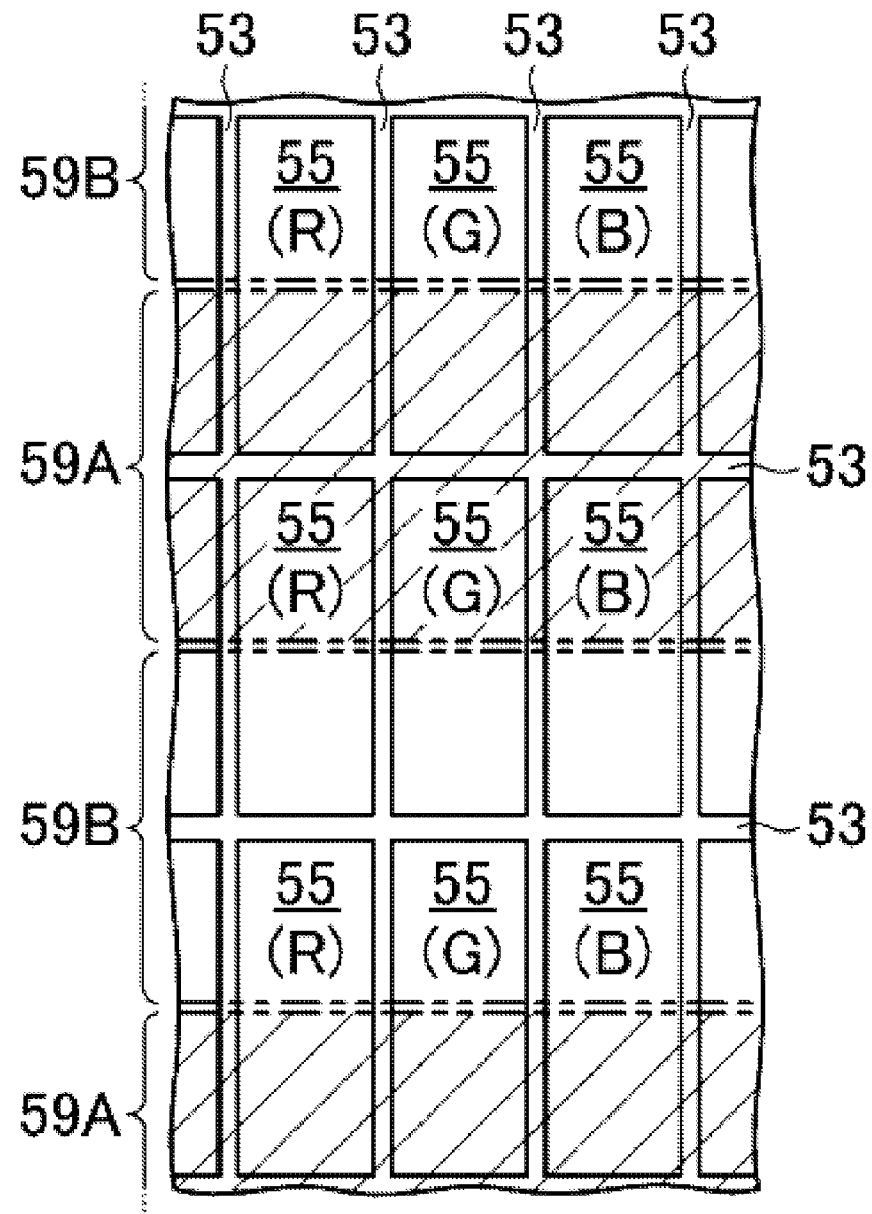
FIG. 17 is a plan view showing a specific configuration of respective pixels of the opposite substrate of Embodiment 2.

FIGS. 16 and 17 show the configuration of the opposite substrate 50 of Embodiment 2. FIG. 16 is a schematic plan view of the opposite substrate 50. FIG. 17 is a plan view showing a specific configuration of the respective pixels P in the opposite substrate 50.

The present embodiment has a configuration similar to that of Embodiment 1 above, except that the configuration of the opposite substrate 50 differs from that of Embodiment 1, and therefore, only the opposite substrate 50 having a different configuration will be explained. In the embodiments below, the same configurations as those in FIGS. 1 to 15 are given the same reference characters and the same descriptions as those in Embodiment 1 above, and the detailed descriptions thereof are omitted.

In Embodiment 1 above, a set of a first common electrode 59A and a second common electrode 59B was provided for each pixel row PL, and the first common electrode 59A and the second common electrode 59B were separated from each other. However, in the present embodiment, first common electrodes 59A or second common electrodes 59B are adjacent to each other in respective pixels P that are adjacent to each other in each pixel column PC, and these adjacent first common electrodes 59A and adjacent second common electrodes 59B are each constituted of the same electrode.

Specifically, in a manner similar to Embodiment 1 above, each first common electrode 59A and each second common electrode 59B is formed in a narrow rectangular shape (line shape when viewed from further away) that extends along the row direction of the pixel array 3 (horizontal direction in FIG. 16), and a plurality of them are alternately arranged along the column direction of the pixel array 3 (vertical direction in FIG. 16). Each first common electrode 59A and each second common electrode 59B are formed to overlap respective two pixel rows PL adjacent to each other along the column direction of the pixel array 3, except for electrodes positioned at both ends of the pixel array 3 in the column direction.

In an odd-numbered pixel row PL (corresponding to a row of color filters 55 positioned in the center of FIG. 17), for example, the first common electrode 59A is disposed in the upper part of each pixel P in FIG. 17, and the second common electrode 59B is disposed in the lower part of each pixel P in FIG. 17. On the other hand, in an even-numbered pixel row PL (corresponding to a row of color filters 55 positioned in the upper side or lower side of FIG. 17), the first common electrode 59A is disposed in the lower part of each pixel P in FIG.

17, and the second common electrode 59B is disposed in the upper part of each pixel P in FIG. 17.

Figure 18:
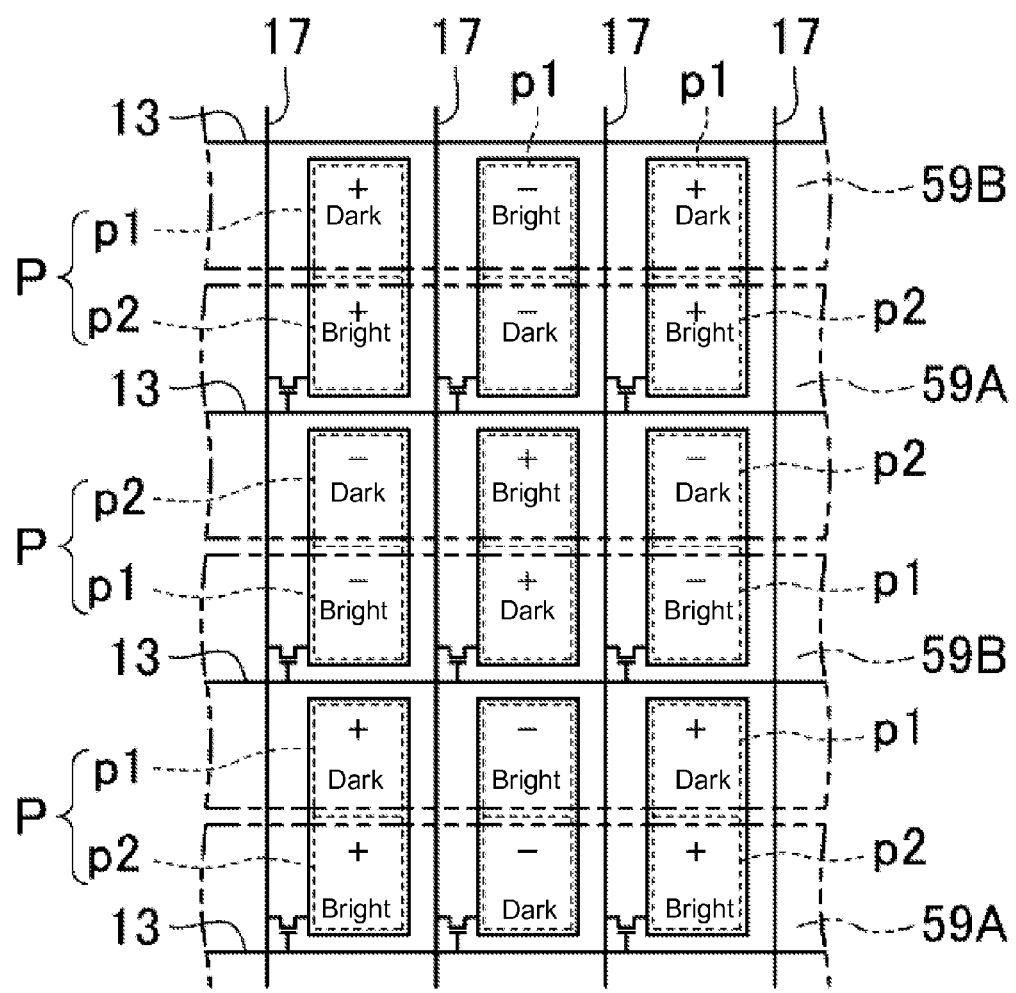
FIG. 18 is a plan view schematically showing an arrangement of bright regions and dark regions in one display frame when conducting a display operation in the liquid crystal display device of Embodiment 2.

First subpixels p1 and second subpixels p2 respectively constituted of the first common electrodes 59A and the second common electrodes 59B are each arranged along the row direction in each pixel row PL, and two of each are aligned alternately in each pixel column PC (as shown in FIG. 18 described below). Two adjacent subpixels p1 or p2 in pixels P that are adjacent to each other along the column direction of the pixel array 3 are the same type of subpixels, or in other words, the first subpixels p1 or the second subpixels p2.

The gate driver circuit 5 and the source driver circuit 6 are configured to conduct dot inversion driving in a manner similar to Embodiment 1. The common driver circuit 7 is configured to conduct common inversion driving in a manner similar to Embodiment 1 above. In the present embodiment also, the driver circuit 4 is configured to conduct AC driving on the liquid crystal layer 81 for each of the common electrodes 59A and 59B in each pixel P, through the display driving in which the dot inversion driving and the common inversion driving are combined.

FIG. 18 is a schematic plan view of an arrangement of bright subpixels (bright regions) and dark subpixels (dark regions) in the respective pixels P in one display frame during a display operation in which the dot inversion driving and the common inversion driving are combined.

In the liquid crystal display device S of the present embodiment, different common potentials are supplied to a first common electrode 59A and a second common electrode 59B adjacent to each other in each pixel P, and the same common potential is supplied to the first common electrode 59A of the first subpixel p1 and the second common electrode 59B of the second subpixel p2 that are adjacent to each other in adjacent pixels P along the column direction (vertical direction in FIG. 18) of the pixel array 3. The respective pixel electrodes 41 are supplied with data potentials through the dot inversion driving, such that the polarities of data potentials are reversed for every one of adjacent pixels P.

This way, in each pixel P, one of the first subpixel p1 and the second subpixel p2 becomes a bright subpixel and the other becomes a dark subpixel. Furthermore, in a pair of adjacent first subpixels p1 and a pair of adjacent second subpixels p2 in each pixel row PL, and in a pair of adjacent first subpixels p1 and a pair of adjacent second subpixels p2 in each pixel column PC, one becomes a bright subpixel and the other becomes a dark subpixel. Therefore, in this display state, bright subpixels and dark subpixels are arranged in a checker board pattern in the display region D.

With this display state, as in Modification Example 1 of Embodiment 1 above, display unevenness can be minimized, and it is possible to display a smooth and clear image.

—Effects of Embodiment 2—

According to Embodiment 2, it is possible to increase the aperture ratio of each pixel while improving the viewing angle dependency of the gamma characteristics as in Embodiment 1 above, and therefore, a liquid crystal display device S that has high display quality and that can display a bright image with low power consumption can be realized. In addition, display unevenness can be minimized, and it is possible to display a smooth and clear image.

Modification Example 1 of Embodiment 2

In Embodiment 2 above, the gate driver circuit 5 and the source driver circuit 6 were configured to conduct dot inversion driving, but in this modification example, the gate driver circuit 5 and the source driver circuit 6 are configured to conduct V line inversion driving in which, in one display frame, polarities of data potentials supplied to the respective pixel electrodes 41 are inverted for every pixel column PC, based on the display signals inputted from the display control circuit 9.

Figure 19:
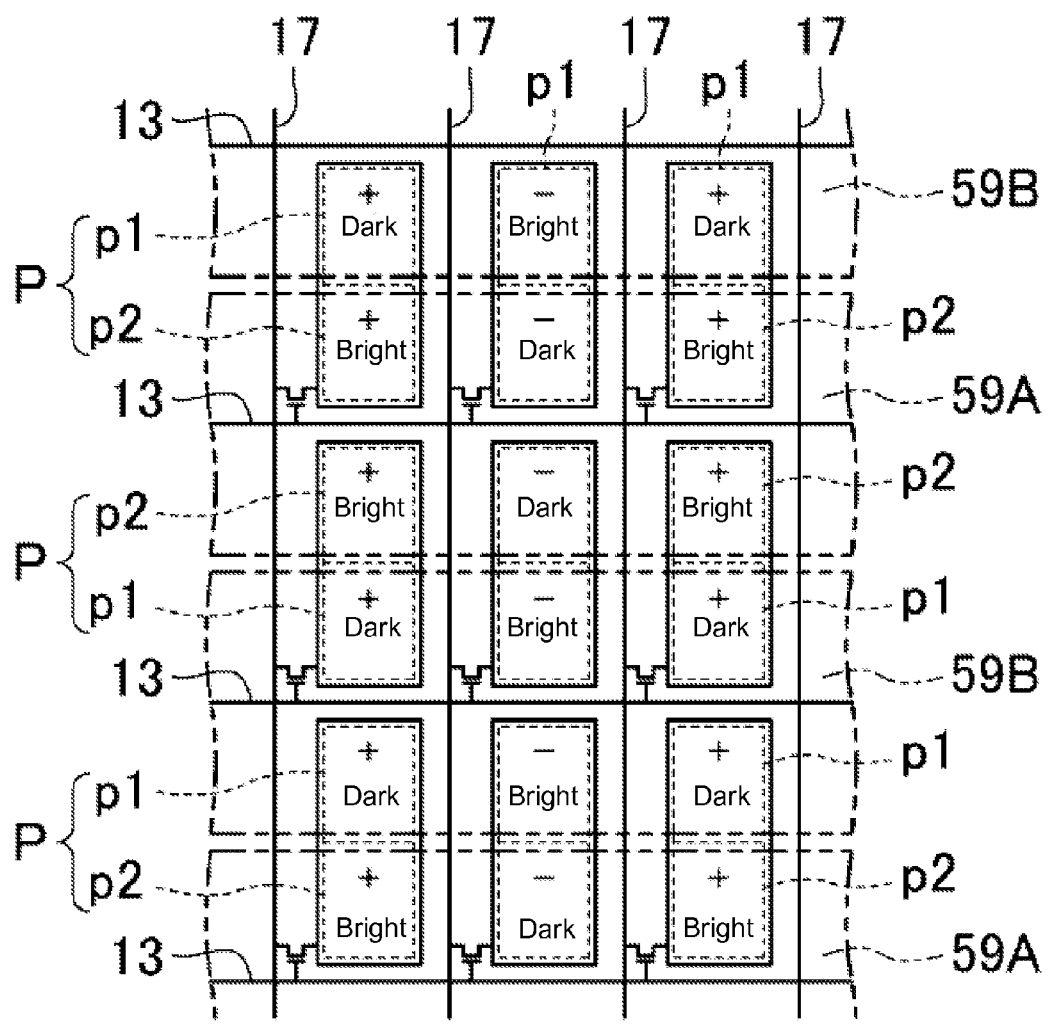
FIG. 19 is a plan view schematically showing an arrangement of bright regions and dark regions in one display frame when conducting a display operation in a liquid crystal display device of Modification Example 1 of Embodiment 2.

FIG. 19 shows a schematic plan view showing an arrangement of bright subpixels (bright regions) and dark subpixels (dark regions) of the respective pixels P in one display frame in a display operation of the liquid crystal display device S in which the V line inversion driving and the common inversion driving are combined.

In the liquid crystal display device S of this modification example, different common potentials are supplied to a first common electrode 59A and a second common electrode 59B adjacent to each other in each pixel P, and the same common potential is supplied to the first common electrodes 59A of respective adjacent first subpixels p1 and the second common electrodes 59B of respective adjacent second subpixels p2 in pixels P adjacent to each other along the column direction (vertical direction in FIG. 19) of the pixel array 3. The respective pixel electrodes 41 are supplied with data potentials through the above-mentioned V line inversion driving, such that the polarities of data potentials are reversed for every pixel column PC in one display frame.

This way, in each pixel P, one of the first subpixel p1 and the second subpixel p2 becomes a bright subpixel and the other becomes a dark subpixel. Furthermore, in a pair of adjacent first subpixels p1 and a pair of adjacent second subpixels p2 in each pixel row PL, one becomes a bright subpixel and the other becomes a dark subpixel, and in this display state, bright subpixels and dark subpixels are alternately arranged along the row direction (horizontal direction in FIG. 19) of the pixel array 3.

With such a display state also, display unevenness can be suppressed, and it is possible to display a smooth image as in Embodiment 1 above.

Modification Example 2 of Embodiment 2

In Modification Example 2, the gate driver circuit 5 and the source driver circuit 6 are configured to conduct H line inversion driving in which, in one display frame, polarities of data potentials supplied to the respective pixel electrodes 41 are inverted for every pixel row PL, based on the display signals inputted from the display control circuit 9.

Figure 20:
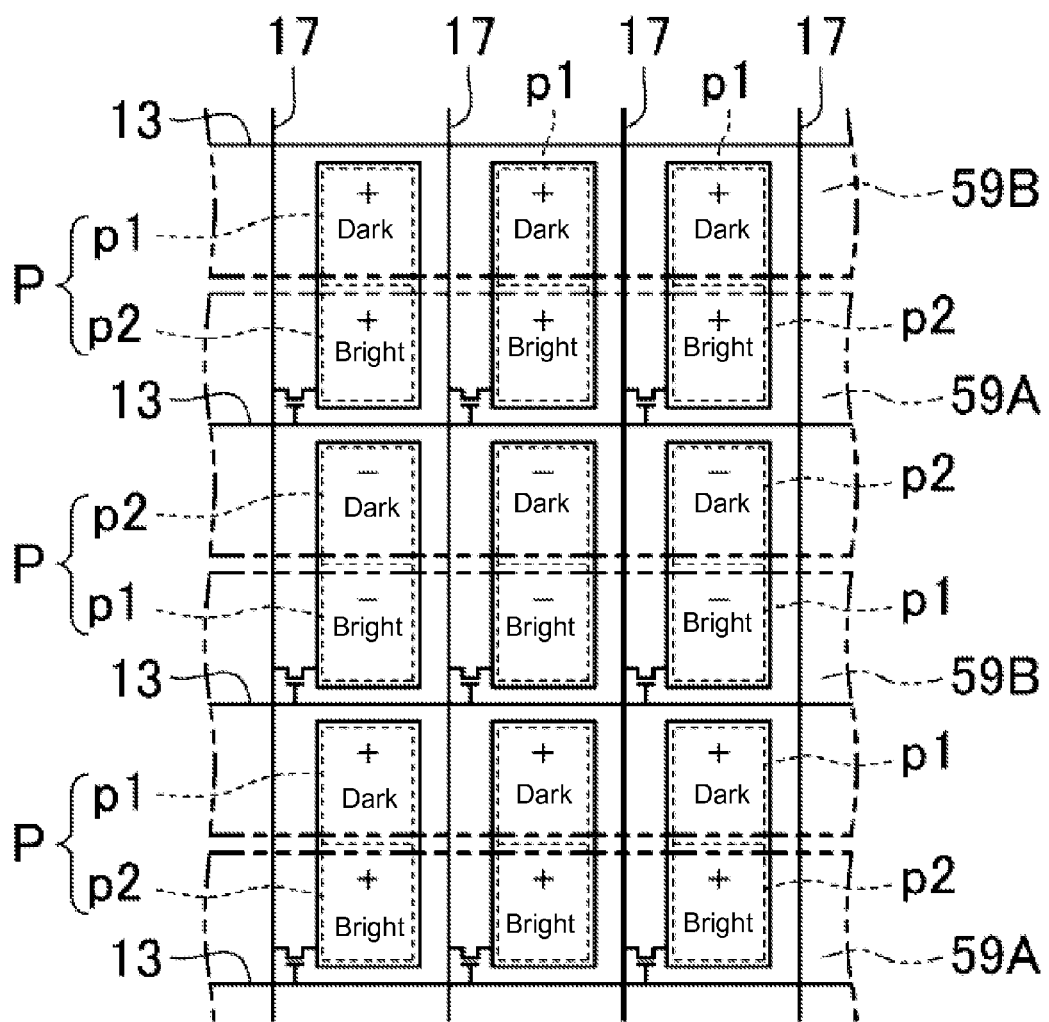
FIG. 20 is a plan view schematically showing an arrangement of bright regions and dark regions in one display frame when conducting a display operation in a liquid crystal display device of Modification Example 2 of Embodiment 2.

FIG. 20 shows a schematic plan view showing an arrangement of bright subpixels (bright regions) and dark subpixels (dark regions) of the respective pixels P in one display frame in a display operation of the liquid crystal display device S in which the H line inversion driving and the common inversion driving are combined.

In the liquid crystal display device S of this modification example, different common potentials are supplied to a first common electrode 59A and a second common electrode 59B adjacent to each other in each pixel P, and the same common potential is supplied to the first common electrodes 59A of respective adjacent first subpixels p1 and the second common electrodes 59B of respective adjacent second subpixels p2, respectively, in pixels P adjacent to each other in the column direction (vertical direction in FIG. 20) of the pixel array 3. The respective pixel electrodes 41 are supplied with data potentials through the above-mentioned H line inversion driving, such that the polarities of data potentials are reversed for every pixel row PL in one display frame.

With this driving method, one of the first subpixel p1 and the second subpixel p2 in each pixel P becomes a bright subpixel and the other becomes a dark subpixel, and therefore, each pixel P has two different levels of brightness therein, and the gamma characteristics corresponding to the respective levels of brightness are observed in a mixed state. As a result, the viewing angle dependency of the gamma characteristics is improved.

Modification Example 3 of Embodiment 2

Figure 21:
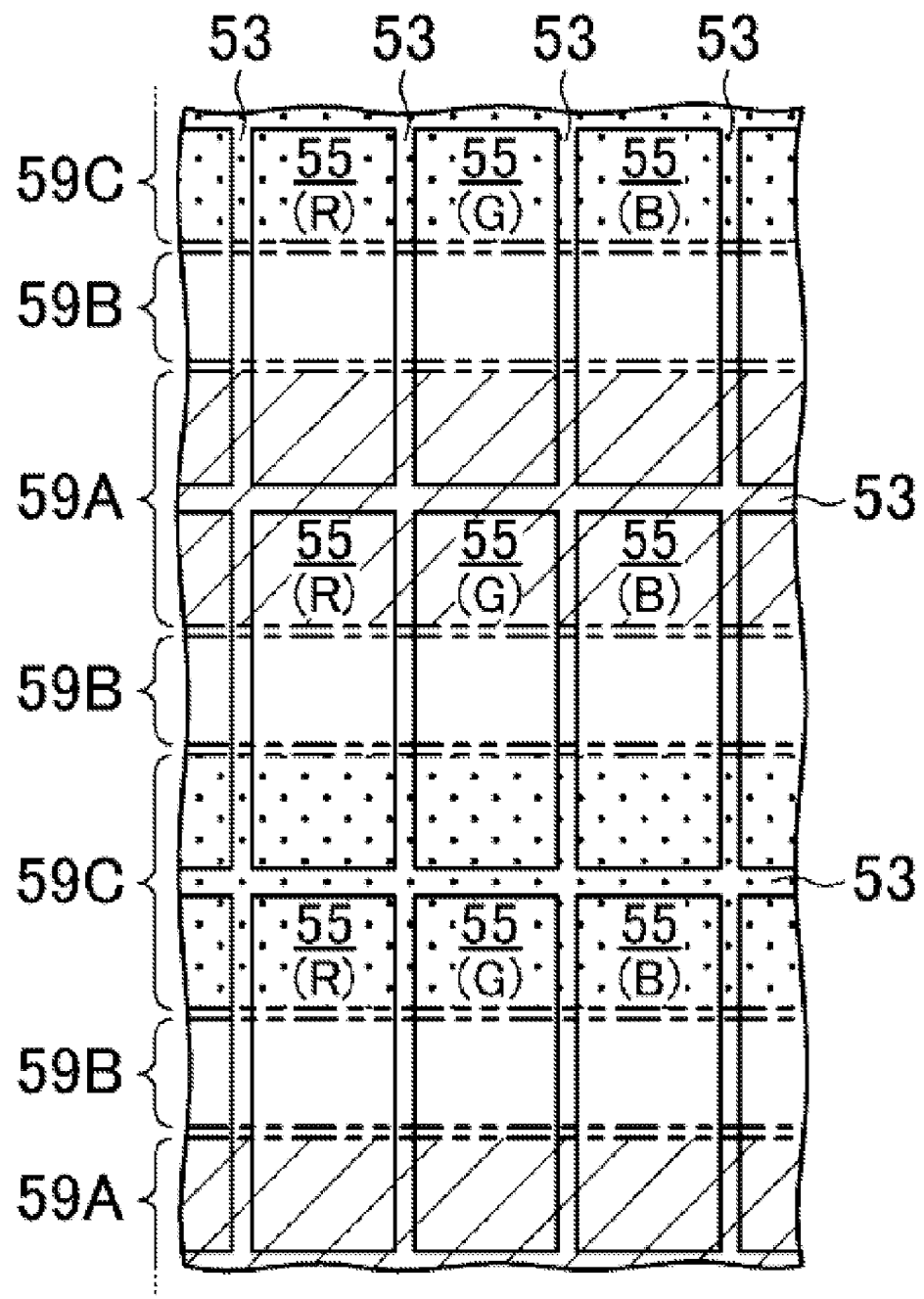
FIG. 21 is a plan view corresponding to FIG. 17, showing a specific configuration of respective pixels of an opposite substrate of Modification Example 3 of Embodiment 2.

FIG. 21 is a plan view corresponding to FIG. 17, showing a specific configuration of the respective pixels P in the opposite substrate 50 of Modification Example 3.

In Embodiment 2 above, the configuration in which each pixel P has two common electrodes, which are a first common electrode 59A and a second common electrode 59B, was described, but in this modification example, each pixel P has three pixel electrodes independent of each other, which are a first common electrode 59A, a second common electrode 59B, and a third common electrode 59C.

Specifically, the first common electrode 59A, the second common electrode 59B, and the third common electrode 59C are each in a narrow rectangular shape (line shape when viewed from further away) that extends along the row direction (horizontal direction in FIG. 21) of the pixel array 3, and a plurality of them are arranged along the column direction of the pixel array 3 (vertical direction in FIG. 21) in a prescribed order (59A, 59B, 59C, 59B, 59A, 59B . . . ).

Each first common electrode 59A and each third common electrode 59C are formed to cover respective two pixel rows PL adjacent to each other along the column direction of the pixel array 3, except for electrodes positioned at both ends of the pixel array 3 in the column direction. Each second common electrode 59B is disposed between the first common electrode 59A and the third common electrode 59C in each pixel row PL.

The respective first common electrode 59A, second common electrode 59B, and third common electrode 59C divide each pixel P into three subpixels p1, p2, and p3. That is, each pixel P is constituted of a first subpixel p1 where the first common electrode 59A is disposed, a second subpixel p2 where the second common electrode 59B is disposed, and a third subpixel p3 where the third common electrode 59C is disposed (shown in FIG. 22 described later).

As in Embodiment 1 above, respective one ends of the first common electrodes 59A are connected to the first terminal 65 disposed on one side of the frame region F. As in Embodiment 1 above, respective other ends of the second common electrodes 59B are connected to the second terminal 71 disposed on the other side of the frame region F. Although not shown in the figure, respective one ends of the third common electrodes 59C are led out from the common electrodes 59C to one side of the frame region F, and are bundled by being connected to a third common wiring line that extends along the first common wiring line 61, in a manner similar to the first common electrodes 59A.

The third common wiring line has an extension part that protrudes to the outside of the frame region F, and an end of the extension part forms a third terminal. The third terminal is also electrically connected to the common driver circuit 7 through common transfer. The led-out portions of the respective third common electrodes 59C and the first common wiring line 61 are insulated from each other, and the led-out portions of the respective first common electrodes 59A and the third common wiring line are insulated from each other, respectively, through an interlayer insulating film disposed at the respective intersections.

In the liquid crystal display device S having such a pixel circuit configuration, the common driver circuit 7 is configured such that the respective second common electrodes 59B are supplied with a constant common potential, the respective first common electrodes 59A are supplied with an AC potential of a binary logic level of high and low, based on the common potential supplied to the second common electrodes 59B, and the third common electrodes 59C are supplied with an AC potential of a binary logic level of high and low that is opposite to the AC potential supplied to the first common electrodes 59A, based on the common potential supplied to the second common electrodes 59B.

The gate driver circuit 5 and the source driver circuit 6 are configured to conduct dot inversion driving as in Embodiment 1 above.

Figure 22:
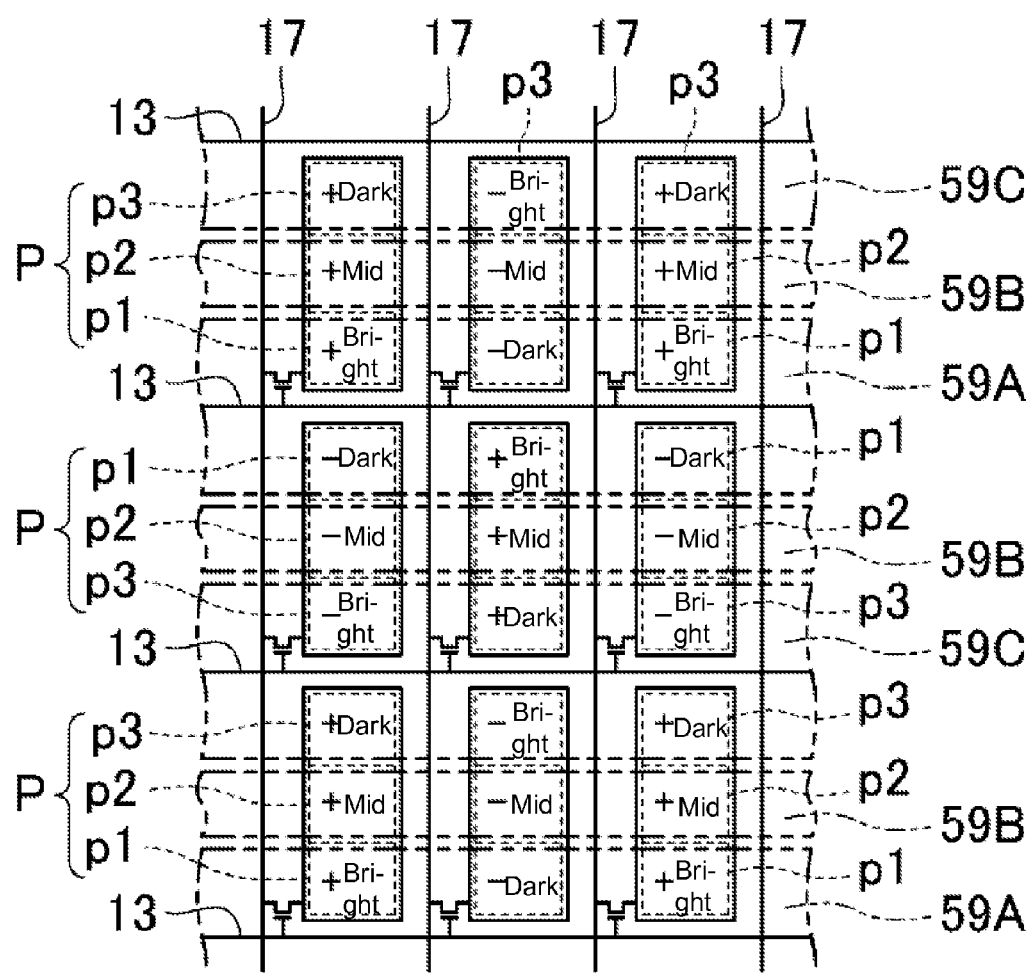
FIG. 22 is a plan view schematically showing an arrangement of bright regions, mid-level brightness regions, and dark regions in one display frame when conducting a display operation in the liquid crystal display device of Modification Example 3 of Embodiment 2.

FIG. 22 shows a schematic plan view of an arrangement of bright subpixels (bright regions), mid-level subpixels (mid-level brightness region), and dark subpixels (dark regions) in the respective pixels P in one display frame during the display operation of the liquid crystal display device S in which the above-mentioned driving method for the first to third common electrodes 59A to 59C and the dot inversion driving are combined.

In the liquid crystal display device S of this modification example, in one display frame, the first to third common electrodes 59A to 59C adjacent to each other in each pixel P are supplied with different common potentials as described above. The respective pixel electrodes 41 are supplied with data potentials through the dot inversion driving, such that the polarities of data potentials are reversed for every one of adjacent pixels P in one display frame.

This way, in each pixel P, one of the first subpixel p1 and the third subpixel p3 becomes a bright subpixel, and the other becomes a dark subpixel. The second subpixel p2 in each pixel P becomes a mid-level subpixel. Thus, in this display state, bright subpixels and dark subpixels are arranged in a checker board pattern in the display region D, except for mid-level subpixels.

With this display state, each pixel P has three different levels of brightness, and the gamma characteristics corresponding to these three levels of brightness are observed in a mixed state. Therefore, the viewing angle dependency of the gamma characteristics can be improved in a desired manner.

Modification Example 4 of Embodiment 2

In Modification Example 3 of Embodiment 2 above, the gate driver circuit 5 and the source driver circuit 6 were configured to conduct the dot inversion driving, but in this modification example, the gate driver circuit 5 and the source driver circuit 6 are configured to conduct V line inversion driving in which, in one display frame, polarities of data potentials supplied to the respective pixel electrodes 41 are inverted for every pixel column PC, based on the display signals inputted from the display control circuit 9.

Figure 23:
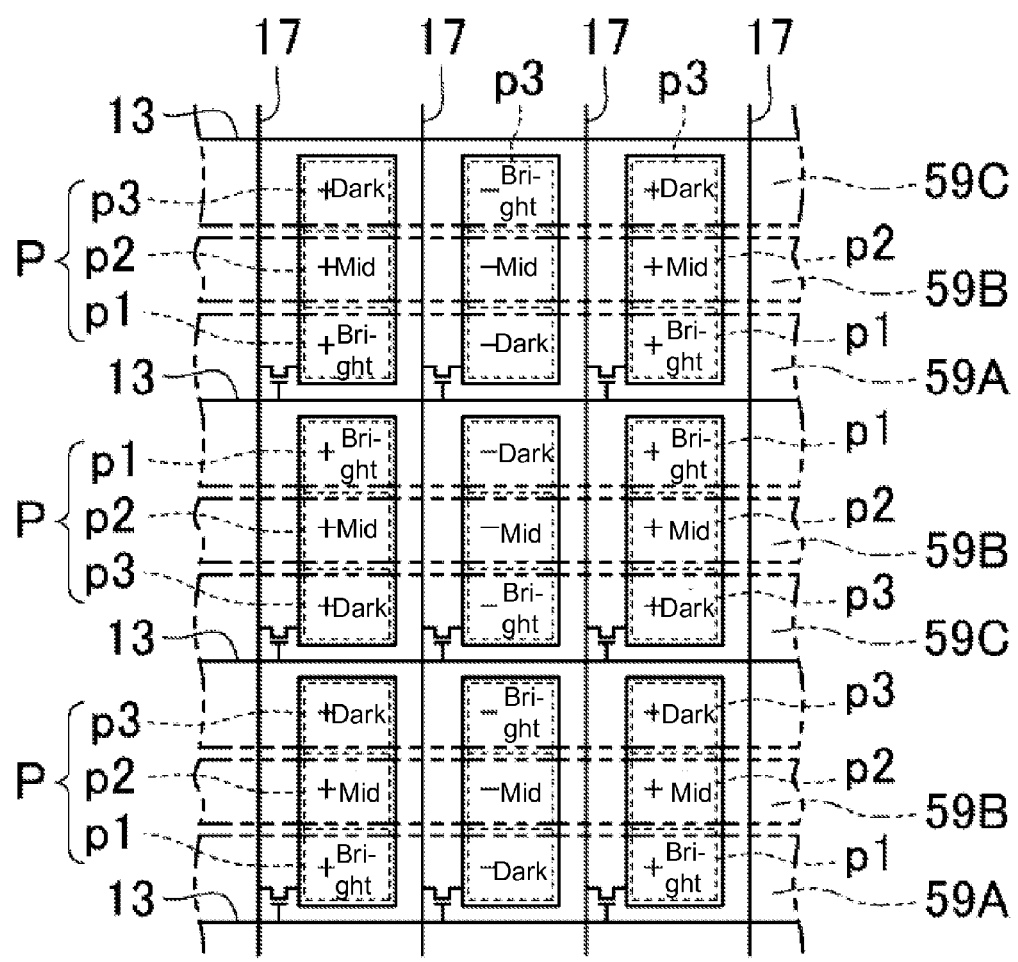
FIG. 23 is a plan view schematically showing an arrangement of bright regions, mid-level brightness regions, and dark regions in one display frame when conducting a display operation in the liquid crystal display device of Modification Example 4 of Embodiment 2.

FIG. 23 is a schematic plan view of an arrangement of bright subpixels (bright regions) and dark subpixels (dark regions) in the respective pixels P in one display frame during a display operation in which the V line inversion driving and the common inversion driving are combined.

In the liquid crystal display device S of this modification example, the first to third common electrodes 59A to 59C adjacent to each other in each pixel P are supplied with different common potentials as described above. The respective pixel electrodes 41 are supplied with data potentials through the above-mentioned V line inversion driving, such that the polarities of data potentials are reversed for every pixel column PC in one display frame.

This way, in each pixel P, one of the first subpixel p1 and the third subpixel p3 becomes a bright subpixel, and the other becomes a dark subpixel. The second subpixel p2 in each pixel P becomes a mid-level subpixel. Thus, in this display state, bright subpixels and dark subpixels are alternately arranged along the row direction of the pixel array 3, and the mid-level subpixels are all aligned along the row direction.

With this display state, each pixel P has three different levels of brightness, and the gamma characteristics corresponding to these three levels of brightness are observed in a mixed state. Therefore, the viewing angle dependency of the gamma characteristics can be improved in a desired manner.

Embodiment 3

Figure 24:
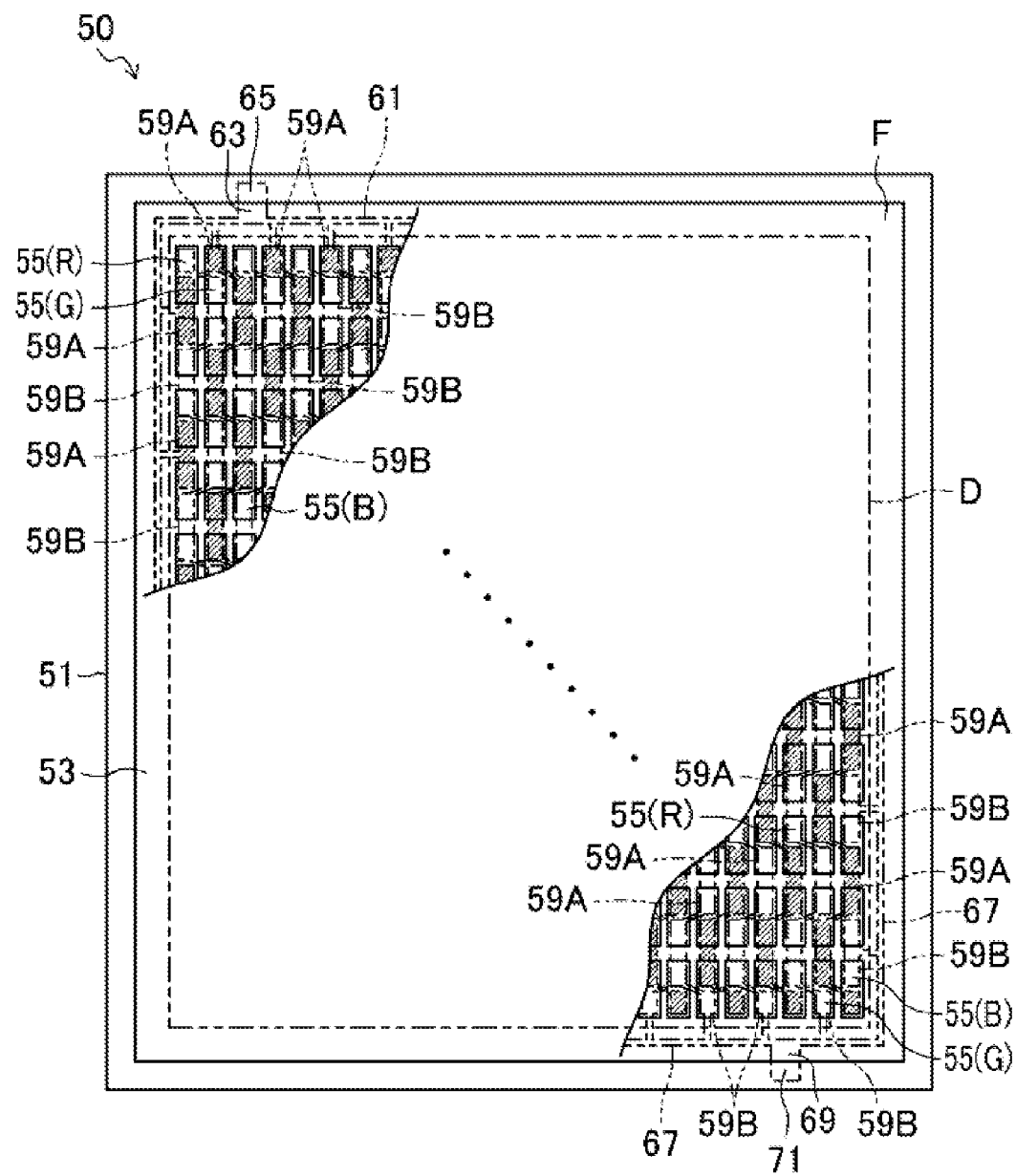
FIG. 24 is a plan view that schematically shows an opposite substrate of Embodiment 3.
Figure 25:
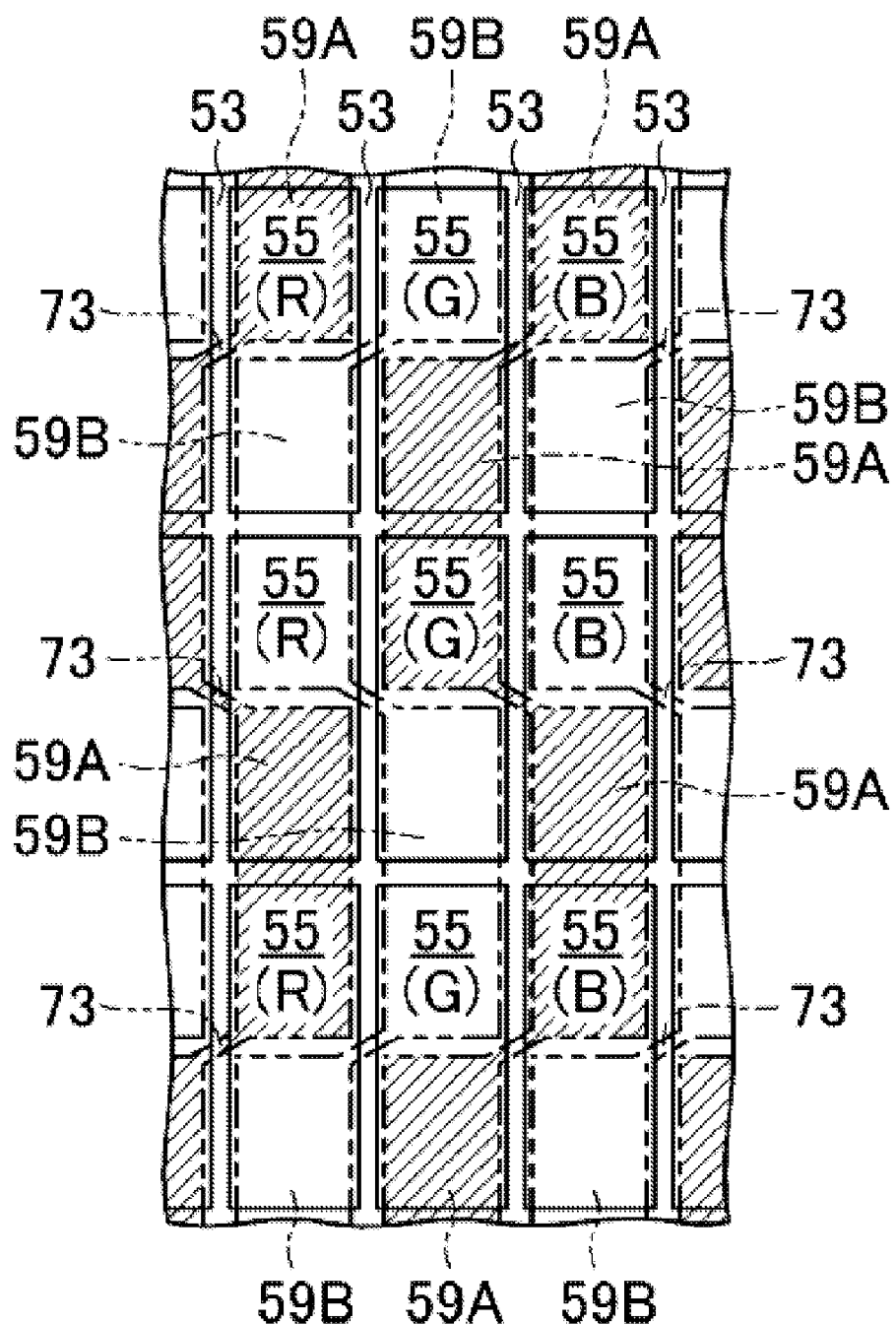
FIG. 25 is a plan view that shows a specific configuration of respective pixels of the opposite substrate of Embodiment 3.

FIGS. 24 and 25 show the configuration of the opposite substrate 50 of Embodiment 3. FIG. 24 is a schematic plan view of the opposite substrate 50. FIG. 25 is a plan view showing a specific configuration of the respective pixels P in the opposite substrate 50.

In Embodiments 1 and 2 above, the first common electrode 59A and the second common electrode 59B were each formed in a narrow rectangular shape that extends along the row direction of the pixel array 3, but in the present embodiment, a first common electrode 59A and a second common electrode 59B are each formed in a rectangular island shape that has substantially the same size as each pixel P, except for the electrodes positioned at both ends of the pixel array 3 in the column direction (vertical direction in FIG. 24). The first common electrodes 59A and the second common electrodes 59B positioned at both ends of the pixel array 3 in the column direction are each formed in a rectangular island shape that is about half the size of each pixel P.

In the display region D, the first common electrodes 59A and the second common electrodes 59B are arranged alternately along the row direction and the column direction of the pixel array 3 in a checker board pattern, and are arranged in a matrix that is offset by a half pitch from the pixel array 3 in the column direction as a whole. The first common electrode 59A and the second common electrode 59B are each formed to overlap respective two pixel rows PL adjacent to each other along the column direction of the pixel array 3, except for the electrodes positioned at both ends of the pixel array 3 in the column direction.

The upper part of each first common electrode 59A in FIG. 25 constitutes a bottom half of a pixel P (a portion corresponding to a color filter 55) on the upper side in FIG. 25, of the two pixels P overlapped by the first common electrode 59A. On the other hand, the bottom half of each first common electrode 59A in FIG. 25 constitutes a top half of a pixel P on the lower side in FIG. 25, of the two pixels P overlapped by the first common electrode 59A.

The upper part of each second common electrode 59B in FIG. 25 constitutes a bottom half of a pixel P on the upper side in FIG. 25, of the two pixels P overlapped by the second common electrode 59B. On the other hand, the bottom half of each second common electrode 59B in FIG. 25 constitutes a top half of a pixel P on the lower side in FIG. 25, of the two pixels P overlapped by the second common electrode 59B.

In other words, the first common electrode 59A of each pixel P is formed integrally with the first common electrode 59A that is adjacent thereto in an adjacent pixel P along the column direction of the pixel array 3. Similarly, the second common electrode 59B of each pixel P is formed integrally with the second common electrode 59B that is adjacent thereto in an adjacent pixel P along the column direction of the pixel array 3.

In each pixel P of an odd-numbered pixel row PL (a portion corresponding to a color filter 55 of a row that is positioned in the center of FIG. 25), a first common electrode 59A or a second common electrode 59B on the upper side of FIG. 25 is connected through a connecting part 73 to the same type common electrode 59A or 59B, or in other words, to a first common electrode 59A or a second common electrode 59B, which is positioned one electrode below in FIG. 25 in a pixel P adjacent thereto on the right side in FIG. 25 along the row direction of the pixel array 3. A first common electrode 59A or a second common electrode 59B on the lower side of FIG. 25 is connected through a connecting part 73 to the same type common electrode 59A or 59B, which is positioned one electrode above in FIG. 25 in a pixel P adjacent thereto on the left side in FIG. 25 along the row direction of the pixel array 3.

In each pixel P of an even-numbered pixel row PL (a portion corresponding to a color filter 55 of a row that is positioned in the upper side or the lower side of FIG. 25), a first common electrode 59A or a second common electrode 59B on the upper side of FIG. 25 is connected through a connecting part to the same type common electrode 59A or 59B, which is positioned one electrode below in FIG. 25 in a pixel P adjacent thereto on the left side in FIG. 25 along the row direction of the pixel array 3. A first common electrode 59A or a second common electrode 59B on the lower side of FIG. 25 is connected through a connecting part 73 to the same type common electrode 59A or 59B, which is positioned one electrode above in FIG. 25 in a pixel P adjacent thereto on the right side in FIG. 25 along the row direction of the pixel array 3.

This way, the first common electrodes 59A in every two pixel columns PC are connected to each other and the second common electrodes 59B in every two pixel columns PC are connected to each other along the source wiring lines 17.

The respective first common electrodes 59A positioned at the upper end in FIG. 24 of the pixel array 3 in the column direction are led out to the upper side of the frame region F in FIG. 24 from the common electrodes 59A, and are bundled by being connected to the same first common wiring line 61 that extends along the row direction of the pixel array 3. The first common electrodes 59A are connected to the first terminal 65 through the first common wiring line 61 in a manner similar to Embodiment 1 above. The respective first common electrodes 59A positioned at the left edge in FIG. 24 of the pixel array 3 in the row direction are also led out to the left side of the frame region F in FIG. 24 from the common electrodes 59A. The first common electrodes 59A are bundled by being connected to the same first common wiring line 61 that extends along the column direction of the pixel array 3, and are connected to the first terminal 65.

The respective second common electrodes 59B positioned at the lower end in FIG. 24 of the pixel array 3 in the column direction are led out to the lower side of the frame region F in FIG. 24 from the common electrodes 59B, and are bundled by being connected to the same second common wiring line 67 that extends along the row direction of the pixel array 3. The second common electrodes 59B are connected to the second terminal 71 through the second common wiring line 67 in a manner similar to Embodiment 1 above. The respective second common electrodes 59B positioned at the right edge in FIG. 24 of the pixel array 3 in the row direction are also led out to the right side of the frame region F in FIG. 24 from the common electrodes 59B. The second common electrodes 59B are bundled by being connected to the same second common wiring line 67 that extends along the column direction of the pixel array 3, and are connected to the second terminal 71.

The gate driver circuit 5 and the source driver circuit 6 are configured to conduct dot inversion driving in a manner similar to Embodiment 1 above. The common driver circuit 7 is also configured to conduct common inversion driving in a manner similar to Embodiment 1 above. In the present embodiment also, the driver circuit 4 is configured to conduct AC driving on the liquid crystal layer 81 for each of the common electrodes 59A and 59B, through the display driving in which the dot inversion driving and the common inversion driving are combined.

Figure 26:
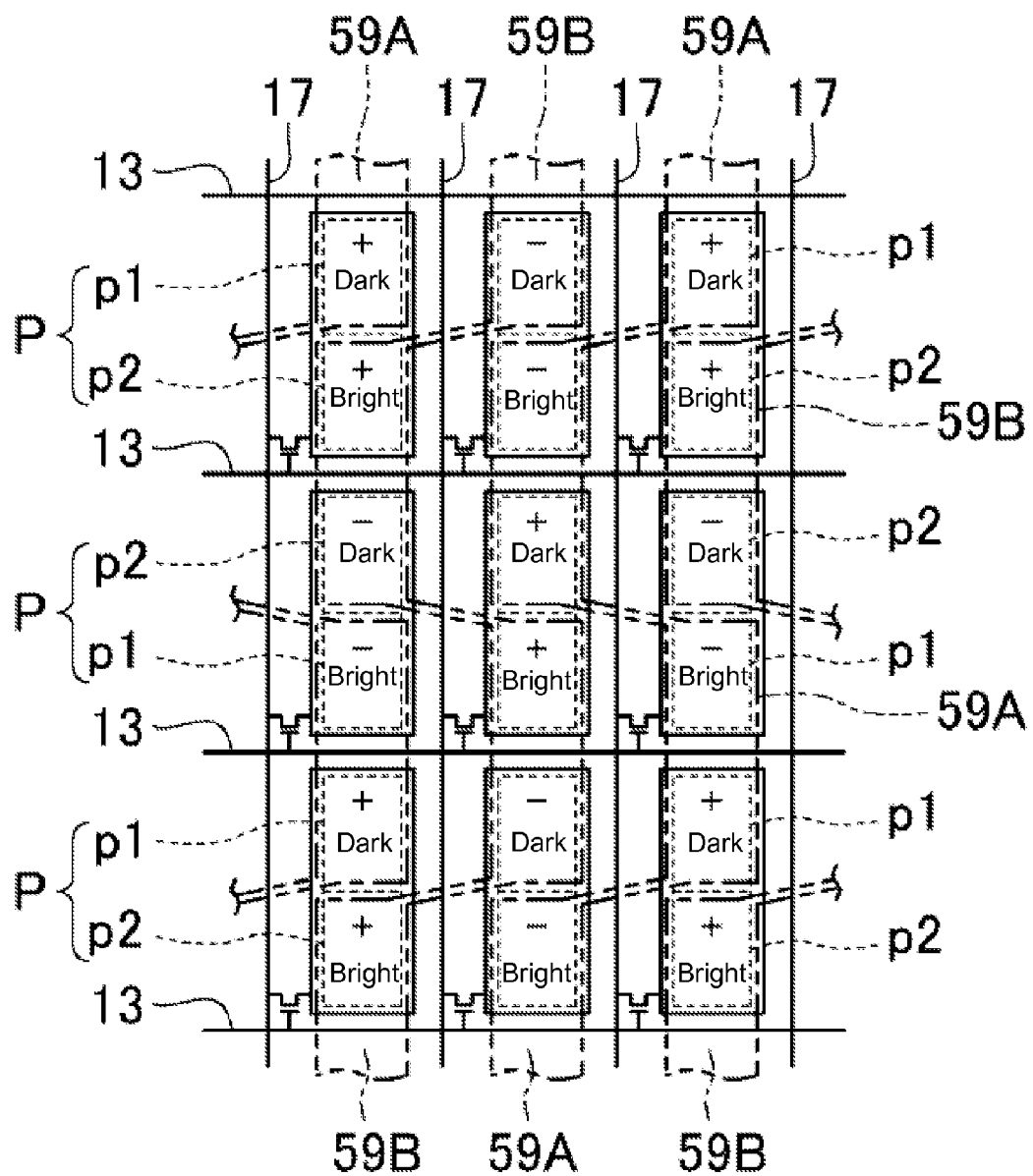
FIG. 26 is a plan view schematically showing an arrangement of bright regions and dark regions in one display frame when conducting a display operation in the liquid crystal display device of Embodiment 3.

FIG. 26 is a schematic plan view of an arrangement of bright subpixels (bright regions) and dark subpixels (dark regions) in the respective pixels in one display frame when conducting a display operation in which the dot inversion driving and the common inversion driving are combined.

In the liquid crystal display device S of the present embodiment, different common potentials are supplied to a first common electrode 59A and a second common electrode 59B adjacent to each other in each pixel P, and different common potentials are supplied to respective adjacent first common electrodes 59A and respective adjacent second common electrodes 59B in each pixel row PL. The respective pixel electrodes 41 are supplied with data potentials through the dot inversion driving, such that the polarities of data potentials supplied to respective adjacent pixels P are inverted from each other.

This way, in each pixel P, one of the first subpixel p1 and the second subpixel p2 becomes a bright subpixel and the other becomes a dark subpixel. Furthermore, in a pair of adjacent first subpixels p1 and a pair of adjacent second subpixels p2 in each pixel column PC, one becomes a bright subpixel and the other becomes a dark subpixel, and in this display state, bright subpixels and dark subpixels are alternately arranged along the column direction of the pixel array 3.

In such a display state, as compared with the case in which respective two first subpixels p1 and respective two subpixels p2 adjacent to each other in each pixel column PC are both bright subpixels or dark subpixels, display unevenness can be suppressed, and a smooth image can be displayed.

—Effects of Embodiment 3—

According to Embodiment 3, it is also possible to increase the aperture ratio of each pixel while improving the viewing angle dependency of the gamma characteristics as in Embodiment 1 above, and therefore, a liquid crystal display device S that has high display quality and that can display a bright image with low power consumption can be realized.

Modification Example 1 of Embodiment 3

In Embodiment 3 above, the gate driver circuit 5 and the source driver circuit 6 were configured to conduct dot inversion driving, but in this modification example, the gate driver circuit 5 and the source driver circuit 6 are configured to conduct V line inversion driving in which, in one display frame, polarities of data potentials supplied to the respective pixel electrodes 41 are inverted for every pixel column PC, based on the display signals inputted from the display control circuit 9.

Figure 27:
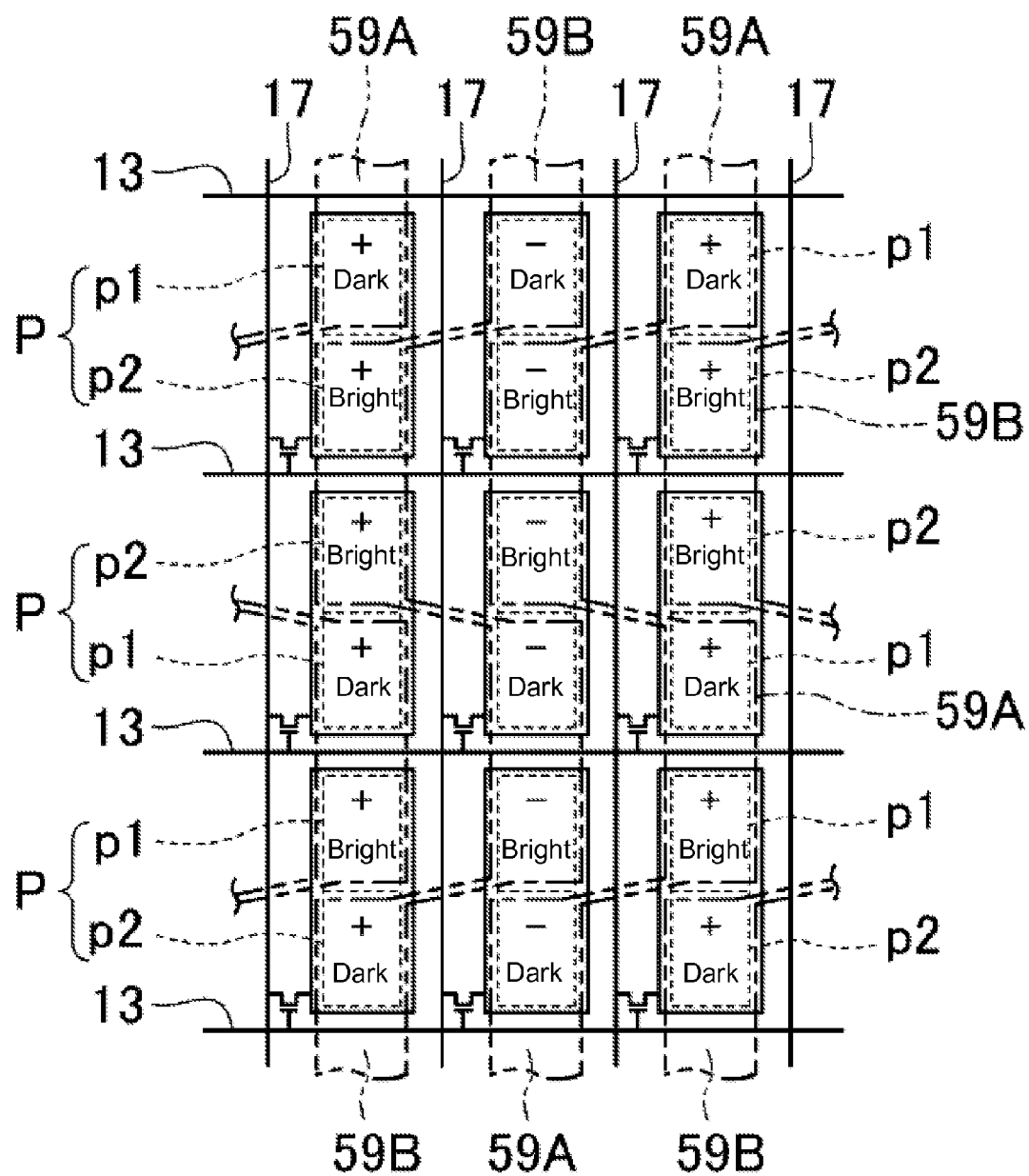
FIG. 27 is a plan view schematically showing an arrangement of bright regions and dark regions in one display frame when conducting a display operation in the liquid crystal display device of Modification Example 1 of Embodiment 3.

FIG. 27 shows a schematic plan view showing an arrangement of bright subpixels (bright regions) and dark subpixels (dark regions) of the respective pixels P in one display frame in a display operation of the liquid crystal display device S in which the V line inversion driving and the common inversion driving are combined.

In the liquid crystal display device S of this modification example, different common potentials are respectively supplied to a first common electrode 59A and a second common electrode 59B adjacent to each other in each pixel P, and different common potentials are supplied to a first common electrode 59A and a second common electrode 59B adjacent to each other in each pixel row PL. The respective pixel electrodes 41 are supplied with data potentials through the above-mentioned V line inversion driving, such that the polarities of data potentials are reversed for every pixel column PC in one display frame.

With this driving method, one of the first subpixel p1 and the second subpixel p2 in each pixel P becomes a bright subpixel and the other becomes a dark subpixel, and therefore, each pixel P has two different levels of brightness therein, and the gamma characteristics corresponding to the respective levels of brightness are observed in a mixed state. As a result, the viewing angle dependency of the gamma characteristics is improved.

Modification Example 2 of Embodiment 3

In Modification Example 2, the gate driver circuit 5 and the source driver circuit 6 are configured to conduct H line inversion driving in which, in one display frame, polarities of data potentials supplied to the respective pixel electrodes 41 are inverted for every pixel row PL, based on the display signals inputted from the display control circuit 9.

Figure 28:
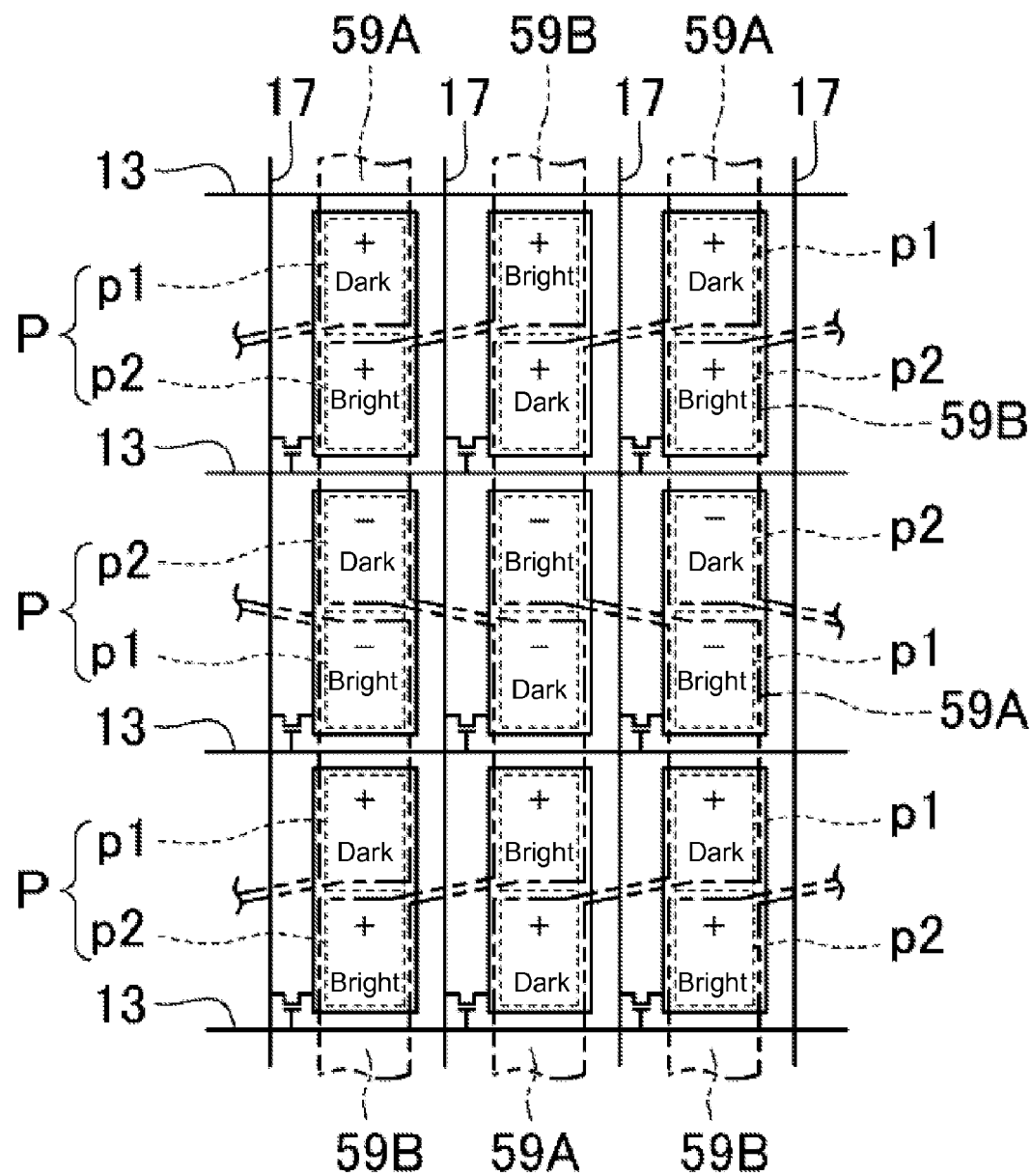
FIG. 28 is a plan view schematically showing an arrangement of bright regions and dark regions in one display frame when conducting a display operation in the liquid crystal display device of Modification Example 2 of Embodiment 3.

FIG. 28 shows a schematic plan view showing an arrangement of bright subpixels (bright regions) and dark subpixels (dark regions) of the respective pixels P in one display frame in a display operation of the liquid crystal display device S in which the H line inversion driving and the common inversion driving are combined.

In the liquid crystal display device S of this modification example, different common potentials are respectively supplied to a first common electrode 59A and a second common electrode 59B adjacent to each other in each pixel P, and different common potentials are supplied to a first common electrode 59A and a second common electrode 59B adjacent to each other in each pixel row PL. The respective pixel electrodes 41 are supplied with data potentials through the above-mentioned H line inversion driving, such that the polarities of data potentials are reversed for every pixel row PL in one display frame.

This way, in each pixel P, one of the first subpixel p1 and the second subpixel p2 becomes a bright subpixel and the other becomes a dark subpixel. Furthermore, in a pair of adjacent first subpixels p1 and a pair of adjacent second subpixels p2 in each pixel row PL, and in a pair of adjacent first subpixels p1 and a pair of adjacent second subpixels p2 in each pixel column PC, one becomes a bright subpixel and the other becomes a dark subpixel. Therefore, in this display state, bright subpixels and dark subpixels are arranged in a checker board pattern in the display region D.

With this display state, as in Modification Example 1 of Embodiment 1 above, display unevenness can be minimized, and it is possible to display a smooth and clear image.

Modification Example 3 of Embodiment 3

Figure 29:
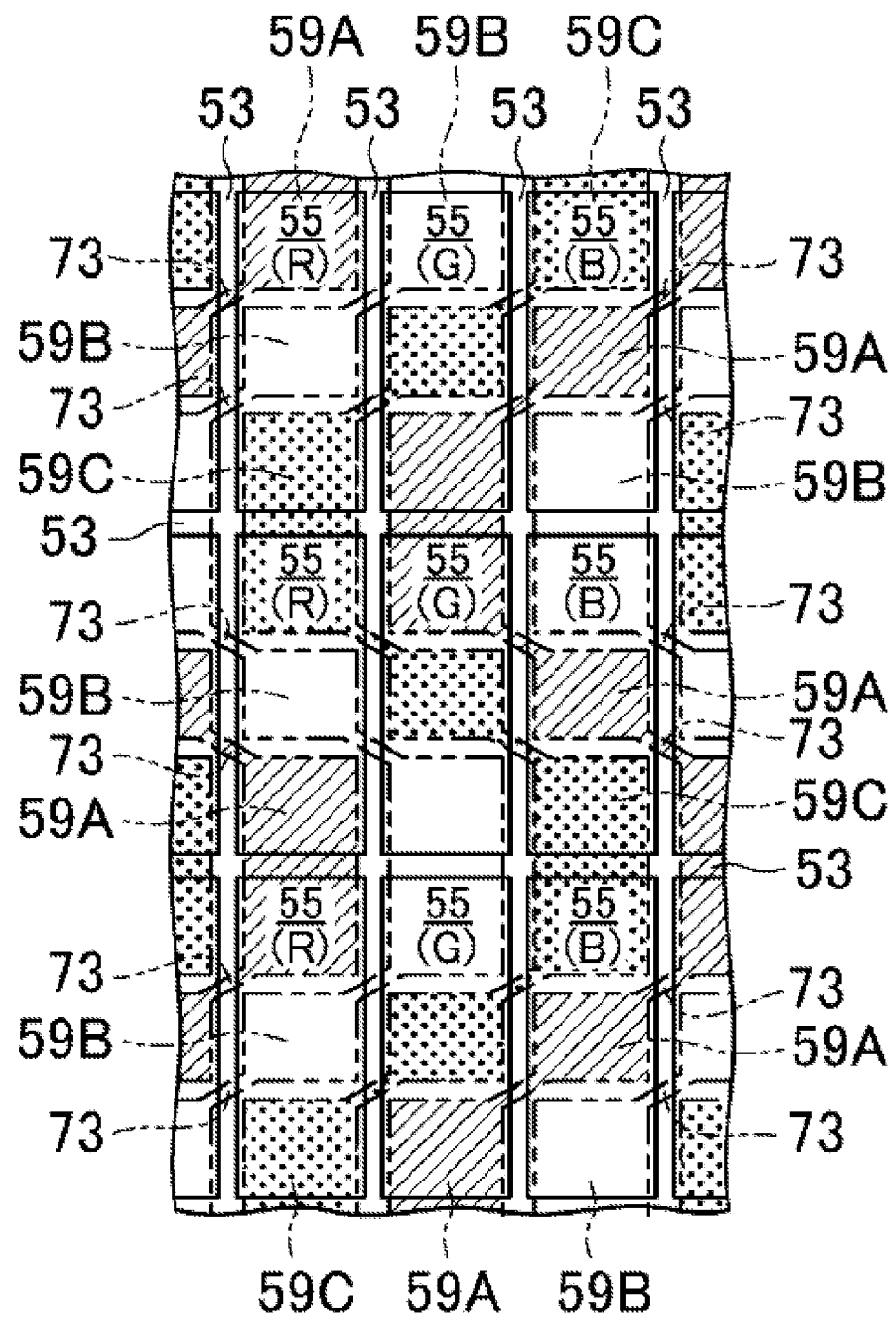
FIG. 29 is a plan view corresponding to FIG. 25, showing a specific configuration of respective pixels in the opposite substrate of Modification Example 3 of Embodiment 3.

FIG. 29 is a plan view corresponding to FIG. 25, showing a specific configuration of the respective pixels P in the opposite substrate 50 of Modification Example 3.

In Embodiment 3 above, the configuration in which each pixel P has two common electrodes, which are a first common electrode 59A and a second common electrode 59B, was described, but in this modification example, each pixel P has three pixel electrodes independent of each other, which are a first common electrode 59A, a second common electrode 59B, and a third common electrode 59C.

Specifically, the first common electrodes 59A, the second common electrodes 59B, and the third common electrodes 59C are arranged along the row direction of the pixel array 3 in a prescribed order (59A, 59B, 59C, 59A, 59B, 59C, . . . ), and are arranged along the column direction of the pixel array 3 in three patterns of prescribed orders (59A, 59B, 59C, 59B, 59A, 59B, . . . , 59B, 59C, 59A, 59C, 59B, 59C, . . . , or 59C, 59A, 59B, 59A, 59C, 59A, . . . ). Three pixel columns PC arranged in the respective orders of the above-mentioned three patterns form one set, and respective sets are repeatedly arranged along the row direction of the pixel array 3.

In each pixel P (a portion corresponding to each color filter 55 in FIG. 29; a portion corresponding to the color filter 55 in the center of the FIG. 29, for example; each common electrode in parentheses below is according to this example), the first common electrode 59A, the second common electrode 59B, or the third common electrode 59C positioned at the upper end in FIG. 29 (first common electrode 59A) is formed integrally with a common electrode of the same type (first common electrode 59A) that is positioned at the lower end in FIG. 29 of a pixel P thereabove in FIG. 29, out of pixels P adjacent thereto along the column direction of the pixel array 3. The first common electrode 59A, the second common electrode 59B, or the third common electrode 59C positioned at the lower end in FIG. 29 of each pixel P (second common electrode 59B) is formed integrally with a common electrode of the same type (second common electrode 59B) that is positioned at the upper end in FIG. 29 of a pixel P therebelow in FIG. 29, out of pixels P adjacent thereto along the column direction of the pixel array 3.

In each pixel P in an odd-numbered pixel row PL (a portion corresponding to a color filter 55 in the center of FIG. 29, for example; each common electrode in parentheses below is according to this example), respective common electrodes (second common electrode 59B and third common electrode 59C) other than the first common electrode 59A, second common electrode 59B, or third common electrode 59C (first common electrode 59A) located at the upper end of the pixel P in FIG. 29 are respectively connected through connecting parts 73 to respective common electrodes of the same types (second common electrode 59B and third common electrode 59C) that are located one electrode above in FIG. 29 in an adjacent pixel P on the left side in FIG. 29 along the row direction of the pixel array 3. Also, respective common electrodes (first common electrode 59A and third common electrode 59C) other than the first common electrode 59A, second common electrode 59B, or third common electrode 59C (second common electrode 59B) located at the lower end of the pixel P in FIG. 29 are respectively connected through connecting parts 73 to respective common electrodes of the same types (first common electrode 59A and third common electrode 59C) that are located one electrode below in FIG. 29 in an adjacent pixel P on the right side in FIG. 29 along the row direction of the pixel array 3.

In each pixel P in an even-numbered pixel row PL (a portion corresponding to a color filter 55 in the center of the upper or lower row of FIG. 29, for example; each common electrode in parentheses below is according to this example), respective common electrodes (first common electrode 59A and third common electrode 59C) other than the first common electrode 59A, second common electrode 59B, or third common electrode 59C (second common electrode 59B) located at the upper end of the pixel P in FIG. 29 are respectively connected through connecting parts 73 to respective common electrodes of the same types (first common electrode 59A and third common electrode 59C) that are located one electrode above in FIG. 29 in an adjacent pixel P on the right side in FIG. 29 along the row direction of the pixel array 3. Also, respective common electrodes (second common electrode 59B and third common electrode 59C) other than the first common electrode 59A, second common electrode 59B, or third common electrode 59C (first common electrode 59A) located at the lower end of the pixel P in FIG. 29 are respectively connected through connecting parts 73 to respective common electrodes of the same types (second common electrode 59A and third common electrode 59C) that are located one electrode below in FIG. 29 in an adjacent pixel P on the left side in FIG. 29 along the row direction of the pixel array 3.

This way, the first common electrodes 59A in every three pixel columns PC are connected to each other, the second common electrodes 59B in every three pixel columns PC are connected to each other, and the third common electrodes 59C in every three pixel columns PC are connected to each other, respectively, along the source wiring lines 17.

The respective first common electrode 59A, second common electrode 59B, and third common electrode 59C divide each pixel P into three subpixels p1, p2, and p3. That is, each pixel P is constituted of a first subpixel p1 where the first common electrode 59A is disposed, a second subpixel p2 where the second common electrode 59B is disposed, and a third subpixel p3 where the third common electrode 59C is disposed (shown in FIG. 30 described below).

The respective first common electrodes 59A positioned at one end of the pixel array 3 in the column direction are connected to the first terminal 65 disposed on one side of the frame region F, in a manner similar to Embodiment 3 above. The respective second common electrodes 59B positioned at the other end of the pixel array 3 in the column direction are connected to the second terminal 71 disposed on the other side of the frame region F, in a manner similar to Embodiment 3 above. Although not shown in the figure, the respective third common electrodes 59C located at one end of the pixel array 3 in the column direction are led out to one side of the frame region F from the respective common electrodes 59C, and are bundled by being connected to the third common wiring line that extends along the first common wiring line 61, in a manner similar to the respective first common electrodes 59A.

The third common wiring line has an extension part that protrudes to the outside of the frame region F, and an end of the extension part forms a third terminal. The led-out portions of the respective third common electrodes 59C and the first common wiring line 61 are insulated from each other, and the led-out portions of the respective first common electrodes 59A and the third common wiring line are insulated from each other, respectively, through an interlayer insulating film disposed at the respective intersections.

In the liquid crystal display device S having such a pixel circuit configuration, the common driver circuit 7 is configured such that the respective second common electrodes 59B are supplied with a constant common potential, the respective first common electrodes 59A are supplied with an AC potential of a binary logic level of high and low, based on the common potential supplied to the second common electrodes 59B, and the third common electrodes 59C are supplied with an AC potential of a binary logic level of high and low that is opposite to the AC potential supplied to the first common electrodes 59A, based on the common potential supplied to the second common electrodes 59B.

The gate driver circuit 5 and the source driver circuit 6 are configured to conduct dot inversion driving as in Embodiment 1 above.

Figure 30:
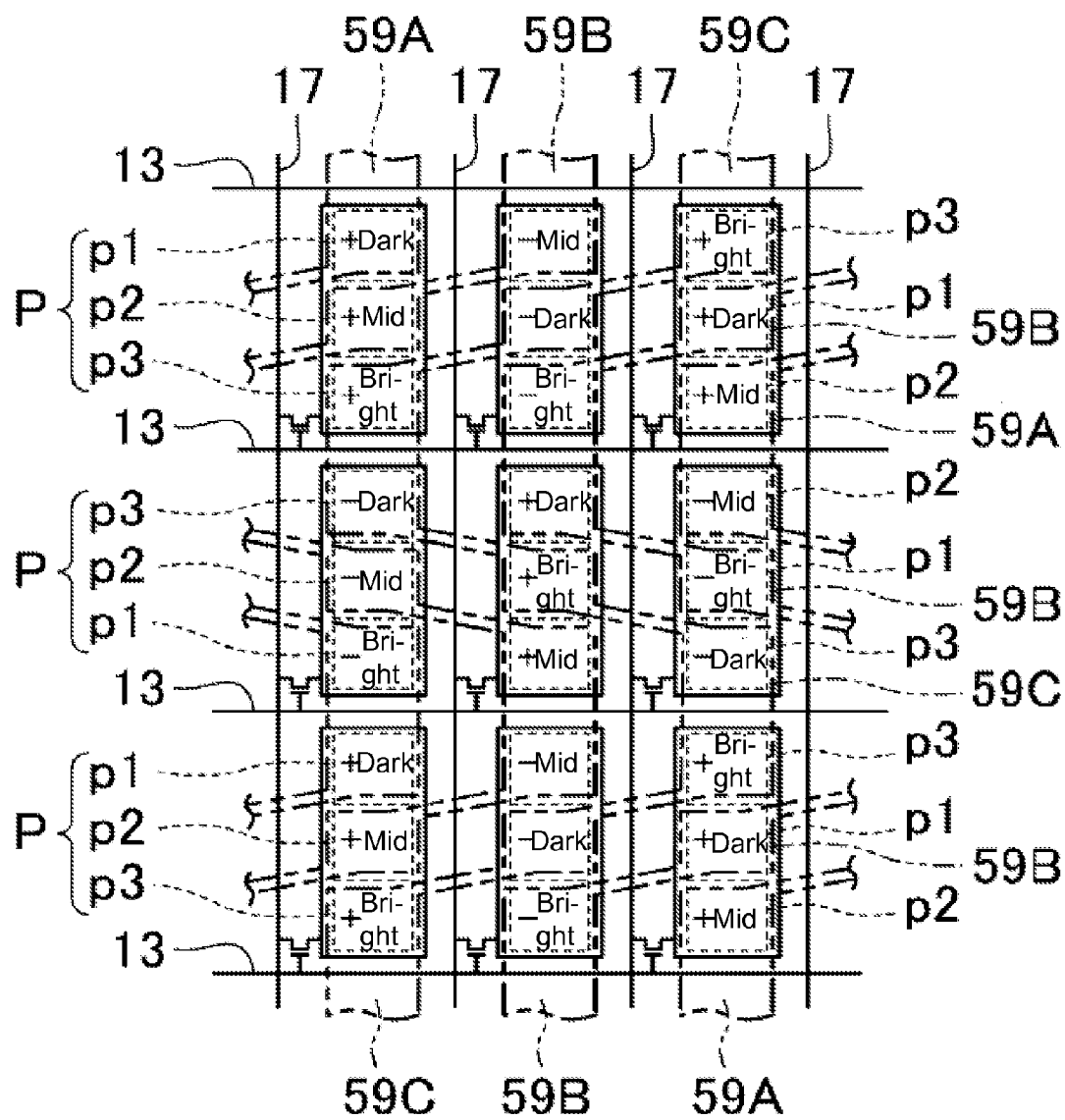
FIG. 30 is a plan view schematically showing an arrangement of bright regions, mid-level brightness regions, and dark regions in one display frame when conducting a display operation in the liquid crystal display device of Modification Example 3 of Embodiment 3.

FIG. 30 shows a schematic plan view of an arrangement of bright subpixels (bright regions), mid-level subpixels (mid-level brightness region), and dark subpixels (dark regions) in the respective pixels P in one display frame during the display operation of the liquid crystal display device S in which the above-mentioned driving method for the first to third common electrodes 59A to 59C and the dot inversion driving are combined.

In the liquid crystal display device S of this modification example, the first to third common electrodes 59A to 59C adjacent to each other in each pixel P are supplied with different common potentials as described above. The respective pixel electrodes 41 are supplied with data potentials through the dot inversion driving, such that the polarities of data potentials supplied to respective adjacent pixels P are inverted from each other in one display frame.

This way, in each pixel P, one of the first subpixel p1 and the third subpixel p3 becomes a bright subpixel, and the other becomes a dark subpixel. The second subpixel p2 in each pixel P becomes a mid-level subpixel. Furthermore, in a pair of adjacent first subpixels p1 and a pair of adjacent third subpixels p3 in each pixel column PC, one becomes a bright subpixel, and the other becomes a dark subpixel, and in this display state, bright subpixels and dark subpixels are alternately arranged along the column direction of the pixel array 3, except for the mid-level subpixels.

With this display state, each pixel P has three different levels of brightness, and the gamma characteristics corresponding to these three levels of brightness are observed in a mixed state. Therefore, the viewing angle dependency of the gamma characteristics can be improved in a desired manner.

Modification Example 4 of Embodiment 3

In Modification Example 3 of Embodiment 3 above, the gate driver circuit 5 and the source driver circuit 6 were configured to conduct dot inversion driving, but in this modification example, the gate driver circuit 5 and the source driver circuit 6 are configured to conduct H line inversion driving in which, in one display frame, polarities of data potentials supplied to the respective pixel electrodes 41 are inverted for every pixel row PL, based on the display signals inputted from the display control circuit 9.

Figure 31:
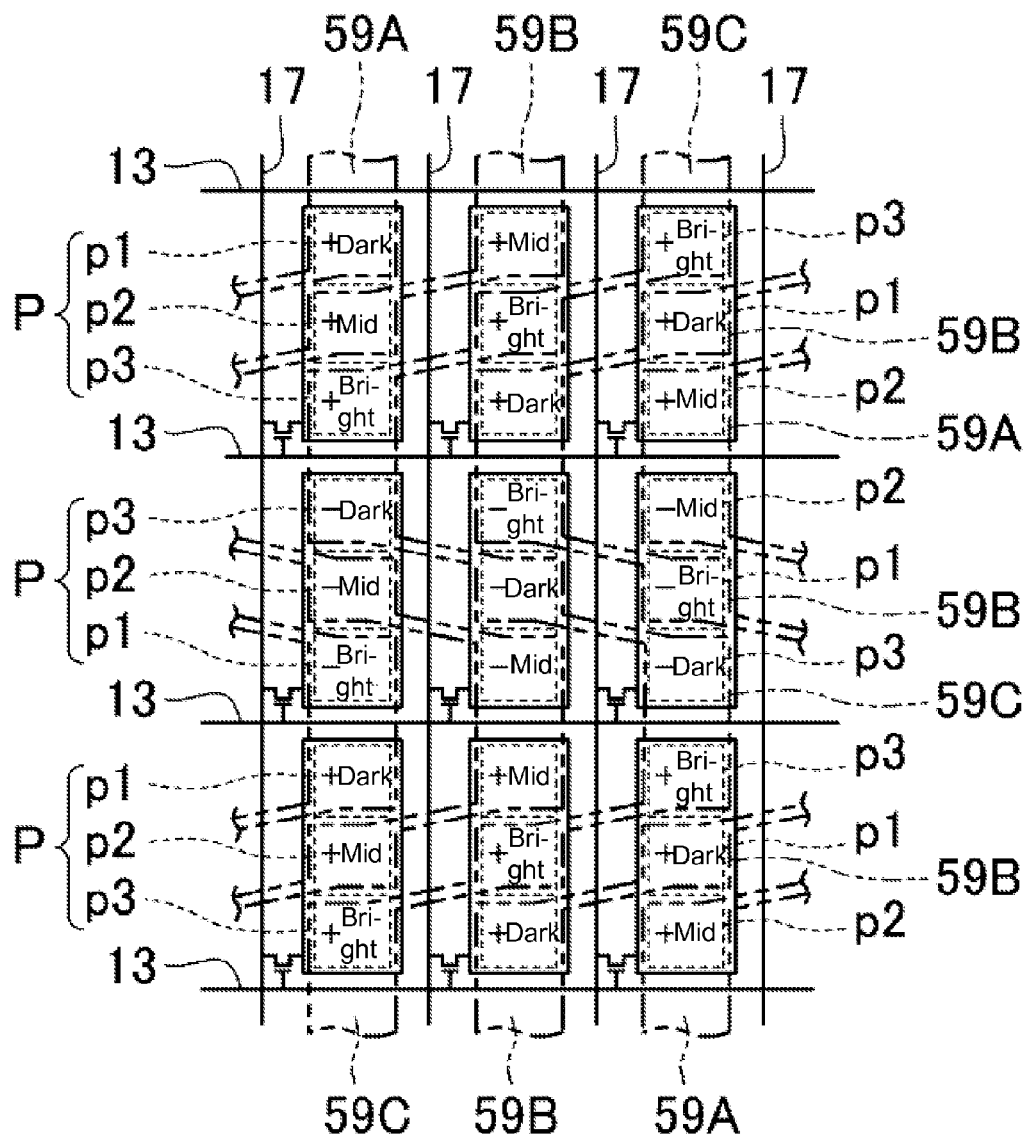
FIG. 31 is a plan view schematically showing an arrangement of bright regions, mid-level brightness regions, and dark regions in one display frame when conducting a display operation in the liquid crystal display device of Modification Example 4 of Embodiment 3.

FIG. 31 shows a schematic plan view of an arrangement of bright subpixels (bright regions), mid-level subpixels (mid-level brightness region), and dark subpixels (dark regions) in the respective pixels P in one display frame during the display operation of the liquid crystal display device S conducting the H line inversion driving.

In the liquid crystal display device S of this modification example, the first to third common electrodes 59A to 59C in each pixel P are supplied with different common potentials. The respective pixel electrodes 41 are supplied with data potentials through the above-mentioned H line inversion driving, such that the polarities of data potentials are inverted for every pixel row PL in one display frame.

This way, in each pixel P, one of the first subpixel p1 and the third subpixel p3 becomes a bright subpixel, and the other becomes a dark subpixel. The second subpixel p2 in each pixel P becomes a mid-level subpixel. Also, one of the first subpixel p1 and the third subpixel p3 adjacent to each other in each pixel row PL becomes a bright subpixel, and the other becomes a dark subpixel. In a pair of adjacent first subpixels p1 and a pair of adjacent third subpixels p3 in each pixel column PC, one becomes a bright subpixel, and the other becomes a dark subpixel. This way, in this display state, bright subpixels and dark subpixels are arranged such that bright subpixels are not adjacent to each other and dark subpixels are not adjacent to each other in each pixel row PL or each pixel column PC.

With this display state, as in Modification Example 2 of Embodiment 3 above, display unevenness can be minimized, and it is possible to display a smooth and clear image.

Other Embodiments

Embodiments 1 to 3 above may also be configured in the following manners.

<Configurations of First Common Electrode 59A and Second Common Electrode 59B>

In Embodiments 1 and 2 above, the first common electrodes 59A and the second common electrodes 59B were configured such that each extends along the row direction of the pixel array 3, a plurality of them are alternately arranged along the column direction of the pixel array 3, and a first common electrode 59A and a second common electrode 59B are arranged along the column direction of pixel array 3 in each pixel P. However, the present invention is not limited to such. For example, the first common electrodes 59A and the second common electrodes 59B may be configured such that each extends along the column direction of the pixel array 3, a plurality of them are alternately arranged along the row direction of the pixel array 3, and a first common electrode 59A and a second common electrode 59B are arranged along the row direction of pixel array 3 in each pixel P.

In Embodiment 3 above, the first common electrodes 59A and the second common electrodes 59B were configured such that each of them are aligned along the column direction in each pixel P, and such that the first common electrodes 59A in every two pixel columns PC and the second common electrodes 59B in every two pixel columns PC are electrically connected to each other along the source wiring lines 17, respectively, but the present invention is not limited to such. For example, it is also possible that a first common electrode 59A and a second common electrode 59B are arranged along the row direction in each pixel P, and first common electrodes 59A in every two pixel rows PL and second common electrodes 59B in every two pixel rows PL are electrically connected to each other, respectively, along the gate wiring lines 13.

In this case, the row direction of the pixel array 3 is the first direction of the present invention, and the column direction of the pixel array 3 is the second direction of the present invention.

<Configuration of Each Pixel P>

In the liquid crystal display device S above, the configuration in which each pixel P is provided with a TFT 20 as a switching element was described, but the present invention is not limited to such. Each pixel P may be provided with a different switching element such as an MIM (metal-insulator-metal), instead of a TFT 20, and various switching elements may be used for a switching element provided in each pixel P as long as the switching element can provide the switching function.

Preferred embodiments of the present invention and modification examples thereof were described above, but the technical scope of the present invention is not limited to the embodiments and modification examples above. It shall be understood by a person skilled in the art that the above embodiments and modification examples thereof are examples, that various modifications can be made to the combinations of the respective constituent elements and respective processes, and that those modification examples are also included in the scope of the present invention.

INDUSTRIAL APPLICABILITY

As described above, the present invention is useful for a liquid crystal display device, and can be suitably used for a liquid crystal display device in which an improvement in aperture ratio in each pixel is required while improving the viewing angle dependency of the gamma characteristics, in particular.

DESCRIPTION OF REFERENCE CHARACTERS

D display region
P pixel
S liquid crystal display device
4 driver circuit
5 gate driver circuit
6 source driver circuit
7 common driver circuit
10 array substrate
15 storage capacitance wiring line
20 TFT (switching element)
30 storage capacitance element
31 lower electrode
33 dielectric layer
35 upper electrode
41 pixel electrode
50 opposite substrate
59A first common electrode
59B second common electrode
65 first terminal
71 second terminal
81 liquid crystal layer

The invention claimed is:

1. A liquid crystal display device, having a display region provided with a plurality of pixels arranged in a prescribed pattern, each of the plurality of pixels being a smallest unit of a displayed image, the liquid crystal display device comprising:
an array substrate in which a pixel electrode, a switching element, and a storage capacitance element is provided for each of the pixels;
an opposite substrate disposed to face the array substrate, the opposite substrate having a plurality of common electrodes provided for each of the pixels;
a liquid crystal layer disposed between the array substrate and the opposite substrate so as to be interposed between each pixel electrode and a plurality of common electrodes facing said pixel electrode, thereby constituting each of the pixels; and
a driver circuit that supplies a prescribed potential to each pixel electrode, the driver circuit supplying different potentials to the respective common electrodes in each of the pixels so that the liquid crystal layer in each of the pixels separated in accordance with the respective common electrodes is separately driven,
wherein the plurality of pixels are arranged in a matrix, and
wherein, in each of the pixels, the plurality of common electrodes are aligned along a first direction that is one of a row direction and a column direction along which the pixels are arrayed, and each of the plurality of common electrodes is made of the same electrode in a group of pixels that are arrayed along a second direction that is perpendicular to the first direction.

2. The liquid crystal display device according to claim 1, wherein the plurality of common electrodes in the respective pixels are separated from each other in each pixel group including a plurality of the pixels arrayed along the second direction, and
wherein the driver circuit conducts line inversion driving in which, in one display frame, respective adjacent common electrodes in pixels that are adjacent to each other along the first direction are supplied with different potentials, and a polarity of the potentials supplied to respective pixel electrodes is reversed for every pixel group made of a plurality of the pixels arrayed along the first direction.

3. The liquid crystal display device according to claim 1, wherein the plurality of common electrodes in the respective pixels are separated from each other in each pixel group including a plurality of the pixels arrayed along the second direction, and
wherein the driver circuit conducts line inversion driving and common inversion driving, thereby reversing a relationship of the pixel electrodes and the common electrodes between high and low levels of potentials, to drive the liquid crystal layer separately for each of the common electrodes through AC driving, said line inversion driving being a driving method in which, in one display frame, polarities of potentials applied to the respective pixel electrodes are reversed for every pixel group made of a plurality of pixels arrayed along the second direction, and, in every display frame, polarities of potentials applied to the respective pixel electrodes are made opposite to the polarities of the respective pixel electrodes in a last display frame, said common inversion driving being a driving method in which a polarity of a potential supplied to at least one of the common electrodes in each of the pixels is reversed so as to be made opposite to a polarity of a potential supplied to a corresponding pixel electrode in synchronization with polarity inversion for a potential of said pixel electrode.

4. The liquid crystal display device according to claim 1, wherein respective adjacent common electrodes of pixels that are adjacent to each other along the first direction are made of the same electrode, and
wherein the driver circuit conducts dot inversion driving in which, in one display frame, polarities of potentials supplied to the respective pixel electrodes are reversed for every one of pixels adjacent to each other.

5. The liquid crystal display device according to claim 1, wherein the switching element is a thin film transistor, and
wherein the thin film transistor includes a semiconductor layer made of an oxide semiconductor.

6. The liquid crystal display device according to claim 5, wherein the oxide semiconductor is an indium gallium zinc oxide.

7. A liquid crystal display device having a display region provided with a plurality of pixels arranged in a prescribed pattern, each of the plurality of pixels being a smallest unit of a displayed image, the liquid crystal display device comprising:
an array substrate in which a pixel electrode, a switching element, and a storage capacitance element is provided for each of the pixels;
an opposite substrate disposed to face the array substrate, the opposite substrate having a plurality of common electrodes provided for each of the pixels;
a liquid crystal layer disposed between the array substrate and the opposite substrate so as to be interposed between each pixel electrode and a plurality of common electrodes facing said pixel electrode, thereby constituting each of the pixels; and a driver circuit that supplies a prescribed potential to each pixel electrode, the driver circuit supplying different potentials to the respective common electrodes in each of the pixels so that the liquid crystal layer in each of the pixels separated in accordance with the respective common electrodes is separately driven, wherein a plurality of said pixel electrodes are arranged in a matrix, wherein a plurality of common electrodes in each of the pixels are arranged along a first direction that is one of a row direction or a column direction along which the pixels are arrayed, wherein respective common electrodes positioned at respective two ends of each of the pixels are each electrically connected to an adjacent common electrode of a pixel that is adjacent to said pixel along the first direction, wherein, in each of the pixels, other common electrodes than a common electrode positioned at one end of the pixel are each electrically connected to a common electrode positioned one electrode closer to said one end in one of pixels that are adjacent to said pixel along a second direction that is perpendicular to the first direction, and wherein, in each of the pixels, other common electrodes than a common electrode positioned at another end of the pixel are each electrically connected to a common electrode positioned one electrode closer to said another end in another of said adjacent pixels along the second direction.

8. The liquid crystal display device according to claim 7, wherein the driver circuit conducts line inversion driving in which, in one display frame, polarities of potentials supplied to the respective pixel electrodes are reversed for every pixel group made of a plurality of pixels arrayed along the second direction.

9. The liquid crystal display device according to claim 7, wherein the switching element is a thin film transistor, and wherein the thin film transistor includes a semiconductor layer made of an oxide semiconductor.

10. The liquid crystal display device according to claim 9, wherein the oxide semiconductor is an indium gallium zinc oxide.

11. A liquid crystal display device having a display region provided with a plurality of pixels arranged in a prescribed pattern, each of the plurality of pixels being a smallest unit of a displayed image, the liquid crystal display device comprising:

an array substrate in which a pixel electrode, a switching element, and a storage capacitance element is provided for each of the pixels;

an opposite substrate disposed to face the array substrate, the opposite substrate having a plurality of common electrodes provided for each of the pixels;

a liquid crystal layer disposed between the array substrate and the opposite substrate so as to be interposed between each pixel electrode and a plurality of common electrodes facing said pixel electrode, thereby constituting each of the pixels; and a driver circuit that supplies a prescribed potential to each pixel electrode, the driver circuit supplying different potentials to the respective common electrodes in each of the pixels so that the liquid crystal layer in each of the pixels separated in accordance with the respective common electrodes is separately driven, wherein the plurality of common electrodes include a first common electrode disposed on one side of each of the pixels, and a second common electrode disposed on another side of said pixel.

12. The liquid crystal display device according to claim 11, further comprising storage capacitance wiring lines extending through the respective pixels, wherein the storage capacitance element is made of a lower electrode connected to one of the storage capacitance wiring lines, a dielectric layer disposed on the lower electrode, and an upper electrode positioned over the lower electrode through the dielectric layer, the upper electrode being connected to the pixel electrode, and wherein, where a potential supplied to the storage capacitance wiring line in each of the pixels in a current display frame is Vcs, a potential supplied to the first common electrode in a current display frame is Vcom1, a potential supplied to the second common electrode in a current display frame is Vcom2, a capacitance of the storage capacitance element is Ccs, a capacitance between the first common electrode and the pixel electrode is Clc1, a capacitance between the second common electrode and the pixel electrode is Clc2, a potential supplied to the storage capacitance wiring line in each of the pixels in a subsequent display frame is Vcs', a potential supplied to the second common electrode in a subsequent display frame is Vcom2', and an absolute value of Vcom1−Vcom2 is v, the driver circuit sets said Vcs' and said Vcom2' to satisfy the following relationships:

$Vcs'=Vcs+(2Clc1/Ccs+2)\times v$ $Vcom2'=Vcom2-2v\times Clc1/Ccs.$

13. The liquid crystal display device according to claim 11, further comprising storage capacitance wiring lines extending through the respective pixels, wherein the storage capacitance element is made of a lower electrode connected to one of the storage capacitance wiring lines, a dielectric layer disposed on the lower electrode, and an upper electrode positioned over the lower electrode through the dielectric layer, the upper electrode being connected to the pixel electrode, and wherein, where a potential supplied to the storage capacitance wiring line in each of the pixels in a current display frame is Vcs, a potential supplied to the first common electrode in a current display frame is Vcom1, a potential supplied to the second common electrode in a current display frame is Vcom2, a capacitance of the storage capacitance element is Ccs, a capacitance between the first common electrode and the pixel electrode is Clc1, a capacitance between the second common electrode and the pixel electrode is Clc2, a potential supplied to the first common electrode in each of the pixels in a subsequent display frame is Vcom1', a potential supplied to the second common electrode in a subsequent display frame is Vcom2', and an absolute value of Vcom1−Vcom2 is v, the driver circuit sets said Vcom1' and said Vcom2' to satisfy the following relationships:

$Vcom1'=Vcom1-(2Clc1/Ccs+2)\times v$ $Vcom2'=Vcom2-2v\times Clc1/Ccs.$

14. The liquid crystal display device according to claim 11, wherein each said first common electrode is electrically connected to a first terminal disposed outside of the display region on one side, and wherein each said second common electrode is electrically connected to a second terminal disposed outside of the display region on another side.

15. The liquid crystal display device according to claim 11, wherein the switching element is a thin film transistor, and wherein the thin film transistor includes a semiconductor layer made of an oxide semiconductor.

16. The liquid crystal display device according to claim 15, wherein the oxide semiconductor is an indium gallium zinc oxide.

\* \* \* \* \*